US012812281B2

(12) United States Patent
Zhang et al.

(10) Patent No.: US 12,812,281 B2
(45) Date of Patent: Nov. 24, 2026

(54) ACOUSTIC OUTPUT DEVICE AND NOISE REDUCTION AND SOUND TRANSMISSION DEVICE

(71) Applicant: SHENZHEN SHOKZ CO., LTD., Shenzhen (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 208 days.

(21) Appl. No.: 18/426,709

(22) Filed: Jan. 30, 2024

(65) Prior Publication Data

US 2024/0171892 A1 May 23, 2024

Related U.S. Application Data

(63) Continuation of application No. 17/452,240, filed on Oct. 26, 2021, now Pat. No. 11,917,352, which is a (Continued)

(30) Foreign Application Priority Data

Apr. 30, 2019 (CN) ......................... 201910364346.2
Sep. 19, 2019 (CN) ......................... 201910888067.6
Sep. 19, 2019 (CN) ......................... 201910888762.2

(51) Int. Cl.
*H04R 1/10* (2026.01)
*G02C 11/00* (2006.01)

(Continued)

(52) U.S. Cl.
CPC ........... *H04R 1/1016* (2013.01); *G02C 11/00* (2013.01); *G02C 11/10* (2013.01); *G06F 3/16* (2013.01);

(Continued)

(58) Field of Classification Search
None
See application file for complete search history.

(56) References Cited

U.S. PATENT DOCUMENTS 7,570,777 B1 8/2009 Taenzer et al.
10,631,075 B1 4/2020 Patil et al.

(Continued)

FOREIGN PATENT DOCUMENTS

CN 106341752 A 1/2017

OTHER PUBLICATIONS

International Search Report in PCT/CN2020/088190 mailed on Jul. 30, 2020, 7 pages.

(Continued)

*Primary Examiner* — Andrew Sniezek
(74) *Attorney, Agent, or Firm* — METIS IP LLC

(57) ABSTRACT

The present disclosure discloses an acoustic output device. The acoustic output device may include at least one acoustic driver configured to generate sounds and a housing structure configured to carry the at least one acoustic driver. The housing structure may include a cavity, and the at least one acoustic driver may be arranged in the cavity and may divide the cavity into a first cavity and a second cavity. And the sounds generated by the at least one acoustic driver may be transmitted from the first cavity and the second cavity, respectively, pass through the housing structure, and form dual sound sources arranged on two sides of an auricle, respectively.

15 Claims, 26 Drawing Sheets

Related U.S. Application Data continuation of application No. PCT/CN2020/088190, filed on Apr. 30, 2020.

(51) Int. Cl.

| | |
|---|---|
| ***G06F 3/16*** | (2006.01) |
| ***G10L 21/0208*** | (2013.01) |
| ***G10L 21/038*** | (2013.01) |
| ***H04M 1/03*** | (2006.01) |
| ***H04M 1/78*** | (2006.01) |
| ***H04R 1/02*** | (2006.01) |
| ***H04R 1/1025*** | (2026.01) |
| ***H04R 1/22*** | (2006.01) |
| ***H04R 1/24*** | (2006.01) |
| ***H04R 1/26*** | (2006.01) |
| ***H04R 1/28*** | (2006.01) |
| ***H04R 1/34*** | (2006.01) |
| ***H04R 1/38*** | (2006.01) |
| ***H04R 1/44*** | (2006.01) |
| ***H04R 3/00*** | (2006.01) |
| ***H04R 3/02*** | (2006.01) |
| ***H04R 5/02*** | (2006.01) |
| ***H04R 5/033*** | (2006.01) |
| ***H04R 9/06*** | (2006.01) |
| ***H04S 7/00*** | (2006.01) |
| ***H04W 4/80*** | (2018.01) |
| *G02C 11/06* | (2006.01) |
| *G10L 21/0216* | (2013.01) |

(52) U.S. Cl.

CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | | | |
|---|---|---|---|---|
| 10,747,026 | B1 * | 8/2020 | Zhang | G02C 11/06 |
| 10,805,740 | B1 * | 10/2020 | Snyder | H04R 25/407 |
| 11,736,853 | B2 * | 8/2023 | Jain | H04R 1/105 381/381 |
| 2006/0280321 | A1 | 12/2006 | Miura et al. | |
| 2007/0041590 | A1 | 2/2007 | Tice | |
| 2007/0177742 | A1 | 8/2007 | Edgren et al. | |
| 2007/0297629 | A1 | 12/2007 | Gelbart et al. | |
| 2008/0002835 | A1 | 1/2008 | Sapiejewski et al. | |
| 2009/0252360 | A1 * | 10/2009 | Sipkema | H04R 25/405 381/327 |
| 2010/0092016 | A1 | 4/2010 | Iwano et al. | |
| 2010/0195842 | A1 | 8/2010 | Sibbald | |
| 2012/0177206 | A1 | 7/2012 | Yamagishi et al. | |
| 2013/0188816 | A1 * | 7/2013 | Bouse | H04R 25/30 381/320 |
| 2015/0163602 | A1 * | 6/2015 | Pedersen | H04R 25/554 381/315 |
| 2017/0156001 | A1 | 6/2017 | Azmi et al. | |
| 2017/0238096 | A1 | 8/2017 | Nakagawa et al. | |
| 2017/0353780 | A1 | 12/2017 | Huang et al. | |
| 2018/0048960 | A1 | 2/2018 | Jeffery et al. | |
| 2018/0167710 | A1 | 6/2018 | Silver et al. | |
| 2018/0167711 | A1 | 6/2018 | Lin | |
| 2018/0255394 | A1 | 9/2018 | Colich | |
| 2019/0021472 | A1 * | 1/2019 | Gonsalves | A45D 44/12 |
| 2019/0110137 | A1 | 4/2019 | Udesen et al. | |
| 2020/0221223 | A1 * | 7/2020 | Zhou | G10L 15/08 |
| 2020/0380955 | A1 * | 12/2020 | Lesso | G10L 17/06 |

OTHER PUBLICATIONS

Written Opinion in PCT/CN2020/088190 mailed on Jul. 30, 2020, 8 pages.

* cited by examiner

2200

ACOUSTIC OUTPUT DEVICE AND NOISE REDUCTION AND SOUND TRANSMISSION DEVICE

CROSS-REFERENCE TO RELATED APPLICATIONS

This application is a Continuation of U.S. patent application Ser. No. 17/452,240, filed on Oct. 26, 2021, which is a Continuation of International Application No. PCT/CN2020/088190, filed on Apr. 30, 2020, which claims priority of Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the entire contents of each of which are incorporated herein by reference.

TECHNICAL FIELD

The present disclosure relates to the field of acoustics, and in particular, to an acoustic output device and a noise reduction and sound transmission device.

BACKGROUND

An open binaural acoustic output device is a portable audio output device that facilitates sound conduction within a specific range. Compared with conventional in-ear and over-ear headphones, the open binaural acoustic output device may have the characteristics of not blocking and not covering the ear canal, allowing users to obtain sound information of an ambient environment while the user is listening to music, improving safety and comfort of the user. Due to the use of an open structure, a sound leakage of the open binaural acoustic output device may be more serious than that of conventional headphones. At present, it is common practice in the industry to use two or a plurality of sound sources to construct a specific sound field and adjust a sound pressure distribution to reduce sound leakage. The manner may reduce the sound leakage to a certain extent, which may also have some limitations. For example, while suppressing sound leakage, the volume of the sound sent to a user may be decreased.

Therefore, it is desirable to provide an acoustic output device for increasing the volume of the sound sent to the user and reducing the sound leakage.

SUMMARY

An aspect of the present disclosure relates to an acoustic output device. The acoustic output device may include at least one acoustic driver configured to generate sounds and a housing structure configured to carry the at least one acoustic driver. The housing structure may include a cavity, and the at least one acoustic driver may be arranged in the cavity and may divide the cavity into a first cavity and a second cavity. And the sounds generated by the at least one acoustic driver may be transmitted from the first cavity and the second cavity, respectively, pass through the housing structure, and form dual sound sources arranged on two sides of an auricle, respectively.

In some embodiments, the housing structure may include a first sound guiding tube and a second sound guiding tube. One end of the first sound guiding tube may be acoustically coupled to the first cavity, and one end of the second sound guiding tube may be acoustically coupled to the second cavity; and the other end of the first sound guiding tube and the other end of the second sound guiding tube may be arranged on the two sides of the auricle, respectively.

In some embodiments, an acoustic impedance of the first sound guiding tube is different from an acoustic impedance of the second sound guiding tube.

In some embodiments, a sectional area of the first sound guiding tube and a sectional area of the second sound guiding tube may be the same or different.

In some embodiments, the sectional area of the first sound guiding tube and the sectional area of the second sound guiding tube may be 0.25 $mm^2$-400 $mm^2$.

In some embodiments, a length of the first sound guiding tube may be negatively correlated with a frequency of a sound output by the first sound guiding tube, and a length of the second sound guiding tube may be negatively correlated with a frequency of a sound output by the second sound guiding tube.

In some embodiments, a length of the first sound guiding tube and a length of the second sound guiding tube may be the same or different.

In some embodiments, a ratio of the length of the first sound guiding tube to the length of the second sound guiding tube may be 0.5-2.

In some embodiments, an aspect ratio of the first sound guiding tube and an aspect ratio of the second sound guiding tube may be not larger than 200.

In some embodiments, a radius of the first sound guiding tube and a radius of the second sound guiding tube may be not less than 0.5 mm, and the length of the first sound guiding tube and the length of the second sound guiding tube may be not larger than 500 mm.

In some embodiments, the first sound guiding tube and/or the second sound guiding tube may include an acoustic structure and/or an acoustic material configured to adjust frequency responses of the sounds.

In some embodiments, the at least one acoustic driver may have different impedances on two sides corresponding to the first cavity and the second cavity.

In some embodiments, a ratio of the impedances on the two sides of the at least one acoustic driver may be 0.8-1.2.

In some embodiments, a volume of the first cavity may be larger than a volume of the second cavity, and a first resonance peak corresponding to the first cavity may be less than a second resonance peak corresponding to the second cavity.

In some embodiments, the volume of the first cavity and the volume of the second cavity may be not larger than 2500 $mm^3$.

In some embodiments, the dual sound sources may output sounds with opposite phases.

In some embodiments, a distance d between the dual sound sources may be 1 cm-12 cm.

In some embodiments, the dual sound sources may be arranged on the two sides of the auricle, respectively, and an acoustic route from a sound source on a front side of the auricle to an ear of a user may be shorter than an acoustic route from a sound source on a rear side of the auricle to the ear of the user.

In some embodiments, a ratio of the distance between the dual sound sources to a height of the auricle may be 0.2-4.

Another aspect of the present disclosure relates to an acoustic output device. The acoustic output device may include a first acoustic driver, a second acoustic driver, and a housing structure configured to carry the first acoustic driver and the second acoustic driver. The first acoustic driver and the second acoustic driver may be arranged in the housing structure and form two ends of a cavity arranged inside the housing structure. A side of the first acoustic driver facing away from the cavity and a side of the second acoustic driver facing away from the cavity may propagate sounds to an outside of the housing structure, respectively.

In some embodiments, the side of the first acoustic driver facing away from the cavity and the side of the second acoustic driver facing away from the cavity may propagate the sounds to the outside of the housing structure via at least two sound guiding holes, respectively.

In some embodiments, the side of the first acoustic driver facing away from the cavity and the side of the second acoustic driver facing away from the cavity may generate sounds with opposite phases.

In some embodiments, a side of the first acoustic driver facing the cavity is in acoustic communication with a side of the second acoustic driver facing the cavity via the cavity.

In some embodiments, the side of the first acoustic driver facing away from the cavity and/or the side of the second acoustic driver facing away from the cavity may include a barrier plate, and the barrier plate may be fixedly connected to the housing structure.

In some embodiments, the barrier plate may include at least one sound guiding hole.

In some embodiments, the at least one sound hole may include a mesh layer.

In some embodiments, the first acoustic driver may include a vibration diaphragm and a magnet that drives the vibration diaphragm to vibrate. And the magnet may be arranged on a side of the vibration diaphragm facing away from the cavity.

In some embodiments, the cavity may include an acoustic structure and/or an acoustic material configured to adjust frequency responses of the sounds.

In some embodiments, the vibration diaphragm of the first acoustic drive may be inclined relative to the vibration diaphragm of the second acoustic driver.

In some embodiments, a length of the cavity between the first acoustic driver and the second acoustic driver in the housing structure may be not larger than 25 cm.

In some embodiments, the cavity between the first acoustic driver and the second acoustic driver in the housing structure may include a hole.

In some embodiments, the first acoustic driver may include an active vibration diaphragm, and the second acoustic driver may include a passive vibration diaphragm. The active vibration diaphragm may drive air in the cavity to vibrate, and the air vibration may drive the passive vibration diaphragm to vibrate.

In some embodiments, the first acoustic driver and the second acoustic driver may output sounds with different phase differences before and after a frequency division point.

In some embodiments, the frequency division point may be not larger than 2000 Hz.

A further aspect of the present disclosure relates to a noise reduction and sound transmission device. The noise reduction and sound transmission device may include a first sound transmitter, a second sound transmitter, and a supporting structure configured to carry the first sound transmitter and the second sound transmitter. The supporting structure may include a first sound hole corresponding to the first sound transmitter and a second sound hole corresponding to the second sound transmitter. The first sound hole and the second sound hole may be configured to introduce external sounds to the first sound transmitter and the second sound transmitter, respectively. And the supporting structure may be configured such that the first sound hole and the second sound hole may be arranged on two sides of an auricle of a user, respectively.

In some embodiments, a distance between the first sound hole and the second sound hole may be not less than 1 cm and not larger than 12 cm.

In some embodiments, a ratio of the distance between the first sound hole and the second sound hole to a height of the auricle may be not less than 0.2.

In some embodiments, the first sound transmitter and the second sound transmitter may be non-directional sound transmitters.

In some embodiments, a sensitivity difference between the first sound transmitter and the second sound transmitter may be not larger than 3 dB.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
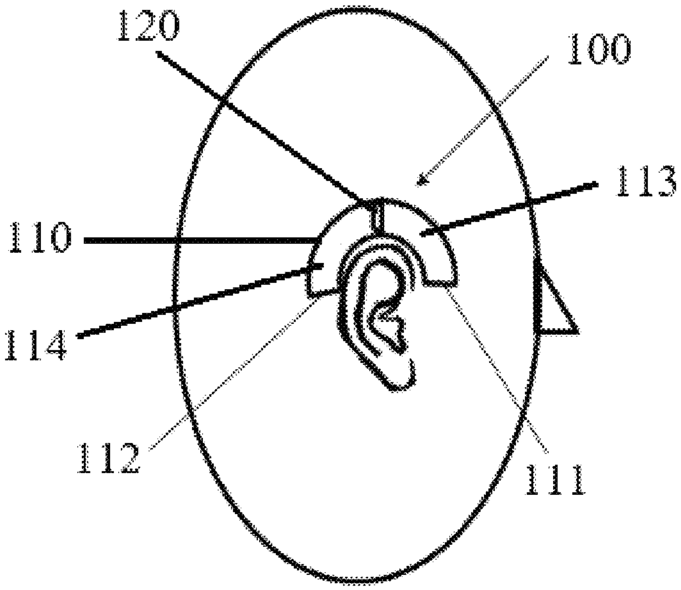
FIG. 1 is a diagram illustrating an exemplary acoustic output device according to some embodiments of the present disclosure.

In order to describe the technical solutions of the embodiments of the present disclosure more clearly, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "including" and "comprising" only prompt operations and elements that include explicitly identified, and these operations and elements do not constitute a row of rows, methods, or equipment that may also contain other operations or elements.

A flowchart is used in the present disclosure to illustrate the operations performed by the system according to the embodiments of the present disclosure. It should be understood that the foregoing or following operations may not necessarily be performed exactly in order. Instead, each step may be processed in reverse or simultaneously. At the same time, other operations to these processes may be added, or a step or several operations from these processes may be removed.

The present disclosure describes an acoustic output device including at least one set of acoustic drivers. When a user wears the acoustic output device, the acoustic output device may be at least disposed on one side of the user's head, close to but not block the user's ear(s). The acoustic output apparatus may be worn on the user's head (e.g., a non-in-ear opening earphone designed as glasses, a headband, etc.), or worn on other parts of the user's body (such as the neck/shoulder of the user), or placed near the user's ears by other means (such as held by the user). In some embodiments, the sounds generated by the at least one set of acoustic drivers in the acoustic output device may be transmitted outside by two sound-guiding holes acoustically coupled to the at least one set of acoustic drivers. In some embodiments, the at least one set of acoustic drivers may include an active acoustic driver and a passive acoustic driver (e.g., a passive vibration diaphragm). The active acoustic driver and the passive acoustic driver may be arranged in the cavity of the acoustic output device. When the active acoustic driver generates sounds under the common action of a coil and a magnet, the passive acoustic driver may be driven to vibrate at the same time. The sounds generated by the active acoustic driver and the passive acoustic driver may be transmitted outside by the sound-guiding holes acoustically coupled to the active acoustic driver and the passive acoustic driver, respectively. In some embodiments, the two sound-guiding holes may be arranged on two sides of the auricle of the user. The auricle may separate the two sound-guiding holes as a baffle such that the two sound-guiding holes may have different acoustic routes to the user's ear canal. In some embodiments, the acoustic output device may include a baffle, and the two sound-guiding holes may be arranged on two sides of the baffle. On the one hand, the two sound-guiding holes arranged on two sides of the auricle or the baffle may increase a sound route difference (i.e., a route difference between sounds from the two sound-guiding holes to the ear canal of the user) that the two sound-guiding holes transmit the sounds to the user's ear, respectively, which may attenuate sound cancellation, thereby increasing the volume of the sounds (also called near-field sounds) heard by the user's ears, and improving the user's hearing experience. On the other hand, the auricle or the baffle may have a small influence on the transmission of sounds from the sound-guiding holes to the environment (also referred to as far-field sounds). When the far-field sounds generated by the two sound-guiding holes cancel each other, a sound leakage of the acoustic output device may be suppressed to a certain extent, and the sounds generated by the acoustic output device may be prevented from being heard by others near the user.

FIG. 1 is a diagram illustrating an exemplary acoustic output device according to some embodiments of the present disclosure. As shown in FIG. 1, the acoustic output device 100 may include a housing structure 110 and an acoustic driver 120 arranged inside the housing structure. In some embodiments, the acoustic output device 100 may be worn on a user's body (e.g., the head, the neck, the upper torso, etc. of the user), through the housing structure 110. The housing structure 110 and the acoustic driver 120 may be close to and not block an ear canal of the user. The user's ear may be in an open state. The user may hear sounds output from the acoustic output device 100 and sound from an external source. For example, the acoustic output device 100 may be arranged around or partially around the user's ear and may transmit the sounds via an air conduction manner or a bone conduction manner.

The housing structure 110 may be configured to carry one or more acoustic drivers 120. In some embodiments, the housing structure 110 may include an enclosed shell structure with an internal hollow, and the one or more acoustic drivers 120 may be arranged in the housing structure 110. In some embodiments, the acoustic output device 100 may be combined with a product such as a pair of glasses, a headset, a display device, an AR/VR helmet, or the like. In this case, the housing structure 110 may be fixed near the user's ear via a hanging manner or a clamping manner. In some alternative embodiments, the housing structure 110 may include a hook, and the shape of the hook may match the shape of the auricle, such that the acoustic output device 100 may be worn on the user's ear through the hook independently. The acoustic output device 100, which is worn on the user's ear independently may be communicated with a signal source (e.g., a computer, a mobile phone, or other mobile devices) in a wired or wireless manner (e.g., Bluetooth). For example, the acoustic output device 100 worn on the left ear and/or that worn on the right ear may be directly communicated with the signal source via a wireless manner. As another example, the acoustic output device 100 worn at the left and/or right ear may include a first output device and a second output device. The first output device may be communicated with the signal source, and the second output device may be connected to the first output device via a wireless manner. The sounds may be output synchronously by the first output device and the second output device controlled by one or more synchronization signals. The wireless connection may include but not limited to Bluetooth, a local area network, a wide area network, a wireless personal area network, a near-field communication, or the like, or any combination thereof.

In some embodiments, the housing structure 110 may be a housing structure with a shape matching the user's ear, such as a circular ring, an oval, a (regular or irregular) polygonal, a U-shape, a V-shape, a semi-circle, such that the housing structure 110 may be directly anchored at the user's ear. In some embodiments, the housing structure 110 may also include one or more fixed structures. The fixed structure may include an ear hook, a head beam, or an elastic band, which may be used to fix the acoustic output device 100 on the user and prevent the acoustic output device 100 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 100 to be fixed to a certain position of the head. In some embodiments, the elastic band may include a discontinuous band. For example, the elastic band may include a rigid portion and a flexible portion. The rigid portion may be made of a rigid material (e.g., a plastic, a metal, etc.), and the rigid portion may be fixed to the housing structure 110 of the acoustic output device 100 via a physical connection (e.g., a snap connection, a screw connection, etc.). The flexible portion may be made of an elastic material (e.g., a cloth, a composite material, a neoprene, etc.).

In some embodiments, when the user wears the acoustic output device 100, the housing structure 110 may be placed above or below the auricle. The housing structure 110 may also include a sound-guiding hole 111 and a sound-guiding hole 112, which may be configured to transmit sounds. In some embodiments, the sound-guiding hole 111 and the sound-guiding hole 112 may be arranged on two sides of the user's auricle, respectively. The acoustic driver 120 may output the sounds through the sound guiding-hole 111 and the sound guiding-hole 112.

The acoustic driver 120 may be configured to receive an electrical signal, and convert the electrical signal into a voice signal which may be output. In some embodiments, according to the frequency of the acoustic driver 120, a type of the acoustic driver 120 may include an acoustic driver with a low-frequency (e.g., 30 Hz-50 Hz), an acoustic driver with a medium and low frequency (e.g., 150 Hz-500 Hz), an acoustic driver with a medium and high frequency (e.g., 500 Hz-5 kHz), an acoustic driver with a high-frequency (e.g., 5 kHz-16 kHz), or an acoustic driver with a full-frequency (e.g., 30 Hz-16 kHz), or the like, or any combination thereof. Certainly, the low frequency, high frequency, or the like, may only refer to a rough range of frequencies. Different application scenarios may have different dividing manners. For example, a frequency division point may be determined. The low frequency may represent a frequency range below the frequency division point, and the high frequency may represent frequencies above the frequency division point. The frequency division point may be any value within the audible range of the human ear, for example, 500 Hz, 600 Hz, 700 Hz, 800 Hz, 1000 Hz, or the like. In some embodiments, according to a principle, the acoustic driver 120 may also include, but not limited to, a moving coil acoustic driver, a moving iron acoustic driver, a piezoelectric acoustic driver, an electrostatic acoustic driver, a magnetostrictive acoustic driver, or the like.

In some embodiments, the acoustic driver 120 may include a vibration diaphragm. When the vibration diaphragm vibrates, sounds may be transmitted from a front side and a rear side of the vibration diaphragm, respectively. In some embodiments, a front chamber 113 may be disposed on the front side of the vibration diaphragm in the housing structure 110, which may be configured to transmit the sounds. The front chamber 113 may be acoustically coupled to the sound-guiding hole 111. The sounds transmitted from the front side of the vibration diaphragm may be transmitted from the sound-guiding hole 111 through the front chamber 113. A rear chamber 114 may be disposed on the rear side of the vibration diaphragm in the housing structure 110, which may be configured to transmit the sounds. The rear chamber 114 may be acoustically coupled to the sound-guiding hole 112. The sound transmitted from the rear side of the vibration diaphragm may be transmitted from the sound-guiding hole 112 through the rear chamber 114. In some embodiments, the front chamber 113 and/or the rear chamber 114 may be divided into different structures transmitting sounds. For example, the front chamber 113 may also include a first cavity and a first sound-guiding tube, and the rear chamber 114 may include a second cavity and a second sound-guiding tube. More descriptions may be found elsewhere in the present disclosure (e.g., FIG. 22 and the relevant descriptions thereof). It should be noted that, when the vibration diaphragm vibrates, the front side and the rear side of the vibration diaphragm may simultaneously generate sounds with opposite phases. After passing through the front chamber 113 and rear chamber 114, respectively, the sounds may be transmitted outward from the sound-guiding hole 111 and the sound-guiding hole 112. In some embodiments, the sounds output by the acoustic driver 120, which may be transmitted through the sound-guiding hole 111 and the sound-guiding hole 112 may meet the specific requirement by setting a structure of at least one of the front chamber 113 and the rear chamber 114. For example, the sound-guiding hole 111 and the sound-guiding hole 112 may transmit a set of sounds with a specific phase relationship (e.g., opposite phases) by designing a length of at least one of the front chamber 113 and the rear chamber 114, thereby increasing a volume in the near field of the acoustic output device 100, and avoiding the sound leakage of the acoustic output device 100.

In some alternative embodiments, the acoustic driver 120 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the housing structure and may be output from a corresponding sound-guiding hole. The plurality of vibration diaphragms may be controlled by a same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

In some embodiments, the acoustic output device may further include a plurality of acoustic drivers. The plurality of acoustic drivers may be controlled by the same controller or different controllers. The plurality of acoustic drivers may generate sounds that satisfy a requirement of certain phase (s) and/or amplitude(s). As an exemplary description, the acoustic output device may include a first acoustic driver and a second acoustic driver. The controller may control the first acoustic driver and the second acoustic driver by a control signal to generate sounds that satisfy a requirement of certain phase(s) and amplitude(s) (e.g., sounds with the same amplitude and opposite phases, sounds with different amplitudes and opposite phases, etc.). The first acoustic driver may output the sounds via at least one first sound-guiding hole, and the second acoustic driver may output the sounds via at least one second sound-guiding hole. The first sound-guiding hole and the second sound-guiding hole may be arranged on two sides of the auricle. It should be noted that the count of the acoustic drivers may not be limited to two as mentioned above. The count of the acoustic drivers may be three, four, five, or the like. Sound parameters (e.g., phase, frequency, and/or amplitude) of each acoustic driver may be adjusted according to actual needs.

In order to further illustrate the influence of the sound-guiding holes arranged on two sides of the auricle on the sound output effect of the acoustic output device, the acoustic output device and the auricle may be equivalent to a dual-sound source-baffle model in the present disclosure.

For the convenience of description and illustration, each sound-guiding hole may be approximately considered as a point sound source when the size of the sound-guiding hole on the acoustic output device is small. A sound pressure of a sound field p generated by a single sound source may be represented by Equation (1) below:

$$p = \frac{j\omega\rho_0}{4\pi r} Q_0 \exp j(\omega t - kr) \tag{1}$$

where ω denotes an angular frequency, $\rho_0$ denotes the air density, r denotes a distance between a target point and a sound source, $Q_0$ denotes a volume velocity of the sound source, and k denotes a wave number. It can be seen that the sound pressure of the sound field of the point sound source may be inversely proportional to the distance between the target point to the point sound source.

As described above, two sound-guiding holes (e.g., the sound-guiding hole 111 and the sound-guiding hole 112) may be arranged in the acoustic output device 100 to construct a dual sound source to reduce the sounds radiated by the acoustic output device 100 to the surrounding environment (i.e., far-field sound leakage). In some embodiments, the two sound-guiding holes, i.e., the dual sound source, may output sounds with a certain phase difference. When positions of the two point sound sources of the dual sound source and the phase difference, or the like satisfy a certain condition, the acoustic output device may show different sound effects in the near field and the far field. For example, if the phases of the point sound sources corresponding to the two sound-guiding holes are opposite, that is, an absolute value of the phase difference between the two point sound sources is 180 degrees, the far-field sound leakage may be reduced according to the principle of reversed phase cancellation.

Figure 2:
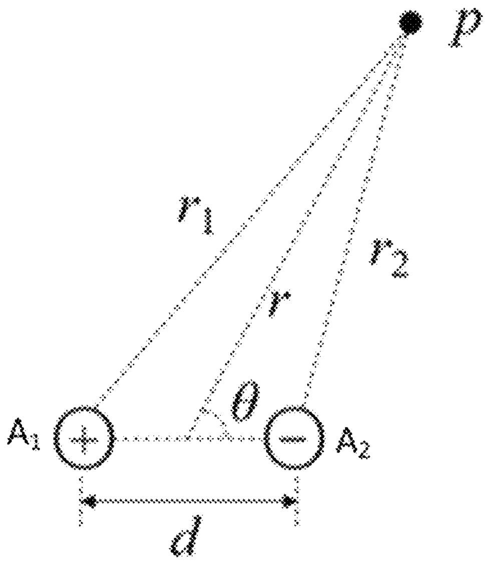
FIG. 2 is a schematic diagram illustrating an interaction between two point sound sources according to some embodiments of the present disclosure.

As shown in FIG. 2, the sound pressure p of the sound field generated by the dual sound source may be represented by Equation (2) below:

$$p = \frac{A_1}{r_1}\exp j(\omega t - kr_1 + \varphi_1) + \frac{A_2}{r_2}\exp j(\omega t - kr_2 + \varphi_2) \tag{2}$$

where $A_1$ and $A_2$ denote the intensities of the two point sound sources, respectively, $\varphi_1$ and $\varphi_2$ denote the phases of the two point sound sources, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases} \tag{3}$$

where r denotes a distance between any target point in space and a center position of the dual sound source, θ denotes an angle between a line connecting the target point and the center position of the dual sound source and a line where the dual sound source locates.

According to Equation (3), the sound pressure p of the target point in the sound field may relate to the intensity of each point sound source, a distance d between the two point sound sources, the phases, and a distance between the target point and the dual sound source.

Figure 3:
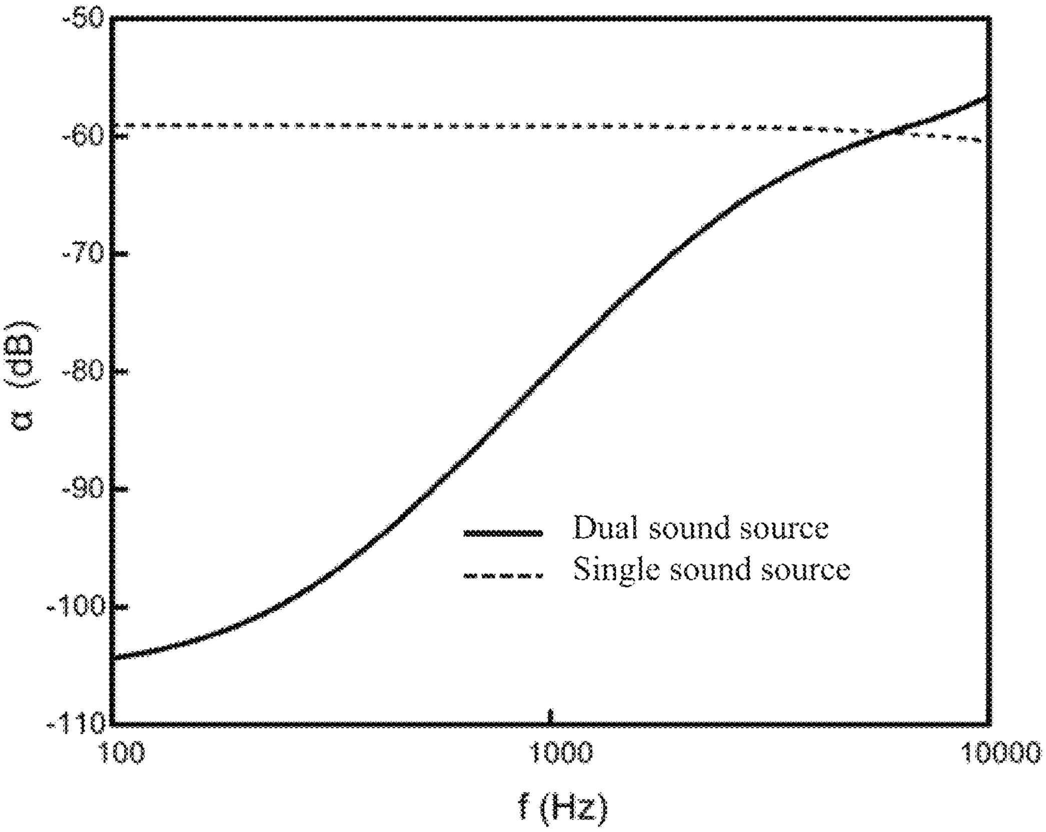
FIG. 3 is a schematic diagram illustrating exemplary frequency responses of a single sound source and a dual sound source according to some embodiments of the present disclosure.

FIG. 3 is a schematic diagram illustrating exemplary frequency responses of a single sound source and a dual sound source according to some embodiments of the present disclosure. As shown in FIG. 3, in the far field, when the distance between the two point sound sources is fixed, the volume of the sound leakage generated by the dual sound source may be less than the volume of the sound leakage generated by a single sound source in a certain frequency range (e.g., 100 Hz-8000 Hz). That is, in a certain frequency range, the dual sound source may have a stronger sound leakage reduction capability than that of the single sound source. It should be noted that the sound source in the embodiment may use a point sound source as an example, and the type of the sound source may not be limited. In other embodiments, the sound source may also be a surface sound source.

Figure 4:
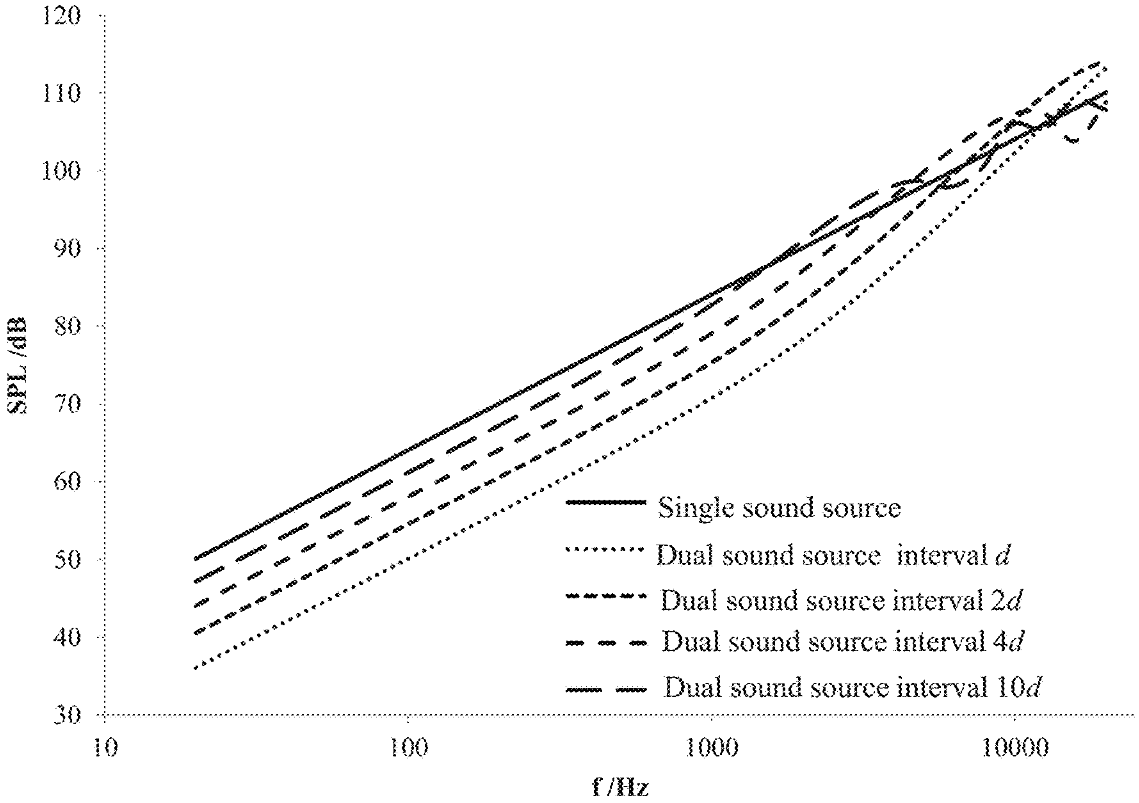
FIG. 4 is a schematic diagram illustrating exemplary frequency responses of a dual sound source with different distances in a near field according to some embodiments of the present disclosure.

FIG. 4 is a schematic diagram illustrating exemplary frequency responses of a dual sound source with different distances in a near field according to some embodiments of the present disclosure. In the embodiment, a hearing position may be regarded as the target point to further illustrate the relationship between the sound pressure at the target point and the distance d between the two point sound sources. The hearing position may represent a position of the user's ear. That is, the sound at the hearing position may represent the near-field sound generated by the two-point sound source. It should be noted that the "near-field sound" may indicate the sound within a certain range of the sound sources (e.g., the sound-guiding hole 111 is equivalent to a point sound source). For example, the sound within 0.2 m from the sound source. Merely by way of example, a point sound source A1 and a point sound source A2 may be disposed on the same side of the hearing position, and the point sound source A1 may be closer to the hearing position. The point sound source A1 and the point sound source A2 may output sounds with the same amplitude and opposite phases. As shown in FIG. 4, as the distance between the point sound source A1 and the point sound source A2 gradually increases (e.g., from d to 10 d), the sound volume at the hearing position may be gradually increased. As the distance between the point sound source A1 and the point sound source A2 increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single sound source with the same intensity as the dual sound source in a middle-low-frequency (e.g., less than 1000 Hz). For a high frequency (e.g., close to 10000 Hz), a wavelength of the sounds may be decreased, a condition for enhancing the sound may be formed, and the sound volume at the hearing position generated by the dual sound source may be larger than a sound volume at the hearing position generated by the single sound source. As used herein, the sound pressure amplitude (i.e., a sound pressure) may refer to a pressure generated by the sound through the vibration of the air.

Figure 5:
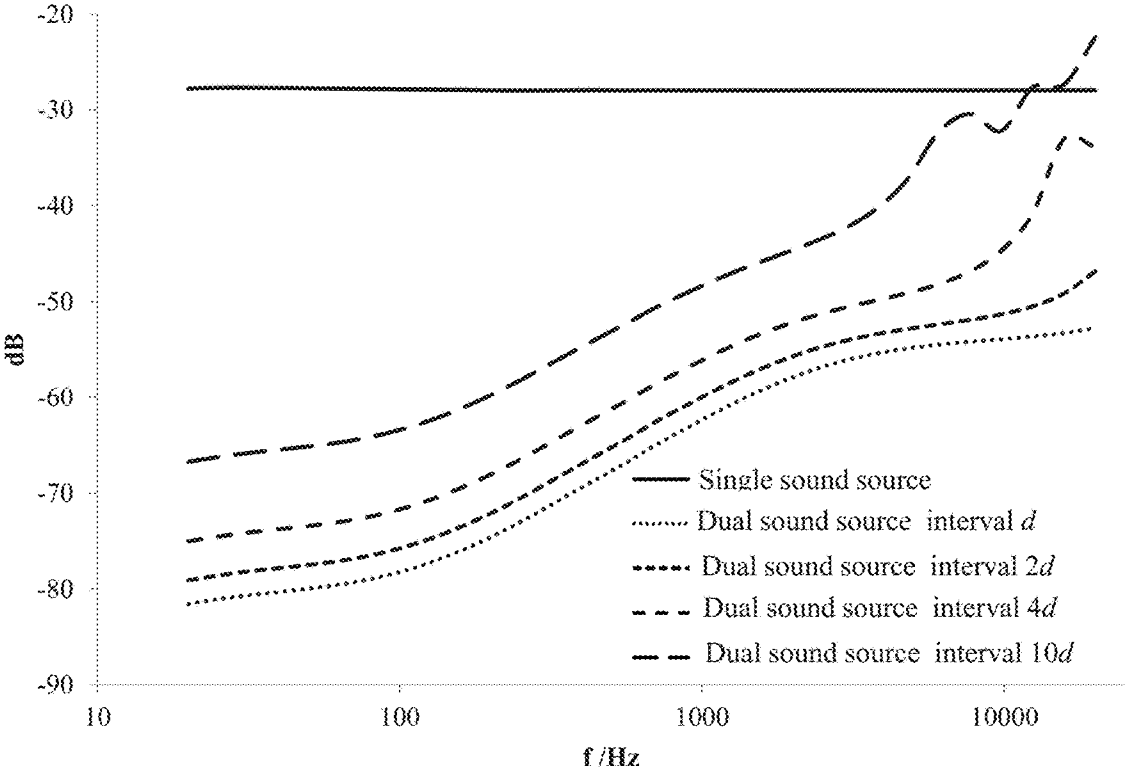
FIG. 5 is a schematic diagram illustrating exemplary sound leakage parameters of a dual sound source with different distances in a far field according to some embodiments of the present disclosure.

In some embodiments, the sound volume at the hearing position may be increased by increasing the distance between the point sound sources (e.g., the point sound source A1 and the point sound source A2) of the dual sound source. As the distance increases, the sound cancellation of the dual sound source may be weakened, thereby increasing sound leakage in the far field. Merely by way of example, FIG. 5 is a schematic diagram illustrating exemplary sound leakage parameters of a dual sound source with different distances in a far field according to some embodiments of the present disclosure. As shown in FIG. 5, taking the sound leakage parameter of a single sound source in the far field as a reference, as the distance between two point sound sources of the dual sound source increases from d to 10 d, the sound leakage parameter in the far field may gradually increase, indicating the sound leakage may gradually increase. More descriptions regarding the sound leakage parameter may be found in Equation (4) and related descriptions.

Figure 6:
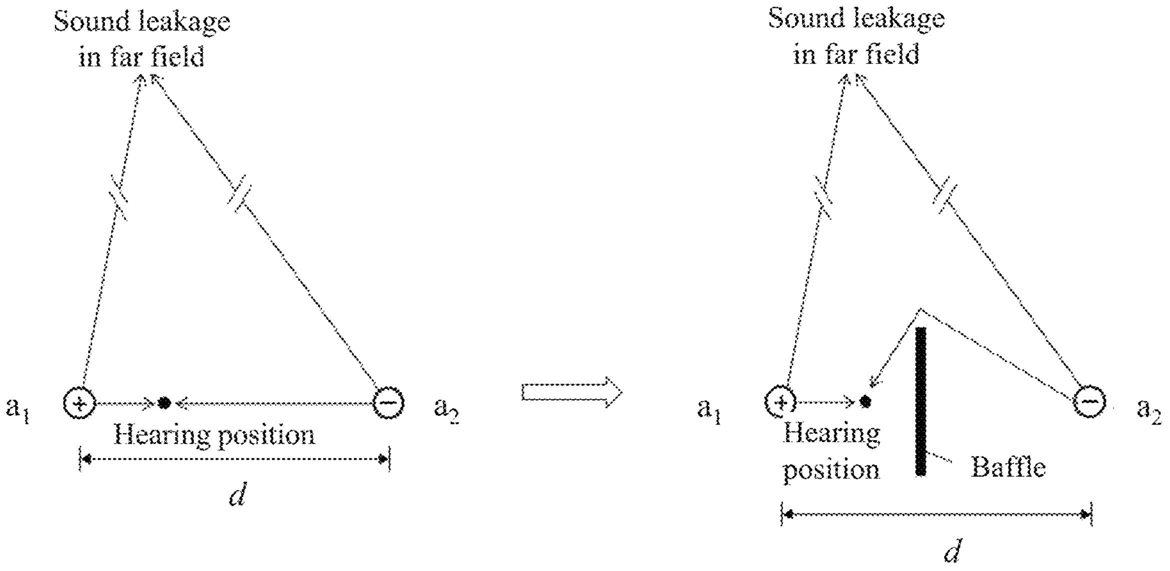
FIG. 6 is a schematic diagram illustrating an exemplary baffle disposed between two point sound sources of a dual sound source according to some embodiments of the present disclosure.

In some embodiments, at least two sound-guiding holes of the acoustic output device arranged on two sides of the auricle may be beneficial to improve the output effect of the acoustic output device, for example, increase the sound intensity of the hearing position in the near field and reducing the sound leakage in the far field. To facilitate the description of the acoustic output device, the human auricle may be equivalent to a baffle, and the sounds output from the two sound-guiding holes may be equivalent to two point sound sources (e.g., the point sound source A1 and the point sound source A2). FIG. 6 is a schematic diagram illustrating an exemplary baffle disposed between two point sound sources of a dual sound source according to some embodiments of the present disclosure. As shown in FIG. 6, when the baffle is disposed between the point sound source A1 and the point sound source A2, a sound field of the point sound source A2 may bypass the baffle to interfere with a sound wave of the point sound source A1 at the hearing position in the near field, which may increase a length of an acoustic route between the point sound source A2 and the hearing position. Assuming that the point sound source A1 and the point sound source A2 have the same amplitude, an amplitude difference between the sound waves of the point sound source A1 and that of the point sound source A2 at the hearing position may be larger than that in a case without a baffle, thereby reducing a sound cancellation of the two sounds at the hearing position, increasing a sound volume at the hearing position. In the far field, the sound waves generated by the point sound source A1 and the point sound source A2 may not bypass the baffle in a relatively large space, and the sound waves may be interfered (as a case without the baffle). Compared to the case without the baffle, the sound leakage in the far field may not increase significantly. Therefore, the baffle being disposed between the point sound source A1 and the point sound source A2 may significantly increase the sound volume at the hearing position in the near field and not significantly increase that of the leakage sound in the far field.

Figure 7:
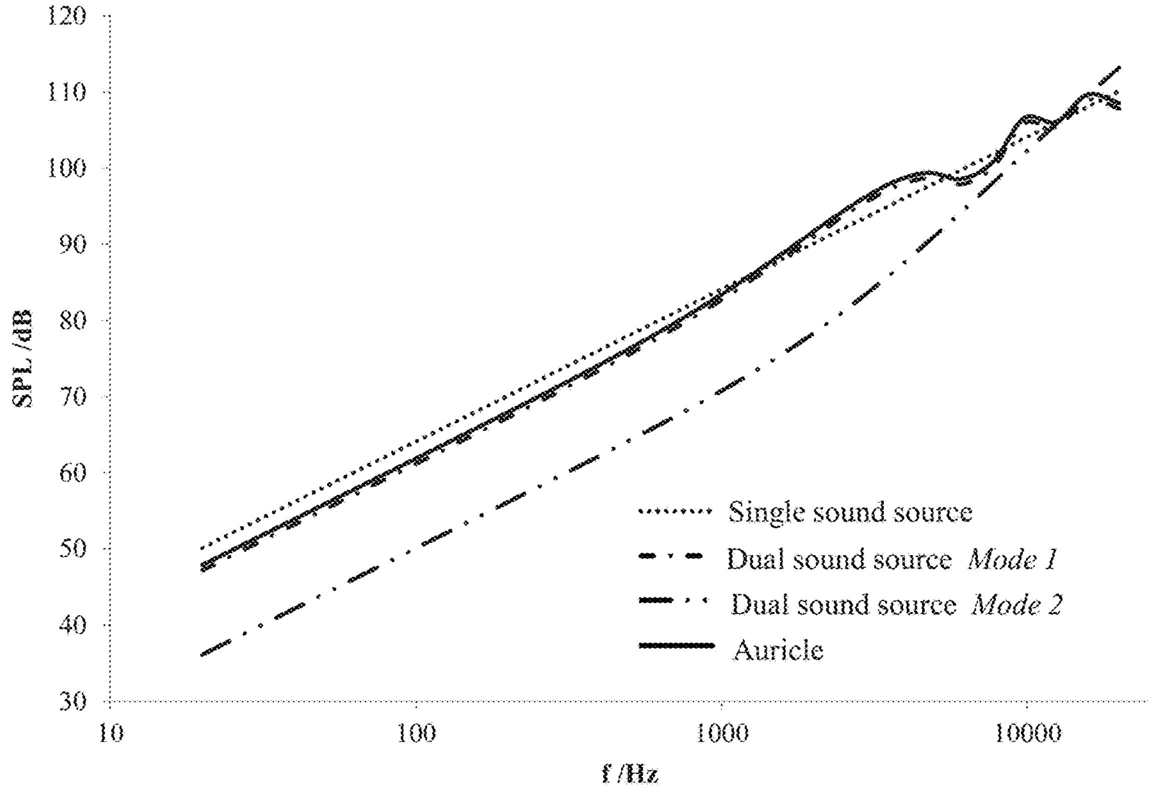
FIG. 7 is a schematic diagram illustrating exemplary frequency responses of a dual sound source in a near field when an auricle is located between two point sound sources of the dual sound source according to some embodiments of the present disclosure.
Figure 8:
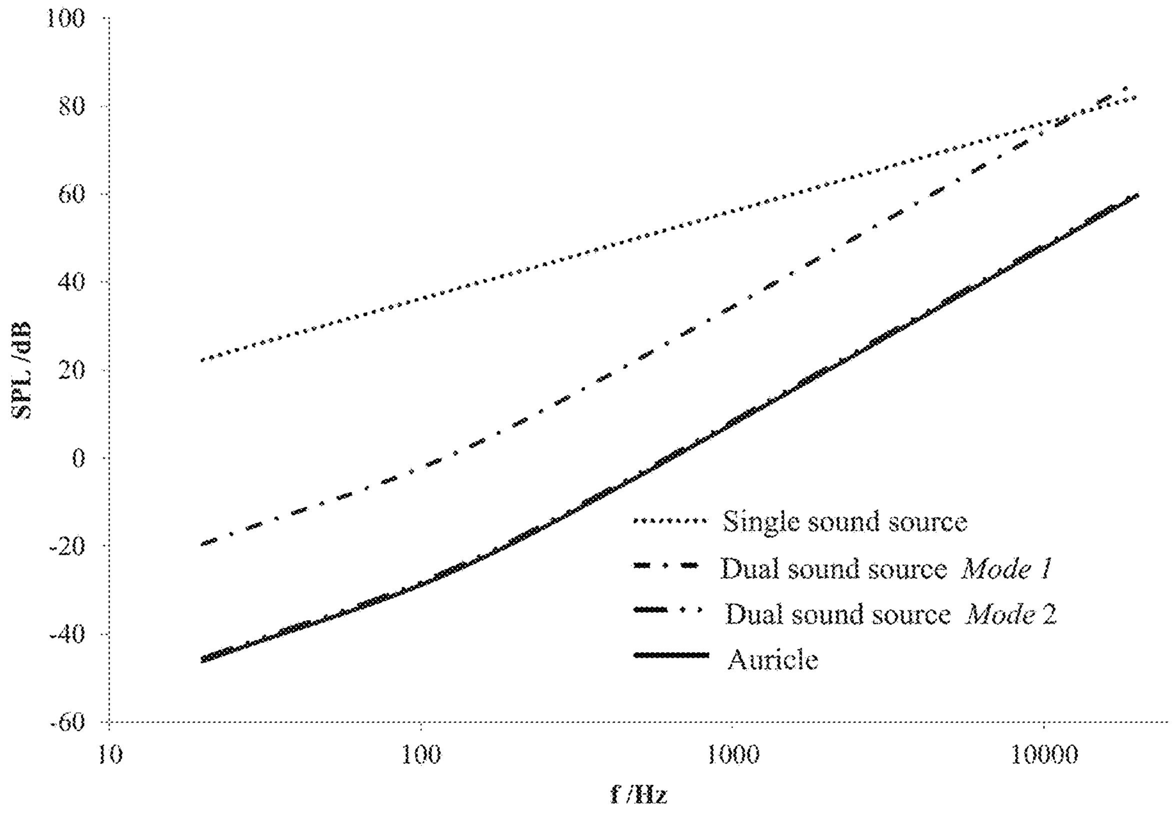
FIG. 8 is a schematic diagram illustrating exemplary frequency responses of a dual sound source in a far field when an auricle is located between two point sound sources of the dual sound source according to some embodiments of the present disclosure.

FIG. 7 is a schematic diagram illustrating exemplary frequency responses of a dual sound source in a near field when an auricle is located between two point sound sources of the dual sound source according to some embodiments of the present disclosure. FIG. 8 is a schematic diagram illustrating exemplary frequency responses of a dual sound source in a far field when an auricle is located between two point sound sources of the dual sound source according to some embodiments of the present disclosure. In the present disclosure, when the two point sound sources of the dual sound source are disposed on two sides of the auricle, the auricle may serve as a baffle, thus the auricle may also be referred to as a baffle for convenience. Merely by way of example, due to the existence of the auricle, a sound in the near field may be generated by the dual sound source with a distance D1 (also referred to as Mode 1). A sound in the far field may be generated by the dual sound source with a distance D2 (also referred to as Mode 2), and D1>D2. As shown in FIG. 7, for a low-frequency (e.g., a frequency less than 1000 Hz), a volume of the sounds in the near field (i.e., a sound heard by an ear of a user) may be the same as or similar to that in Mode 1 when the two point sound sources of the dual sound source are located on two sides of the auricle, which may be larger than a volume of a sound in the near field in Mode 2 and may be close to a volume of a sound in the near field of a single sound source. As the frequency increases (e.g., 2000 Hz-7000 Hz), the volume of the sounds in the near field in Mode 1 and generated by the two point sound sources of the dual sound source located on two sides of the auricle may be larger than that of the single sound source. It should be understood that, when the auricle is located between the two point sound sources of the dual sound source, the volume of the sound in the near field transmitted from a sound source to the ear may be effectively increased. As shown in FIG. 8, as the frequency increases, the volume of the sound leakage in the far field may be increased. When the two point sound sources of the dual sound source are located on two sides of the auricle, the volume of the sound leakage in the far field generated by the dual sound source may be substantially the same as the volume of the sound leakage in the far field in Mode 2, which may be less than the volume of the sound leakage in the far field in Mode 1 and the volume of the sound leakage in the far field generated by the single sound source. Therefore, when the auricle is located between the two point sound sources of the dual sound source, the sounds transmitted from the sound source to the far field may be effectively reduced, that is, the sound leakage from the sound source to the surroundings may be effectively reduced.

The specific meaning and related content of the sound leakage parameter mentioned above may refer to the following descriptions. In the application of the open binaural acoustic output device, the sound pressure $P_{ear}$ transmitted to the hearing position may be large enough to satisfy hearing requirements, and the sound pressure $P_{far}$ propagated to the far field may be small enough to reduce the sound leakage. Therefore, the sound leakage parameter α may be taken as an indicator to evaluate the capability of the acoustic output device for reducing the far-field sound leakage:

$$\alpha = \frac{|P_{far}|^2}{|P_{ear}|^2} \tag{4}$$

Figure 9:
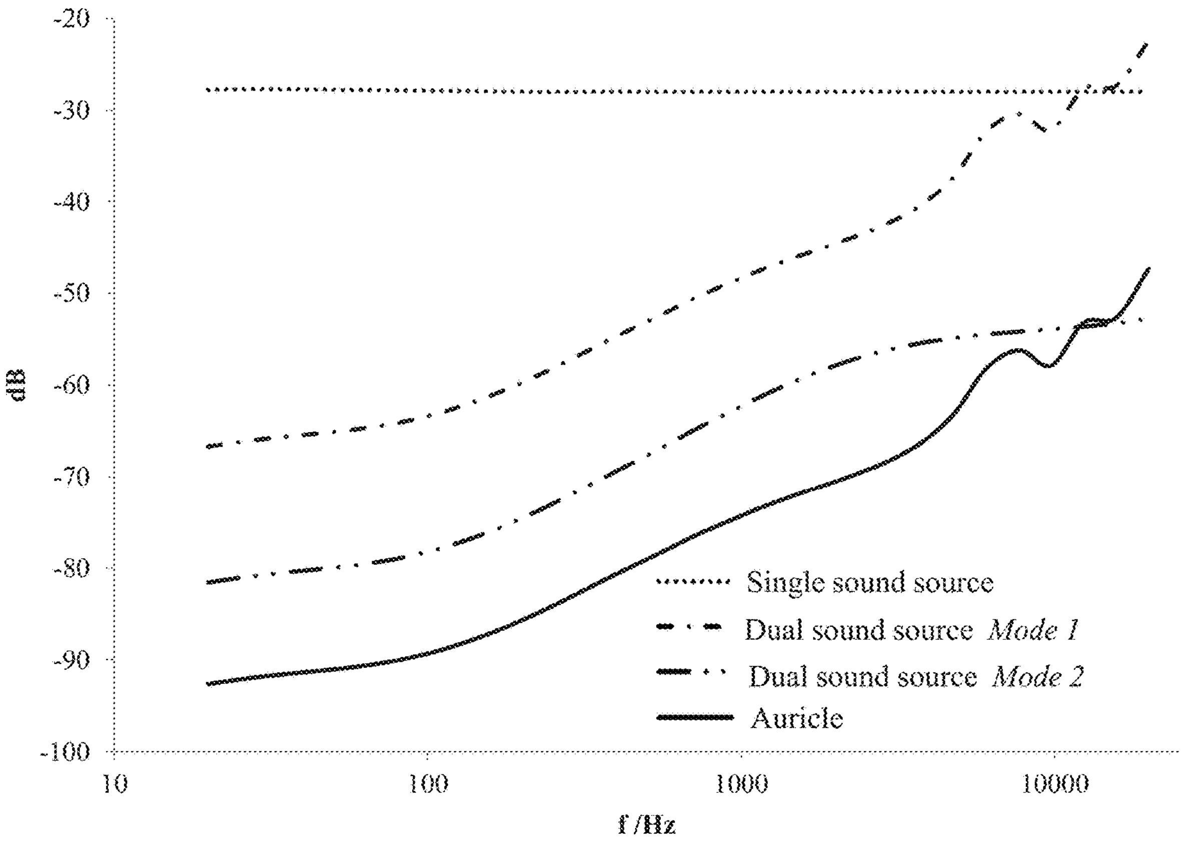
FIG. 9 is a schematic diagram illustrating exemplary frequency responses of a dual sound source when an auricle is located between two point sound sources of the dual sound source according to some embodiments of the present disclosure.

According to equation (4), the smaller the sound leakage parameter, the stronger the capacity of the acoustic output device for reducing the sound leakage, and in the case that the hearing volume is the same in the near field at the hearing position, the lower the sound leakage in the far field. As shown in FIG. 9, when the frequency is less than 10000 Hz, the sound leakage parameter when the two point sound sources of the dual sound source are located on the two sides of the auricle may be less than the sound leakage parameter in Mode 1 (in which there is no baffle disposed between the two point sound sources of the dual sound source, and the distance is $D_1$), Mode 2 (in which there is no baffle disposed between the two point sound sources of the dual sound source, and the distance is $D_2$), or a single sound source, which may indicate that the acoustic output device may have a better capability of reducing the sound leakage when the two point sound sources of the dual sound source are located on the two sides of the auricle.

Figure 10:
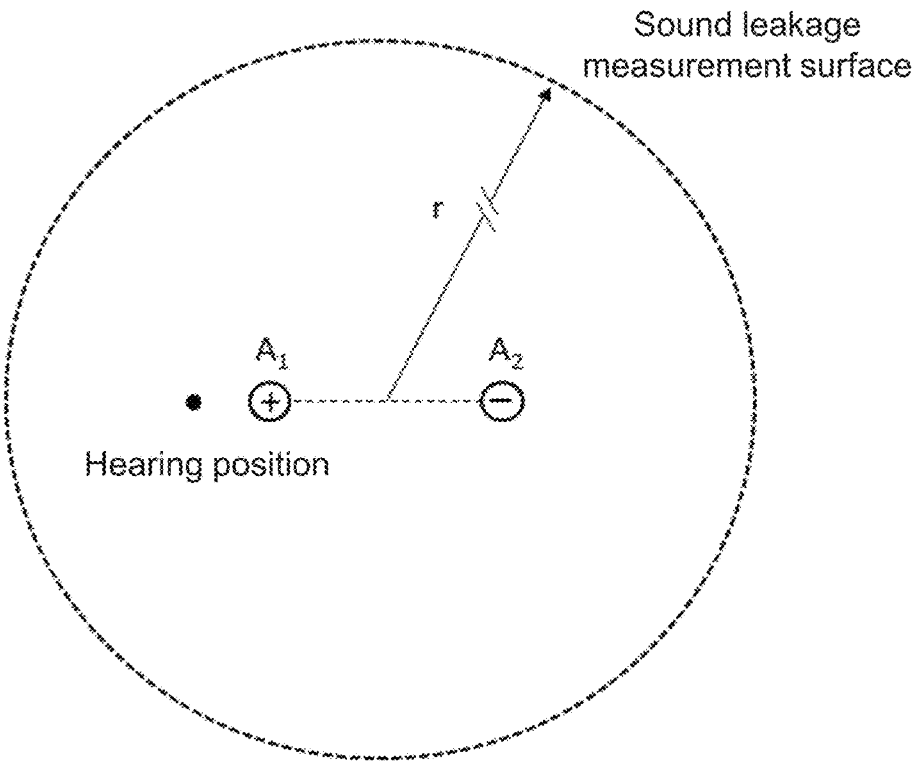
FIG. 10 is a schematic diagram illustrating an exemplary measurement of a sound leakage parameter according to some embodiments of the present disclosure.

FIG. 10 is a schematic diagram illustrating an exemplary measurement of a sound leakage parameter according to some embodiments of the present disclosure. As shown in FIG. 10, the hearing position may be located at the left of the point source $A_1$. A method for measuring the sound leakage may include selecting an average value of the sound pressure amplitudes of points located on a spherical surface with a center of the dual sound source (e.g., $A_1$ and $A_2$ as shown in FIG. 10) as a center and the radius r as a value of the sound leakage. It should be noted that the method for measuring the sound leakage in the embodiment is merely an example of the principle and effect, and not tended to limit the scope of the present disclosure. The method for measuring the sound leakage may also be adjusted according to an actual situation. For example, one or more points in the far field may be used to measure the sound leakage. As another example, the center of the dual sound source may be taken as a center of a circle, and two or more points may be uniformly taken in the far field according to a certain spatial angle. The sound pressure amplitudes of the points may be averaged as the value of the sound leakage. In some embodiments, a method for measuring a hearing sound may include selecting a position near the point sound source(s) as the hearing position, and an amplitude of a sound pressure measured at the hearing position as a value of the hearing sound. In some embodiments, the hearing position may be on a line connecting the two point sound sources of the dual sound source, or may not be on the line. The method for measuring the hearing sound may be reasonably adjusted according to the actual situation. For example, the sound pressure amplitudes of one or more other points of the near-field position may be averaged as the value of the hearing sound. As another example, one of the point sound sources may be taken as a center of a circle, and two or more points may be uniformly taken in the near field according to a certain spatial angle, the sound pressure amplitudes of the points may be averaged as the value of the hearing sound. In some embodiments, a distance between the hearing position in the near field and the point sound source(s) may be less than a distance between the point sound source(s) and the spherical surface.

It should be noted that a sound-guiding hole for outputting a sound regarded as a point sound source in the present disclosure may be only an example of the principle and effect, which may not limit the shape and size of the sound-guiding hole in practical applications. In some embodiments, a sound-guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without creative activities, it may be known that the sound generated by the structures such as the sound-guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without creative activities, it may be known that the acoustic effect achieved in a case in which a sound generated by an acoustic driver may propagate outward through at least two sound-guiding holes illustrated in the present disclosure may be achieved by other acoustic structures mentioned above, such as the sound generated by the at least one set of acoustic drivers may propagate outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein. The count of the sound-guiding holes (point sound source or surface sound source) on the acoustic output device is not limited to two, and the count of the sound-guiding holes may be three, four, five . . . , or the like, thereby forming a plurality of sets of dual sound sources or surface sound sources, or a set of multi-point sound sources or surface sound sources, which is not specifically limited herein and achieves the technical effects of the dual sound source in the present disclosure.

In order to further explain an effect on the acoustic output of the acoustic output device 100 with or without a baffle between the two point sound sources of the dual sound source or two sound-guiding holes, a volume of a sound at the hearing position in the near field and/or a volume of the sound leakage in the far field under different conditions may be described below.

Figure 11:
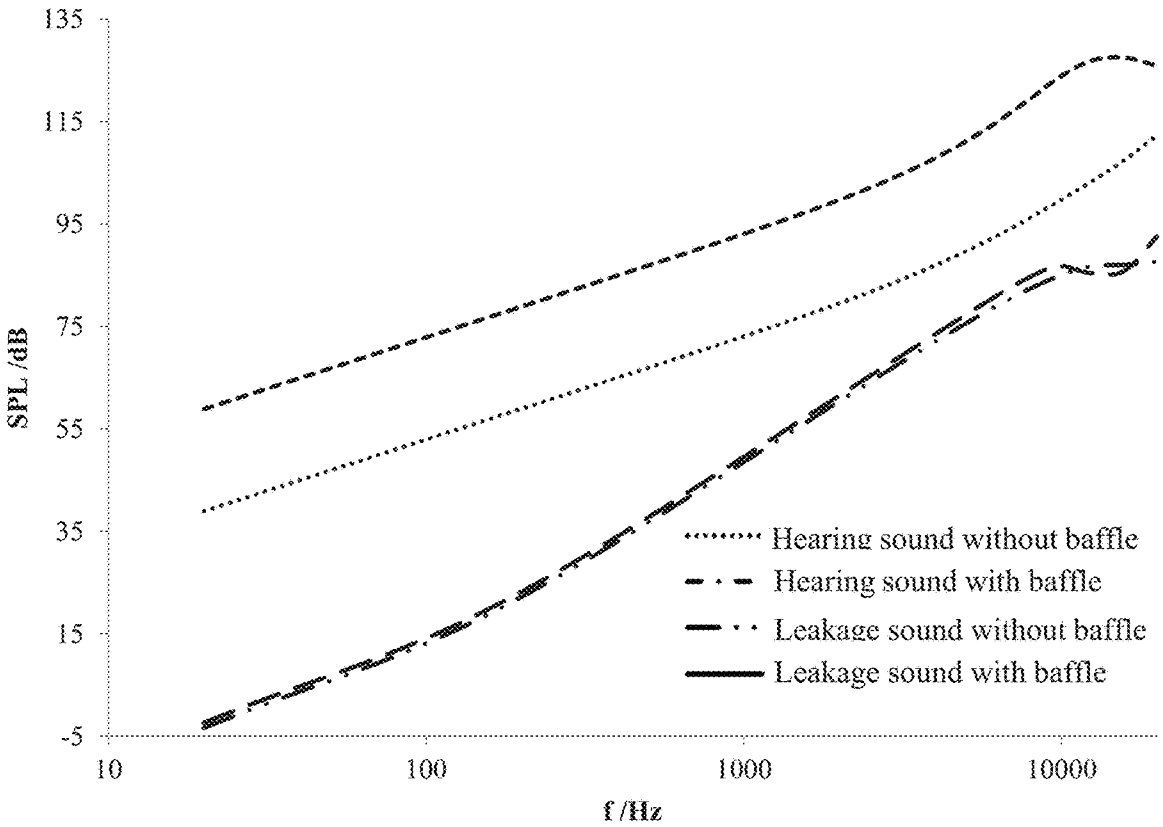
FIG. 11 is a schematic diagram illustrating exemplary frequency responses of a dual sound source with or without a baffle between the two point sound sources according to some embodiments of the present disclosure.

FIG. 11 is a schematic diagram illustrating exemplary frequency responses of a dual sound source with or without a baffle between the two point sound sources according to some embodiments of the present disclosure. As shown in FIG. 11, when the baffle is disposed between the two point sound sources (i.e., two sound-guiding holes) of the acoustic output device, a distance between the two point sound sources may be increased in the near field, and the volume of the sound at the hearing position in the near field may be equivalent to being generated by the dual sound source with a relatively large distance, thereby increasing the volume of the sound in the near field compared to a case without the baffle. In the far field, the interference of sound waves generated by the two point sound sources may not be significantly affected by the baffle. The sound leakage may be regarded as being generated by a set of dual sound sources with a relatively small distance, and the sound leakage may not be changed significantly with or without the baffle. The baffle disposed between the two sound-guiding holes (the dual sound source) may improve the performance of the acoustic output device by reducing the sound leakage, and increase the volume of the sound in the near field, thereby reducing requirements for a component that plays an acoustic role in the acoustic output device, simplifying a circuit structure of the acoustic output device, reducing electrical loss of the acoustic output device, and prolonging the working time of the acoustic output device.

Figure 12:
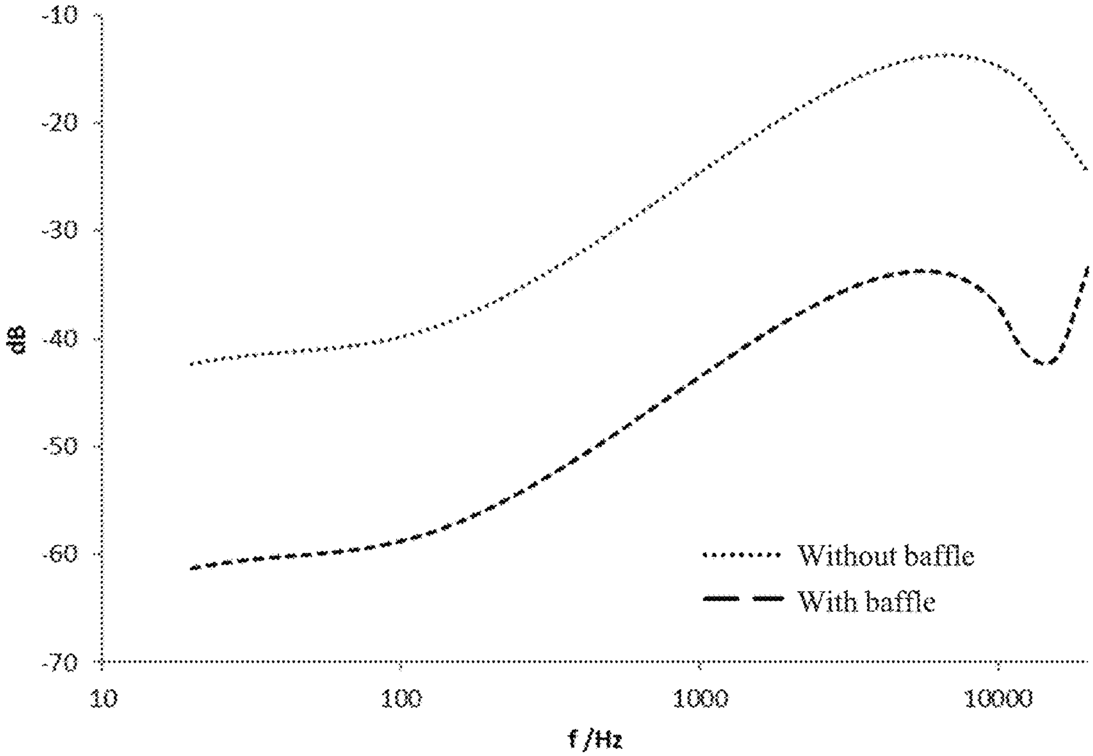
FIG. 12 is a schematic diagram illustrating exemplary frequency responses of a dual sound source with or without a baffle between the two point sound sources according to some embodiments of the present disclosure.

FIG. 12 is a schematic diagram illustrating exemplary frequency responses of a dual sound source with or without a baffle between the two point sound sources according to some embodiments of the present disclosure. As shown in FIG. 12, when a baffle is disposed between the two point sound sources of the dual sound source, the volume of the sound leakage may be significantly less than that of the dual sound source without a baffle, which indicates that the capability of the dual sound source with a baffle for reducing the sound leakage may be significantly larger than that of the dual sound source without the baffle.

Figure 13:
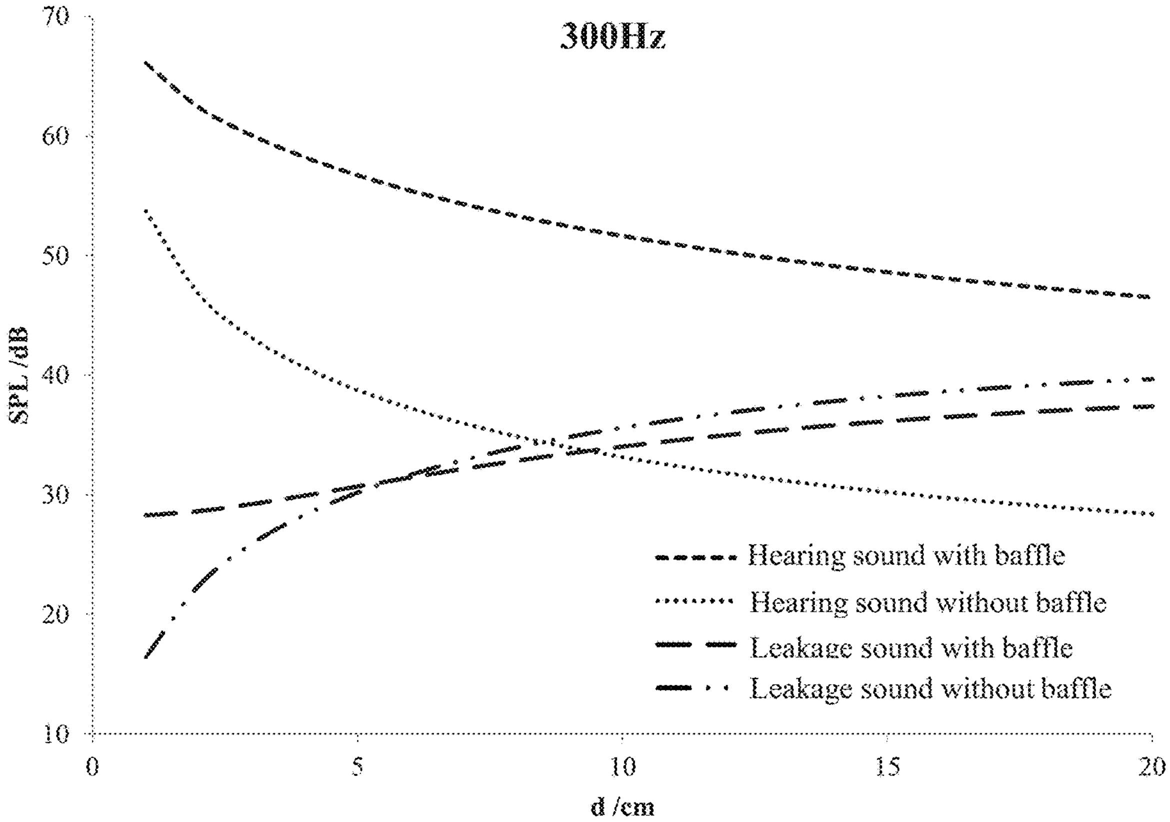
FIG. 13 is a schematic diagram illustrating exemplary sound pressure amplitudes of a dual sound source with different distances at a frequency of 300 Hz according to some embodiments of the present disclosure.
Figure 14:
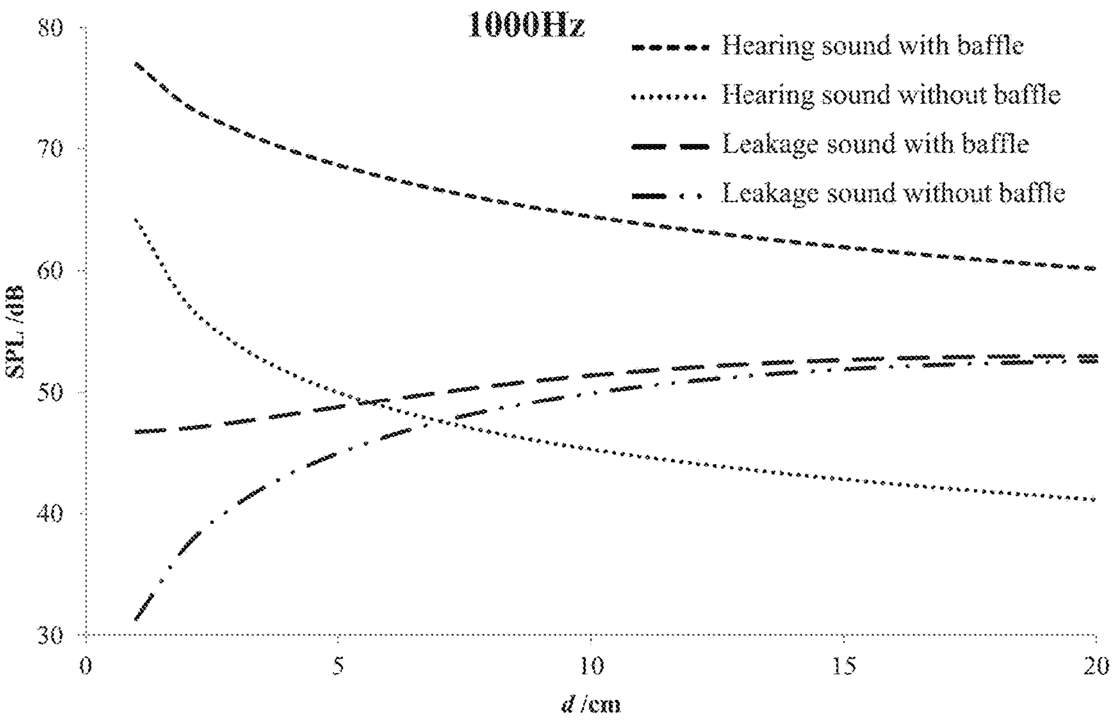
FIG. 14 is a schematic diagram illustrating exemplary sound pressure amplitudes of a dual sound source with different distances at a frequency of 1000 Hz according to some embodiments of the present disclosure.

FIG. 13 is a schematic diagram illustrating exemplary sound pressure amplitudes of a dual sound source with different distances at a frequency of 300 Hz according to some embodiments of the present disclosure. FIG. 14 is a schematic diagram illustrating exemplary sound pressure amplitudes of a dual sound source with different distances at a frequency of 1000 Hz according to some embodiments of the present disclosure. As shown in FIG. 13 and FIG. 14, in the near field, when the frequency is 300 Hz or 1000 Hz, a volume of the hearing sound when a baffle is disposed between the two point sound sources of the dual sound source may be larger than a volume of the hearing sound when the baffle is not arranged between the two point sound sources as the distance d of the dual sound source is increased. In this case, the baffle disposed between the two point sound sources of the dual sound source may effectively increase the volume of the hearing sound in the near field when the frequency is 300 Hz or 1000 Hz. In a far field, the volume of the sound leakage when the baffle is disposed between the two point sound sources of the dual sound source may be equivalent to the volume of the sound leakage when the baffle is not disposed between the two point sound sources of the dual sound source, which may indicate that the baffle disposed between the two point sound sources of the dual sound source may not affect the sound leakage in the far field when the frequency is 300 Hz or 1000 Hz.

Figure 15:
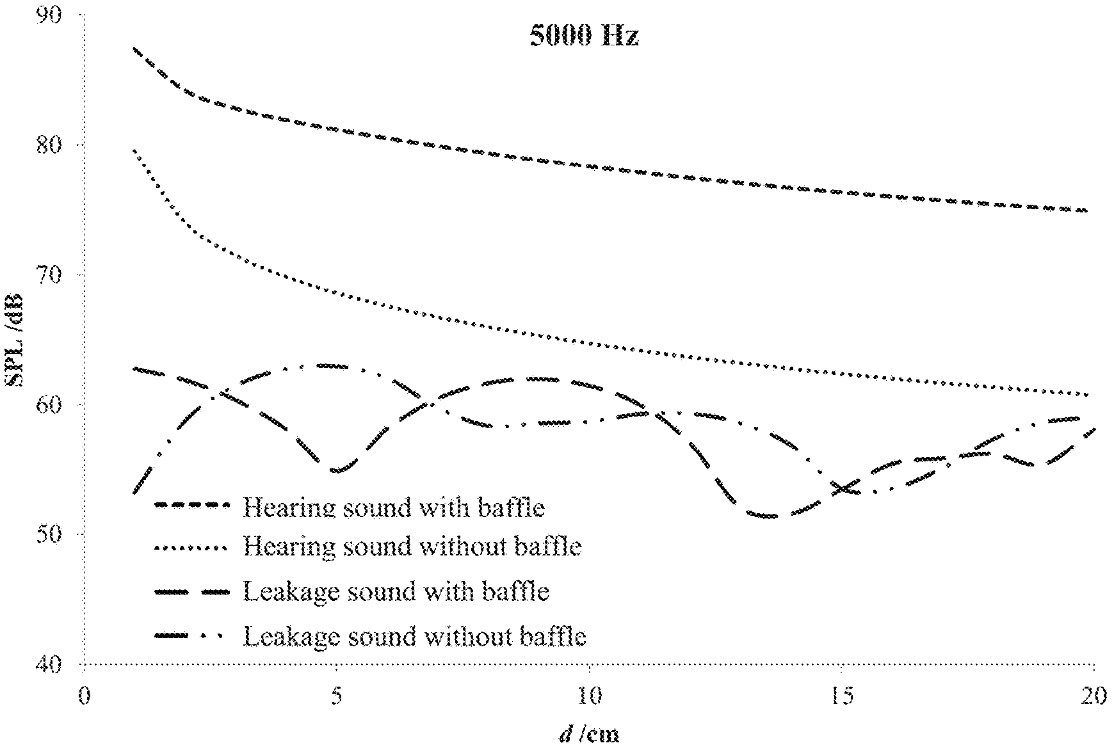
FIG. 15 is a schematic diagram illustrating exemplary sound pressure amplitudes of a dual sound source with different distances at a frequency of 5000 Hz according to some embodiments of the present disclosure.

FIG. 15 is a schematic diagram illustrating exemplary sound pressure amplitudes of a dual sound source with different distances at a frequency of 5000 Hz according to some embodiments of the present disclosure. As shown in FIG. 15, in the near field, when the frequency is 5000 Hz, a volume of the hearing sound when a baffle is disposed between the two point sound sources of the dual sound source may be larger than a volume of the hearing sound when the baffle is not disposed between the two point sound sources of the dual sound source as the distance d of the dual sound source is increased. In the far field, the volume of the sound leakage of the dual sound source may be fluctuant as a function of the distance d when the baffle is disposed or not disposed between the two point sound sources of the dual sound source. Overall, whether the baffle is disposed between the two point sound sources of the dual sound source may have little effect on the sound leakage in the far field.

Figure 16:
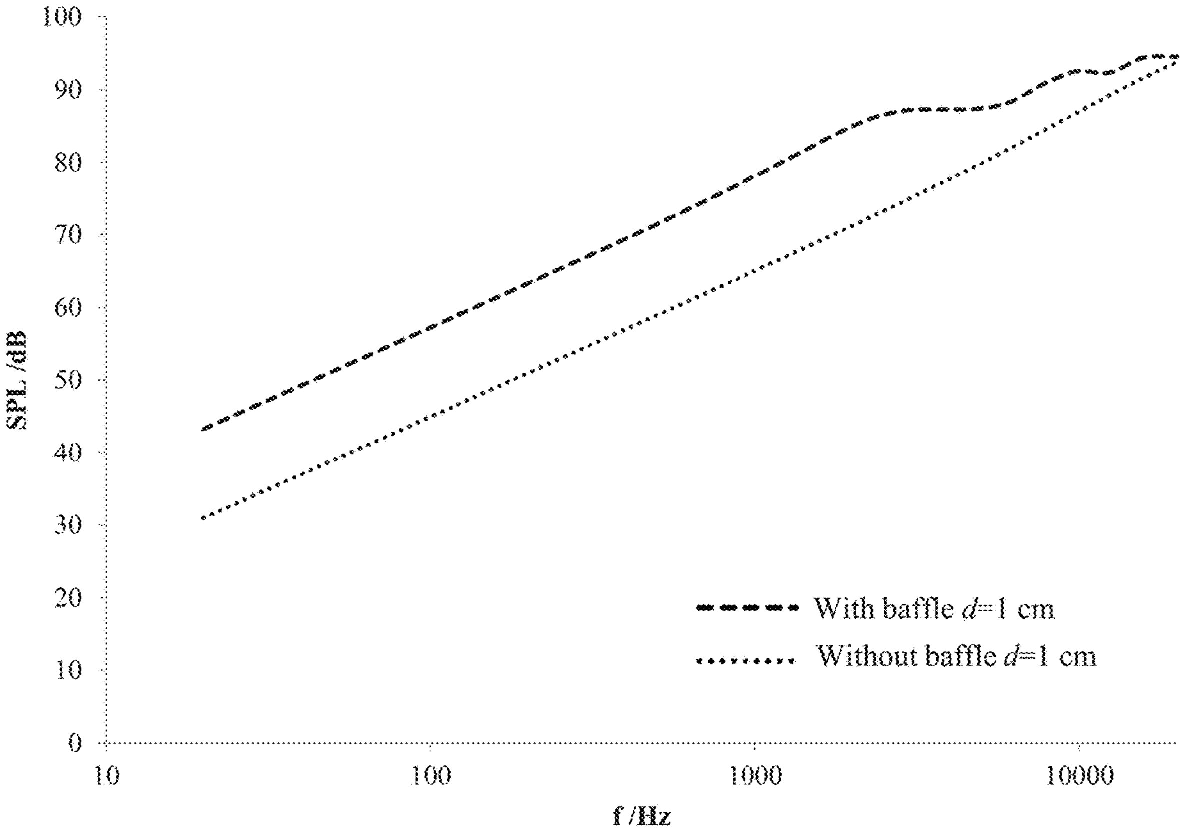
FIG. 16 is a schematic diagram illustrating exemplary frequency responses of a dual sound source with a distance d of 1 cm in a near field according to some embodiments of the present disclosure.
Figure 17:
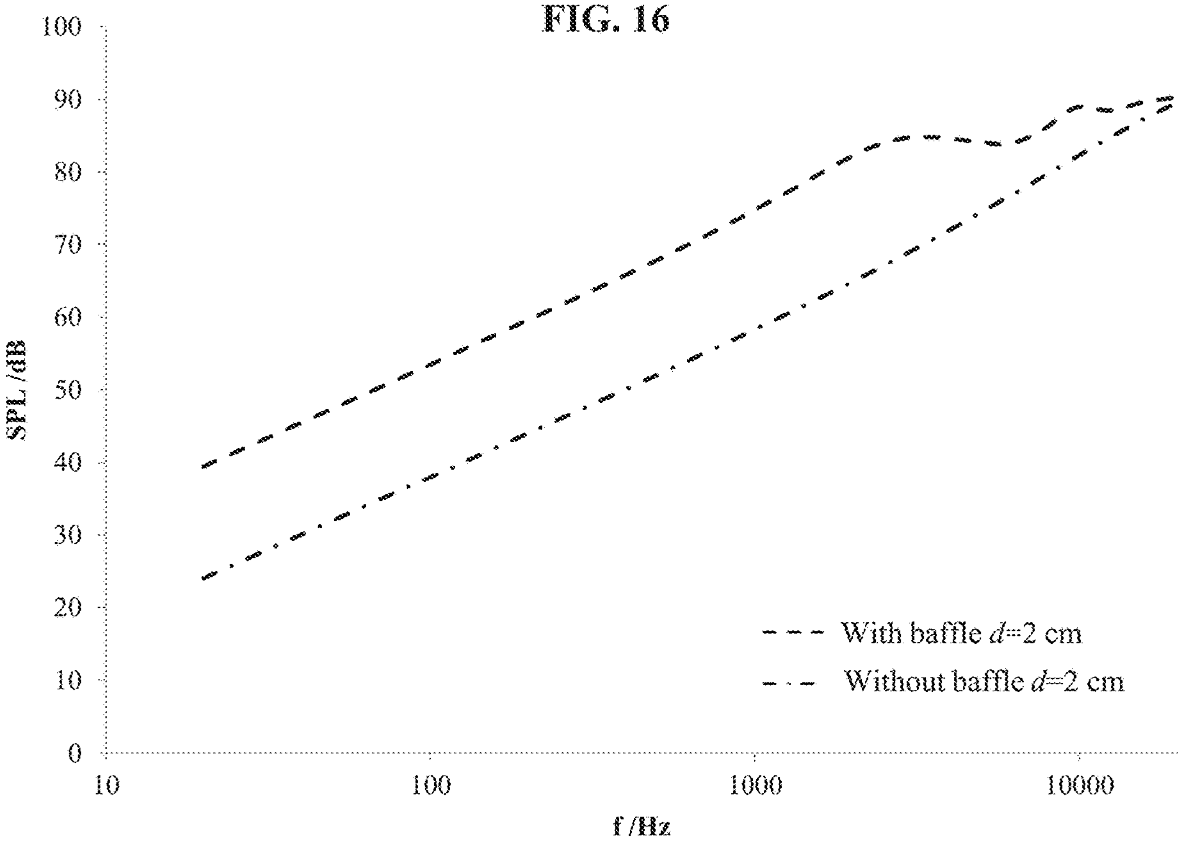
FIG. 17 is a schematic diagram illustrating exemplary frequency responses of a dual sound source with a distance d of 2 cm in a near field according to some embodiments of the present disclosure.
Figure 18:
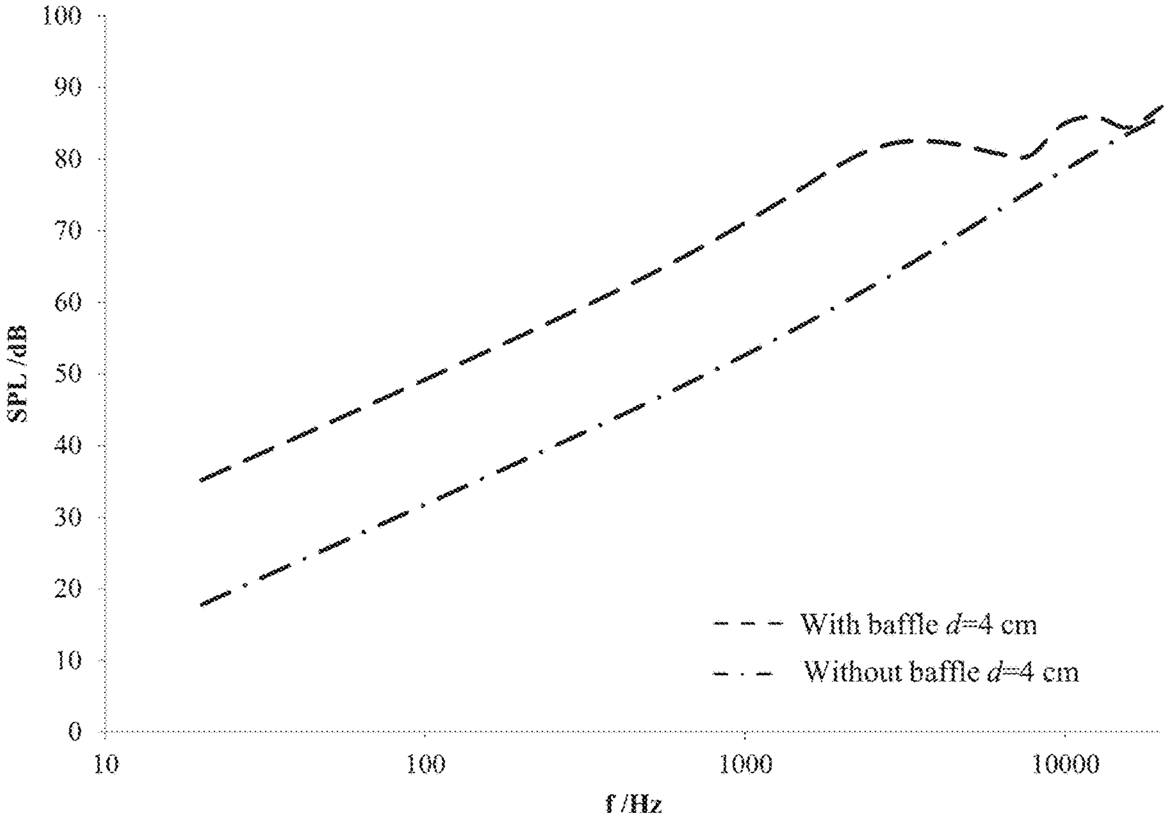
FIG. 18 is a schematic diagram illustrating exemplary frequency responses of a dual sound source with a distance d of 4 cm in a near field according to some embodiments of the present disclosure.
Figure 19:
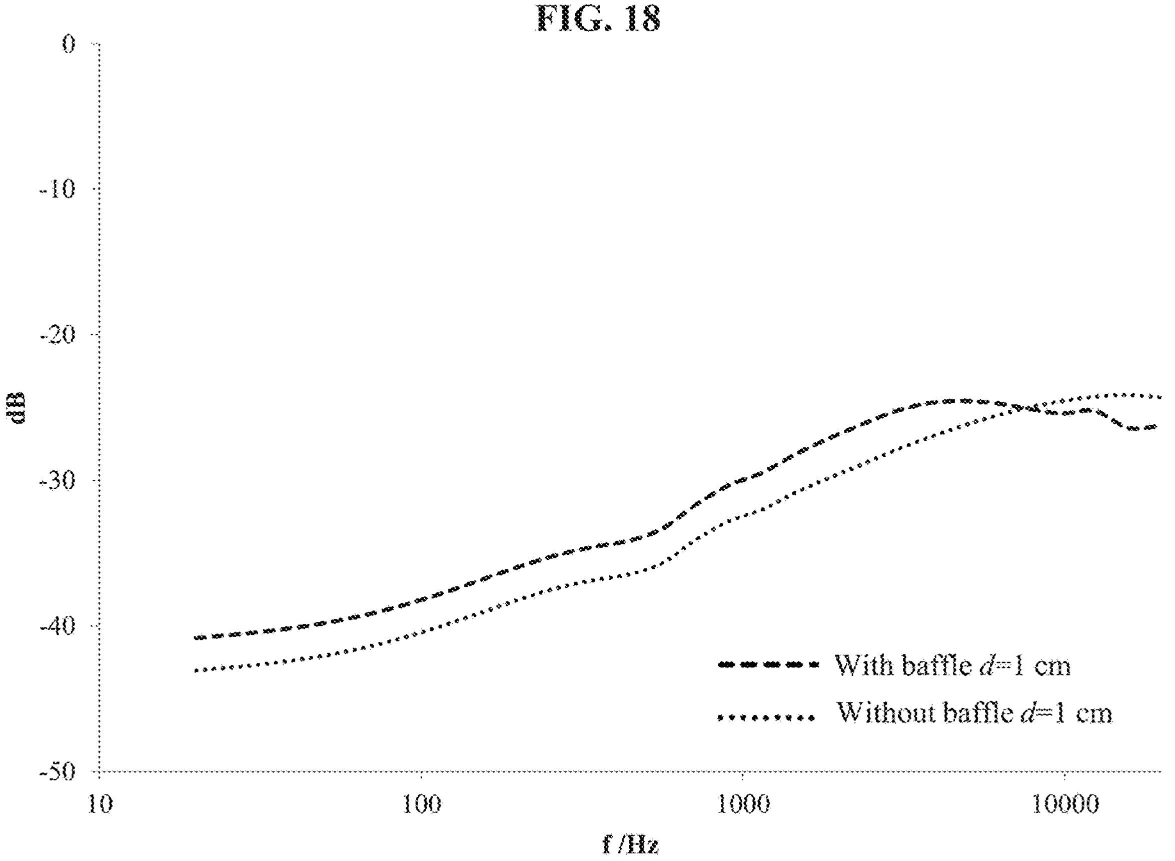
FIG. 19 is a schematic diagram illustrating exemplary sound leakage parameters of a dual sound source with a distance d of 1 cm in a far field according to some embodiments of the present disclosure.
Figure 20:
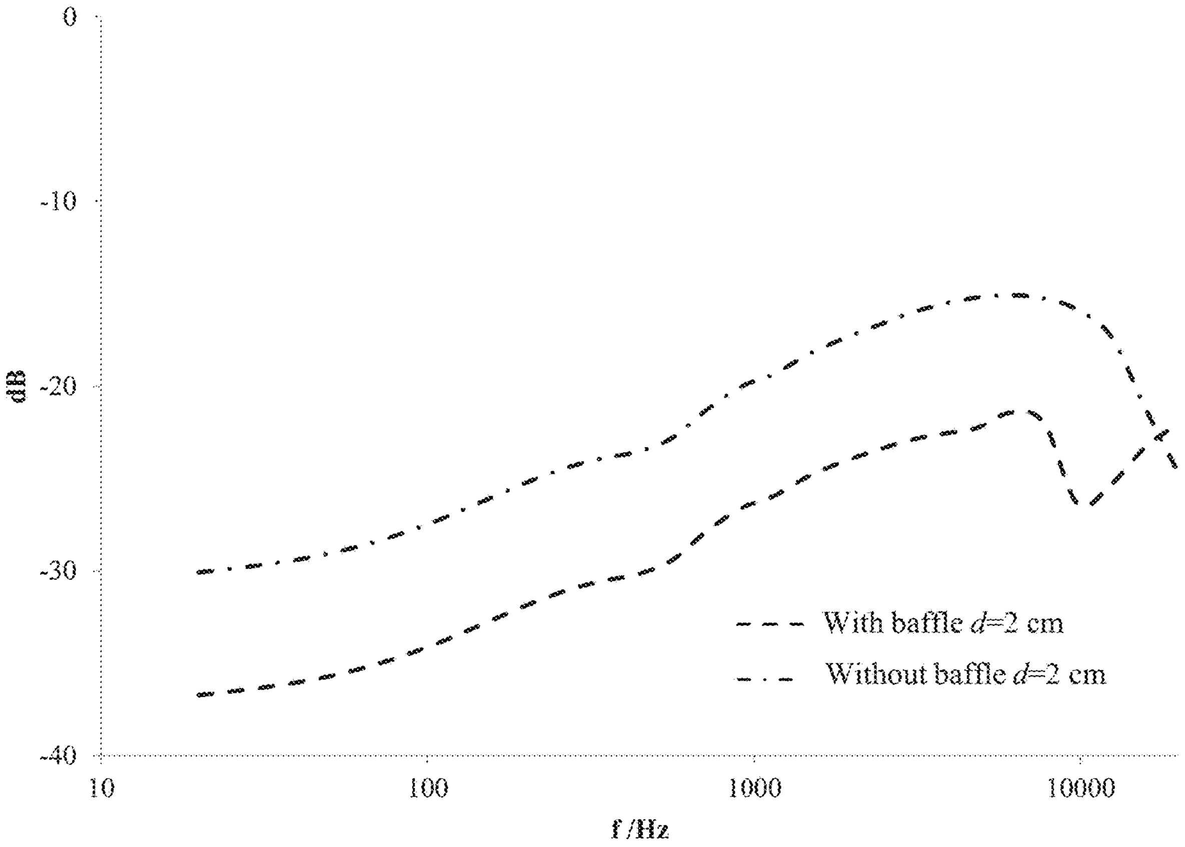
FIG. 20 is a schematic diagram illustrating exemplary sound leakage parameters of a dual sound source with a distance d of 2 cm in a far field according to some embodiments of the present disclosure.
Figure 21:
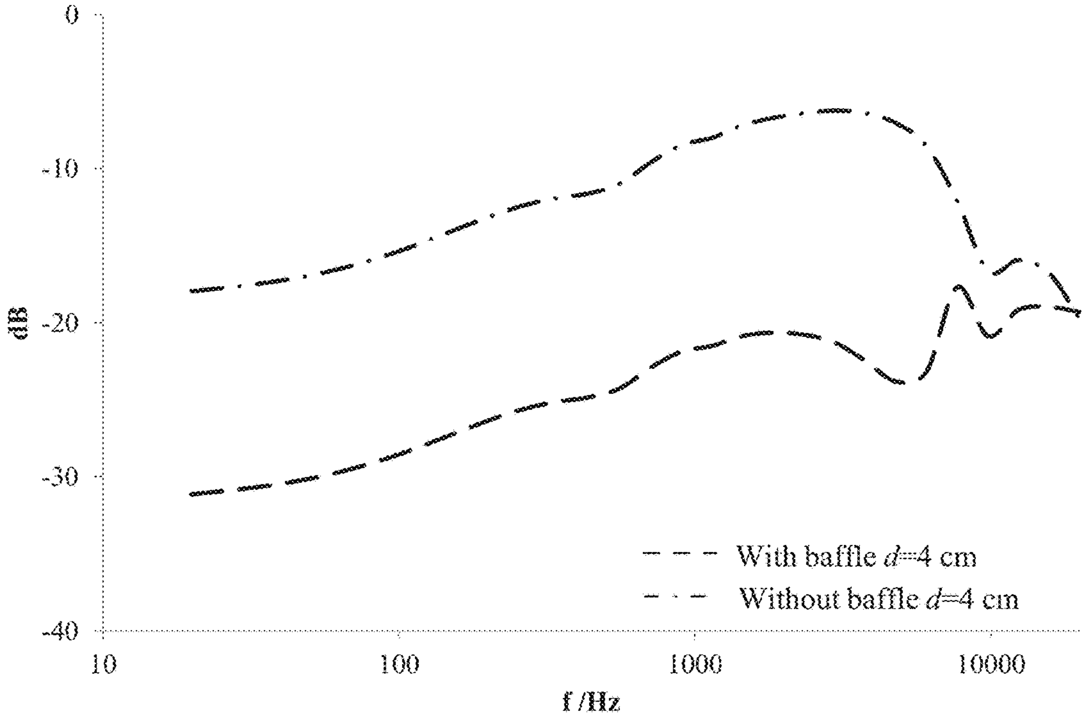
FIG. 21 is a schematic diagram illustrating exemplary sound leakage parameters of a dual sound source with a distance d of 4 cm in a far field according to some embodiments of the present disclosure.

FIG. 16 is a schematic diagram illustrating exemplary frequency responses of a dual sound source with a distance d of 1 cm in a near field according to some embodiments of the present disclosure. FIG. 17 is a schematic diagram illustrating exemplary frequency responses of a dual sound source with a distance d of 2 cm in a near field according to some embodiments of the present disclosure. FIG. 18 is a schematic diagram illustrating exemplary frequency responses of a dual sound source with a distance d of 4 cm in a near field according to some embodiments of the present disclosure. FIG. 19 is a schematic diagram illustrating exemplary sound leakage parameters of a dual sound source with a distance d of 1 cm in a far field according to some embodiments of the present disclosure. FIG. 20 is a schematic diagram illustrating exemplary sound leakage parameters of a dual sound source with a distance d of 2 cm in a far field according to some embodiments of the present disclosure. FIG. 21 is a schematic diagram illustrating exemplary sound leakage parameters of a dual sound source with a distance d of 4 cm in a far field according to some embodiments of the present disclosure. As shown in FIGS. 16-19, for different distances d (e.g., 1 cm, 2 cm, 4 cm) between the sound-guiding holes, at a certain frequency, in a hearing position in the near field (e.g., a user's ear), a volume of a sound generated by two sound-guiding holes which are disposed on two sides of the auricle (i.e., in the case of "without baffle" shown in the figures) may be larger than a volume of a sound generated by the two sound-guiding holes which are not disposed on the two sides of the auricle. The certain frequency may be below 10000 Hz, 5000 Hz, or 1000 Hz.

As shown in FIGS. 19-21, for different distances d (e.g., 1 cm, 2 cm, 4 cm, etc.) between the sound-guiding holes, at a certain frequency, in the far field (e.g., a position away from a user's ear), a volume of the sound leakage generated by the two sound-guiding holes which are disposed on two sides of an auricle may be less than that generated by the two sound-guiding holes which are not disposed on two sides of the auricle. It should be noted that as the distance between the two sound-guiding holes or the dual sound source increases, the interference cancellation of a sound at a position in the far field may be weakened, the sound leakage in the far field may be increased, and the ability for reducing the sound leakage may be reduced. The distance d between the two sound-guiding holes or the dual sound source may not be larger than a distance threshold. In some embodiments, the distance between the two sound-guiding holes may be set to be not less than 1 cm to increase the volume in the near field and reduce the sound leakage in the far field. In some embodiments, the distance may be set to be less than 20 cm. In some embodiments, the distance may be set to be less than 12 cm. In some embodiments, the distance may be set to be less than 10 cm. In some embodiments, the distance may be set to be less than 6 cm. In some embodiments, considering the size of the acoustic output device and a structural requirement for the sound-guiding hole(s), the distance d between the two sound-guiding holes may be set to be not less than 1 cm and not larger than 12 cm. In some embodiments, the distance d may be set to be not less than 1 cm and not larger than 10 cm. In some embodiments, the distance d may be set to be not less than 1 cm and not larger than 8 cm. In some embodiments, the distance d may be set to be not less than 1 cm and not larger than 6 cm. In some embodiments, the distance d may be set to be not less than 1 cm and not larger than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound-guiding holes may be disposed on two sides of the auricle. The count of the plurality of sound-guiding holes disposed on each of the two sides of the auricle may be the same or different. For example, the count of sound-guiding holes disposed on one side of the auricle may be two, and the count of sound-guiding holes disposed on the other side may be two or three. These modifications and changes may still be within the protection scope of the present disclosure.

In some embodiments, for a certain distance of the dual sound source, a relative position of the hearing position to the dual sound source may affect the volume of the sound in the near field and the sound leakage in the far field. To improve the acoustic output performance of the acoustic output device, in some embodiments, the acoustic output device may include at least two sound-guiding holes. The at least two sound-guiding holes may include two sound-guiding holes which may be disposed on a front side and/or a rear side of the auricle of a user, respectively. In some embodiments, a sound propagated from the sound-guiding hole disposed on the rear side of the auricle may bypass the auricle to the user's ear canal, and an acoustic route between the sound-guiding hole disposed on the front side of the auricle and the ear canal (i.e., an acoustic distance from the sound-guiding hole to an ear canal entrance) may be shorter than an acoustic route between the sound-guiding hole arranged on the rear side of the auricle and the ear canal.

According to an actual application scenario of the acoustic output device, the user's auricle may be served as a baffle. In this case, the two sound-guiding holes on the acoustic output device may be arranged on the front side and the rear side of the auricle, respectively, and an ear canal may be located between the two sound-guiding holes as a hearing position. In some embodiments, a distance between the sound-guiding hole on the front side of the auricle and the ear canal may be smaller than a distance between the sound-guiding hole on the rear side of the auricle and the ear canal by adjusting positions of the two sound-guiding holes on the acoustic output device. In this case, the acoustic output device may produce a relatively large sound amplitude at the ear canal since the sound-guiding hole on the front side of the auricle is close to the ear canal. The sound amplitude formed by the sound-guiding hole on the rear side of the auricle may be smaller at the ear canal, which may reduce the interference cancellation of the sounds from the two sound-guiding holes at the ear canal, thereby providing a relatively large volume of the hearing sound at the ear canal. In some embodiments, the acoustic output device may include one or more contact points (e.g., "an inflection point" on the housing structure to match a shape of the ear) which may contact with the auricle when the acoustic output device is worn. The contact point(s) may be located on the connection of the two sound-guiding holes or on one side of the two sound-guiding holes. A ratio of a distance between the sound-guiding hole arranged on the front side of the auricle and the contact point(s) and a distance between the sound guiding hole arranged on the rear side of the auricle and the contact point(s) may be 0.05-20, 0.1-10, 0.2-5, 0.4-2.5, or the like.

It should be noted that an acoustic route from an acoustic driver to a sound-guiding hole in the acoustic output device may affect the volume of the sound in the near field and the sound leakage in the far field. The acoustic route may be changed by adjusting a length of a chamber between a vibration diaphragm in the acoustic output device and the sound-guiding hole. In some embodiments, the acoustic driver may include the vibration diaphragm. A front side and a rear side of the vibration diaphragm may be coupled to two sound-guiding holes through a front chamber and a rear chamber, respectively. The acoustic route from the vibration diaphragm to each of the two sound-guiding holes may be different. In some embodiments, a ratio of the acoustic route from the vibration diaphragm to one of the two sound-guiding holes to the acoustic route from the vibration diaphragm to another of the two sound-guiding holes may be 0.5-2. In some embodiments, the ratio may be 0.6-1.5. In some embodiments, the ratio may be 0.8-1.2.

In some embodiments, when the two sound-guiding holes transmit sounds with opposite phases, amplitudes of the sounds may be adjusted to improve the output performance of the acoustic output device. Specifically, the amplitude of the sound transmitted by each of the two sound-guiding holes may be adjusted by adjusting an impedance of an acoustic route between the sound-guiding hole and an acoustic driver. In some embodiments, the impedance may refer to a resistance that an acoustic wave overcomes when the acoustic wave is transmitted in a medium. In some embodiments, the acoustic route may be or may not be filled with a damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound-guiding holes may be adjusted to change the acoustic resistance of the acoustic route. In some embodiments, a ratio of acoustic impedances between the acoustic driver (e.g., the vibration diaphragm of the acoustic driver) and the two sound-guiding holes may be 0.5-2. In some embodiments, the ratio may be 0.8-1.2.

It should be noted that the above descriptions are merely for illustration purposes, and not intended to limit the present disclosure. It should be understood that for those skilled in the art, after understanding the principle of the present disclosure, various modifications and changes may be made in the forms and details of the acoustic output apparatus without departing from this principle. For example, the hearing position may not be on the line connecting the dual sound source, but may also be above, below, or in an extension direction of the line connecting the dual sound source. As another example, a method for measuring the interval between a point sound source and the auricle, and a method for measuring the height of the auricle may also be adjusted according to different conditions. These similar changes may be all within the protection scope of the present disclosure.

Figure 22:
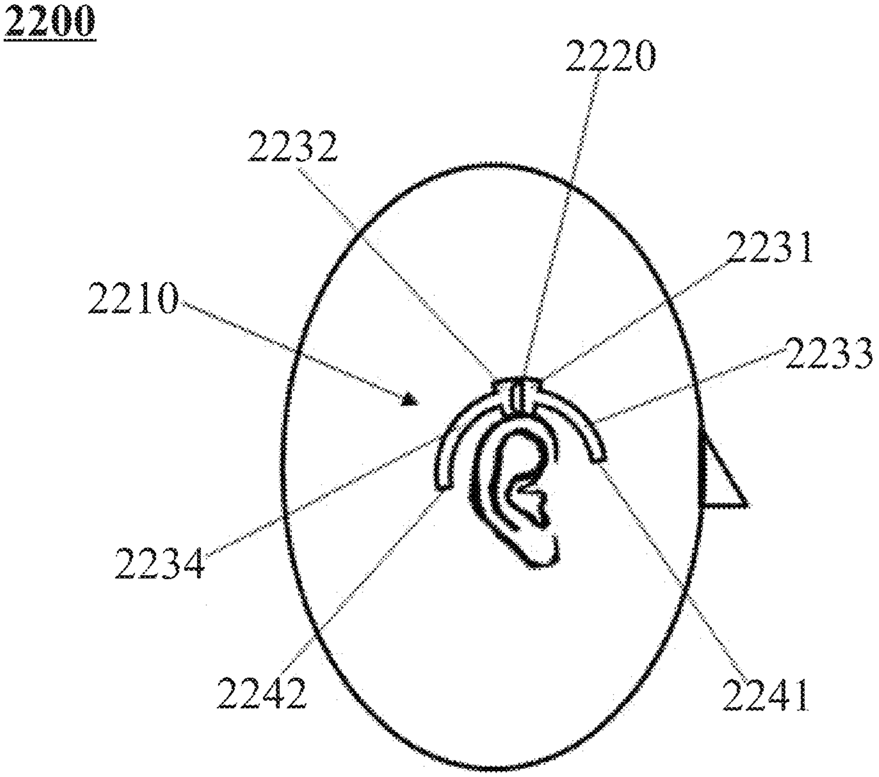
FIG. 22 is a diagram illustrating an exemplary acoustic output device according to some embodiments of the present disclosure.

FIG. 22 is a diagram illustrating an exemplary acoustic output device according to some embodiments of the present disclosure. As shown in FIG. 22, the acoustic output device 2200 may include a housing structure 2210 and an acoustic driver 2220 arranged in the housing structure 2210. In some embodiments, the acoustic output device 2200 may be worn on the user's body (e.g., e.g., the head, the neck, the upper torso, etc. of the user) through the housing structure 2210. The housing structure 2210 and the acoustic driver 2220 may be close to and not block the user's ear canal. The user's ear may be in an open state. The user may hear sounds output from the acoustic output device 2200 and sounds from an external source. For example, the acoustic output device 100 may be arranged around or partially around the user's ear and may transmit the sounds via an air conduction manner or a bone conduction manner.

The housing structure 2210 may be configured to be worn on the body of the user and carry the acoustic driver 2220. In some embodiments, the housing structure 2210 may include an enclosed shell structure with an internal hollow, and the acoustic driver 2220 may be arranged in the housing structure 2210. In some embodiments, the housing structure 2210 may include a cavity. The acoustic driver 2220 may be arranged in the cavity and divide the cavity into a first cavity 2231 (also referred to as a front cavity) and a second cavity 2232 (also referred to as a rear cavity). In some embodiments, the housing structure 2210 may include a first sound-guiding tube 2233 and a second sound-guiding tube 2234. One end of the first sound-guiding tube 2233 may be acoustically coupled to the first cavity 2231, and one end of the second sound-guiding tube 2234 may be acoustically coupled to the second cavity 2232. The other end of the first sound-guiding tube 2233 and the other end of the second sound-guiding tube 2234 may be arranged on two sides of the auricle, respectively. In some embodiments, a volume of the front cavity or the rear cavity in which the acoustic driver 2220 is located may satisfy a certain requirement. For example, the front cavity or the rear cavity may provide sufficient volume to accommodate coils, magnets, and a corresponding supporting structure of the acoustic driver 2220. In this case, the front cavity or the rear cavity may have a larger sectional area than that of the corresponding sound-guiding tube. As another example, a volume size of the front cavity or the rear cavity may correspond to a particular resonance peak, which may affect the sounds generated by the acoustic driver 2220 on two sides of the vibration diaphragm. The sound transmitted by the first sound-guiding tube 2233 may propagate outward through a first sound output position 2241, and the sound transmitted by the second sound-guiding tube 2234 may propagate outward through a second sound output position 2242. The first sound output position 2241 and the second sound output position 2242 may be one or more sound-guiding holes arranged on the acoustic sound-guiding tube. The sounds output through the first sound output position 2241 and the second sound output position 2242 may form a dual sound source (a dual sound source or/and a dual sound radiating surface described elsewhere in the present disclosure). In some embodiments, the other end of the first sound-guiding tube 2233 and the other end of the second sound-guiding tube 2234 may also be arranged on the same side of the auricle (e.g., the front side or the rear side of the auricle).

It should be understood that the above descriptions of the acoustic output device 2200 are merely for illustration. For those skilled in the art, adjustments to the structure described above may be performed without departing from the principles, and the adjusted structure is still within the scope of the present disclosure. For example, the sound-guiding tubes in the acoustic output device 2200 may not be limited to the first sound-guiding tube 2233 and the second sound-guiding tube 2234 in FIG. 22. The acoustic output device 2200 may include other sound-guiding tubes such as a third sound-guiding tube and a fourth sound-guiding tubes. The specific count of the sound-guiding tube may be determined according to an actual situation, which is not limited herein.

In some embodiments, when the first sound output position 2241 and the second sound output position 2241 transmit the sounds with opposite phases, amplitudes of the sounds may be adjusted to improve the output performance of the acoustic output device. For example, the sound output from the sound-guiding hole on the front side of the auricle (i.e., the first sound output position 2241) may have a larger amplitude, and the sound output from the sound-guiding hole on the rear side of the auricle (i.e., the second sound output position 2240) may have a smaller amplitude. The amplitudes of the sounds output from the two sound output positions may have a larger difference at the ear canal, which may reduce the interference cancellation of the sounds propagated from the two sound output positions at the ear canal, thereby providing sound with a relatively large volume at the ear canal.

Figure 23:
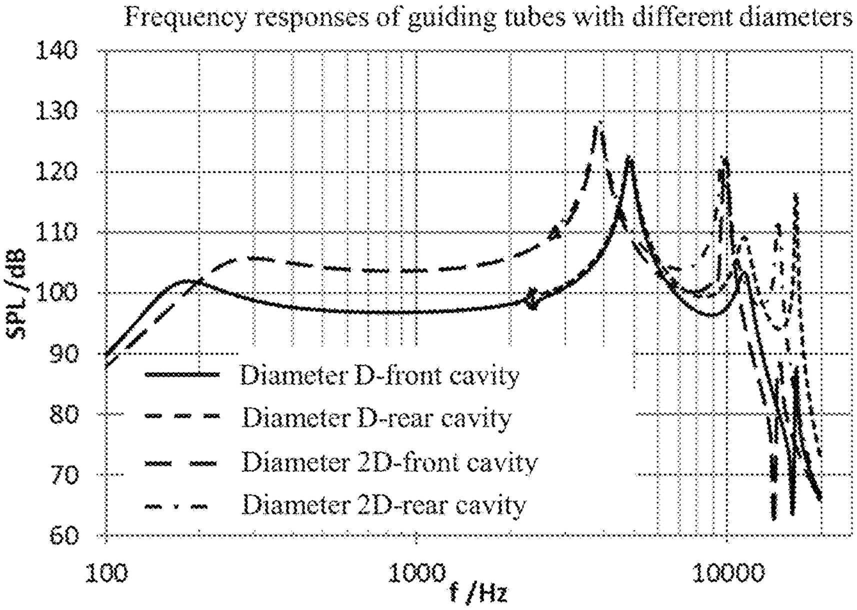
FIG. 23 is a schematic diagram illustrating exemplary frequency responses of sound-guiding tubes with different diameters according to some embodiments of the present disclosure.

In some embodiments, the volume of the first sound-guiding tube 2233 and the volume of the second sound-guiding 2234 may not be ignored when the sectional areas or diameters of the first sound-guiding tube 2233 and the second sound-guiding tube 2234 are large. When a sound wave passes through the first sound-guiding tube 2233 and the second sound-guiding tube 2234, an additional sound mass may be generated such that the first sound-guiding tube 2233 and the second sound-guiding tube 2234 may resonate with the cavity accommodating the acoustic driver 2220. The resonance may be shown as a resonance peak in a frequency response curve. In some embodiments, the additional sound mass may be an air equivalent mass that is pushed when the vibration diaphragm vibrates to generate sound waves. It should be understood that the vibration diaphragm may push the air to generate sound waves. The air may have a certain mass. The equivalent mass of the air being pushed may be the additional sound mass. As shown in FIG. 23, the curves corresponding to the "Diameter D-front cavity" and "Diameter 2D-front cavity" may indicate the frequency responses of the first sound-guiding tube 2233 when the diameters of the first sound-guiding tube 2233 are "D" and "2D", respectively. The curves corresponding to the "Diameter D-rear cavity" and "Diameter 2D-rear cavity" may indicate the frequency responses of the second sound-guiding tube 2234 when the diameters of the second sound-guiding tube 2234 are "D" and "2D", respectively. When the diameters of the first sound-guiding tube 2233 and the second sound-guiding tube 2234 increase from "D" to "2D", the frequencies of the resonance peaks generated by the sound-guiding tubes may move to the low-frequency region. In order to prevent the sound-guiding tubes from generating resonance peaks in the low-frequency region, which affects the frequency responses of the acoustic output device in the medium and low frequency (e.g., when the acoustic output device generates a low-frequency resonance peak, the frequency response at the corresponding frequency may not be flat), the diameters (or sectional areas) of the first sound-guiding tube 2233 and/or the second sound-guiding tube 2234 may not be too large. In some embodiments, the sectional areas of the first sound-guiding tube 2233 and the second sound-guiding tube 2234 may be not larger than 400 $mm^2$ (the diameter may be about 20 mm). In some embodiments, the sectional areas of the first sound-guiding tube 2233 and the second sound-guiding tube 2234 may be not larger than 100 $mm^2$ (the diameter may be about 10 mm). In some embodiments, the sectional areas of the first sound-guiding tube 2233 and the second sound-guiding tube 2234 may be not larger than 25 $mm^2$ (the diameter may be about 5 mm). In some embodiments, the sectional areas of the first sound-guiding tube 2233 and the second sound-guiding tube 2234 may be not larger than 9 $mm^2$ (the diameter may be about 3 mm).

In some embodiments, when the diameter of the sound-guiding tube is small, a friction force and a viscous force inside the sound-guiding tube may suppress the propagation of the sounds. In such cases, the diameter of the sound-guiding tube may not be too small. In some embodiments, the sectional areas of the first sound-guiding tube 2233 and the second sound-guiding tube 2234 may be not less than 0.25 $mm^2$ (the diameter may be about 0.5 mm). In some embodiments, the sectional areas of the first sound-guiding tube 2233 and the second sound-guiding tube 2234 may be not less than 0.5 $mm^2$ (the diameter may be about 0.7 mm). In some embodiments, the sectional areas of the first sound-guiding tube 2233 and the second sound-guiding tube 2234 may be not less than 1 $mm^2$ (the diameter may be about 1 mm). It should be noted that the descriptions about the diameters of the first sound-guiding tube 2233 and the second sound-guiding tube 2234 may be an approximate value given that a section of the sound-guiding tube is circular. In an actual scene, the shape of the sound-guiding tube may not be limited to the circular tube, the sound-guiding tube may also be an elliptical tube, a semi-circular tube, or the like, which is not limited herein. In some embodiments, the first sound-guiding tube 2233 and the second sound-guiding tube 2234 may have the same or different sectional areas. For example, when two sound-guiding tubes have different sectional areas, the frequency responses corresponding to the two sound-guiding tubes may be different, and the acoustic impedances on two sides of the acoustic driver 2220 may be different. The degree of suppression/enhancement of the sounds with specific frequency bands may be different in the two sound-guiding tubes, which may increase the volumes of the sounds with the specific frequency bands at the hearing position. In some scenarios, damping materials (e.g., a tuning net, tuning cotton, etc.) may be provided in the sound-guiding tube to increase the volumes of the sounds with the specific frequency bands at the hearing position.

In some embodiments, the length and the aspect ratio of the sound-guiding tube may also affect the sounds output by the acoustic driver 2220. In such cases, the sounds output by the acoustic driver 2220 may be adjusted by adjusting the length and aspect ratio of the first sound-guiding tube 2233 and/or the second sound-guiding tube 2234. In some embodiments, the aspect ratio may refer to a ratio of the length to the diameter of the sound-guiding tube. A change of the sound pressure of the sounds output by the acoustic driver 2220 may refer to Equation (5):

$$|P| = |P_0| \exp(-\alpha L) \tag{5}$$

where $P_0$ is a sound pressure of a sound source, L is a tube length, $\alpha$ satisfies Equation (6):

$$\alpha = \frac{1}{ac_0}\sqrt{\frac{\omega}{2} \cdot \frac{\eta}{\rho_0}} \tag{6}$$

where $\alpha$ is a radius of a guiding tube, $c_0$ is the speed of sound, $\omega$ is an angular frequency, and $\eta/\rho_0$ is the dynamic viscosity of a medium. According to Equation (5) and Equation (6), the sound pressure may be negatively correlated with the lengths of the first sound-guiding tube and/or the second sound-guiding tube. For example, the larger the lengths of the first sound-guiding tube 2233 and/or the second sound-guiding 2234 are, the lower the sound pressure of the sounds output by the acoustic output device.

Figure 24:
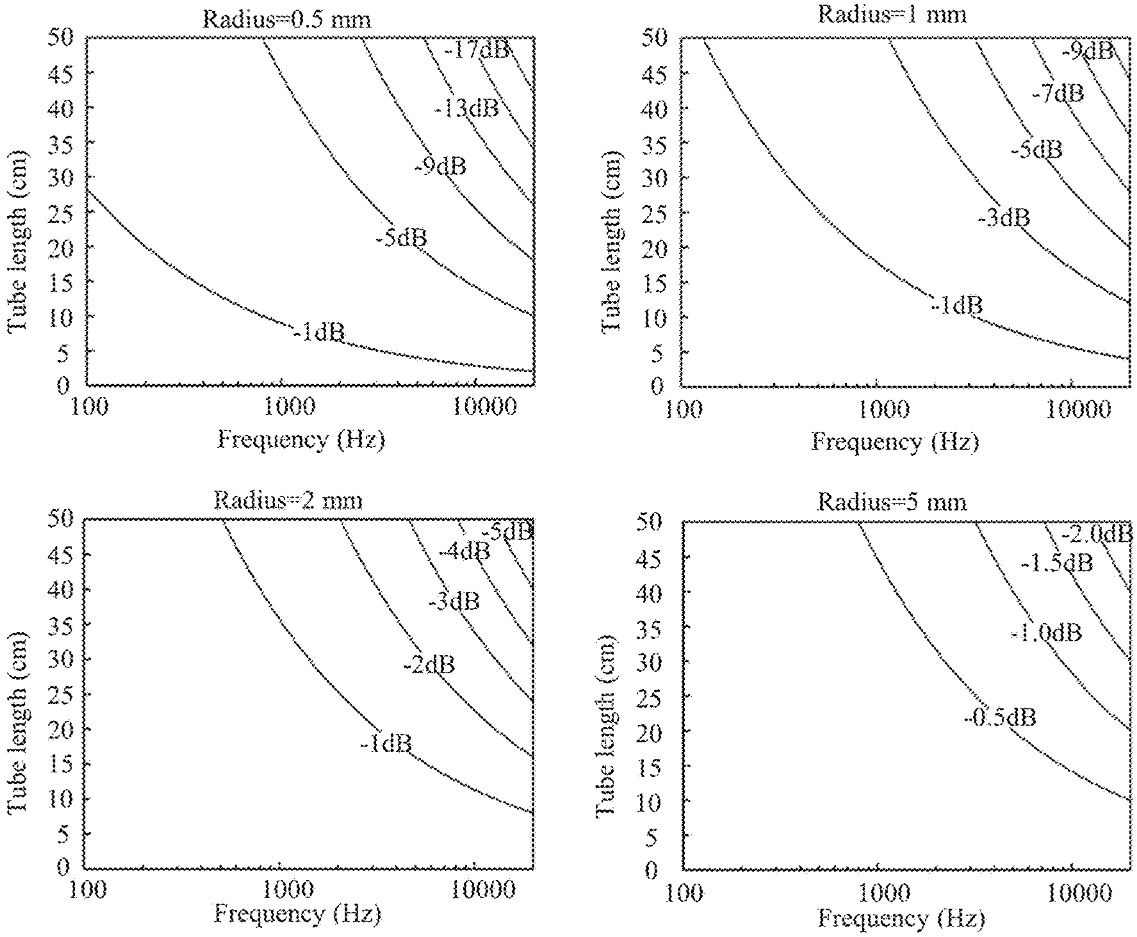
FIG. 24 is a schematic diagram illustrating exemplary attenuation degrees of sounds with different frequencies by sound-guiding tubes with different radii according to some embodiments of the present disclosure.

FIG. 24 is a schematic diagram illustrating exemplary attenuation degrees of sounds with different frequencies by sound-guiding tubes with different radii according to some embodiments of the present disclosure. As shown in FIG. 24, when the frequency is constant, under different radii (e.g., the radius of 0.5 mm, 1 mm, 2 mm, 5 mm as shown in FIG. 24), the attenuation degree of the sounds may increase as the length of the sound-guiding tube (the first sound-guiding tube 2233 and/or the second sound-guiding tube 2234) increases. By adjusting the aspect ratio of the sound-guiding tube, the attenuation of the sounds propagating in the sound-guiding tube may be effectively reduced. In some embodiments, the aspect ratio of the sound-guiding tube may be not larger than 200. In some embodiments, the aspect ratio of the sound-guiding tube may be not larger than 150. In some embodiments, the aspect ratio of the sound-guiding tube may be not larger than 100. In some embodiments, the radius of the sound-guiding tube may be not less than 0.5 mm, and the length of the sound-guiding tube may be not larger than 100 mm. In some embodiments, the radius of the sound-guiding tube may be not less than 0.5 mm, and the length of the sound-guiding tube may be not larger than 50 mm. In some embodiments, the radius of the sound-guiding tube may be not less than 1 mm, and the length of the sound-guiding tube may be not larger than 100 mm. In some embodiments, the radius of the sound-guiding tube may be not less than 1 mm, and the length of the sound-guiding tube may be not larger than 80 mm. In some embodiments, the radius of the sound-guiding tube may not be less than 2 mm, and the length of the sound-guiding tube may not be larger than 200 mm. In some embodiments, the radius of the sound-guiding tube may be not less than 2 mm, and the length of the sound-guiding tube may be not larger than 150 mm. In some embodiments, the radius of the sound-guiding tube may be not less than 5 mm, and the length of the sound-guiding tube may be not larger than 500 mm. In some embodiments, the radius of the sound-guiding tube may be not less than 5 mm, and the length of the sound-guiding tube may be not larger than 350 mm.

Figure 25:
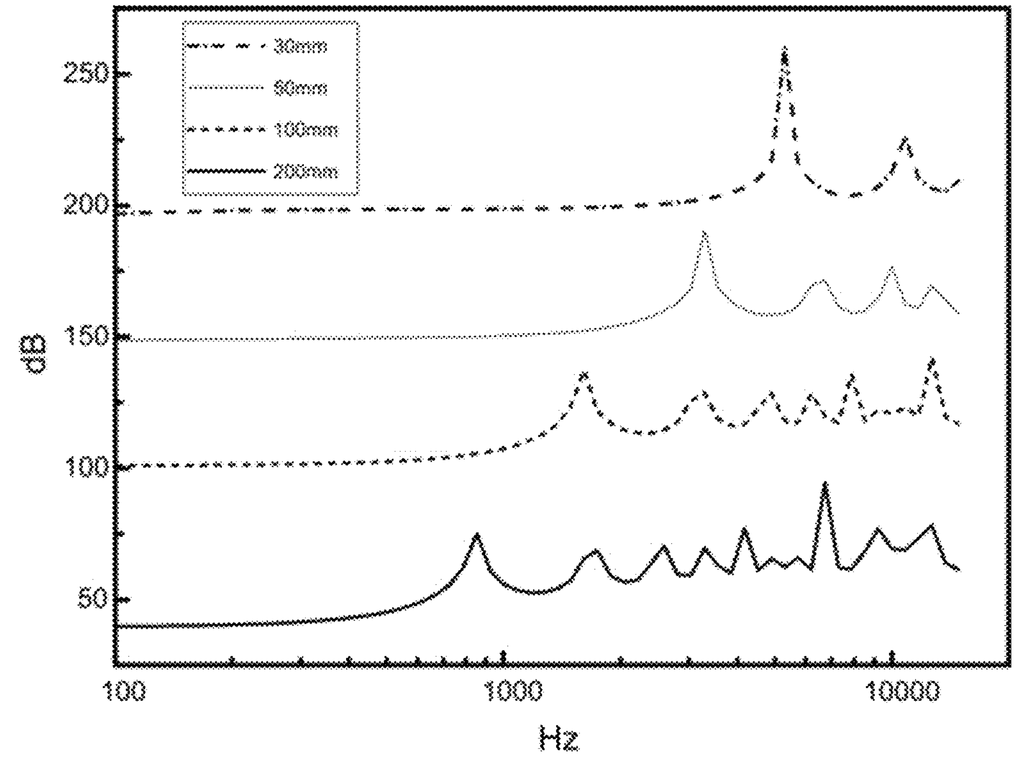
FIG. 25 is a schematic diagram illustrating exemplary frequency responses of sound-guiding tubes with different lengths according to some embodiments of the present disclosure.

In some embodiments, a radiation impedance of a sound-guiding tube and a radiation impedance of a nozzle may interact with each other, which may cause a sound with a specific frequency (e.g., 800-1000 Hz) to form a standing wave in the sound-guiding tube, and one or more peaks/valleys may be formed at one or more frequencies of an output sound, thereby affecting the quality of the output sound. In such cases, in some embodiments, the frequencies of the sounds corresponding to the peaks/valleys may also be adjusted by adjusting the length of the sound-guiding tube. FIG. 25 is a schematic diagram illustrating exemplary frequency responses of sound-guiding tubes with different lengths according to some embodiments of the present disclosure. As shown in FIG. 25, four curves indicate frequency responses when a length of a sound-guiding tube is 30 mm, 50 mm, 100 mm, and 200 mm, respectively. As the length of the sound-guiding tube increases, the frequencies of the peaks/valleys on the frequency response curve may move toward the low-frequency, and the count of peaks/valleys may also increase. In some embodiments, the length of the sound-guiding tube may be set to be not larger than 200 mm so that the frequency response curve of the sound-guiding tube may be flatter (without or with few peaks/valleys) in range of 20 Hz-800 Hz. In some embodiments, the length of the sound-guiding tube may be set to not larger than 100 mm so that the frequency response curve of the sound-guiding tube may be flatter (without or with few peaks/valleys) in range of 20 Hz-1500 Hz. In some embodiments, the length of the sound-guiding tube may be set to be not larger than 50 mm so that the frequency response curve of the sound-guiding tube may be flatter (without or with few peaks/valleys) in range of 20 Hz-3200 Hz. In some embodiments, the length of the sound-guiding tube may be set to be not larger than 30 mm so that the frequency response curve of the sound-guiding tube may be flatter (without or with few peaks/valleys) in range of 20 Hz-5200 Hz. In some embodiments, an impedance matching layer may be disposed at the sound-guiding hole corresponding to the sound-guiding tube to reduce the influence of the peaks/valleys. The impedance matching layer may refer to a structure that has the same impedance and the same phase as the sound-guiding tube. In some embodiments, the impedance matching layer may include a tuning net, tuning cotton, or the like.

Figure 26:
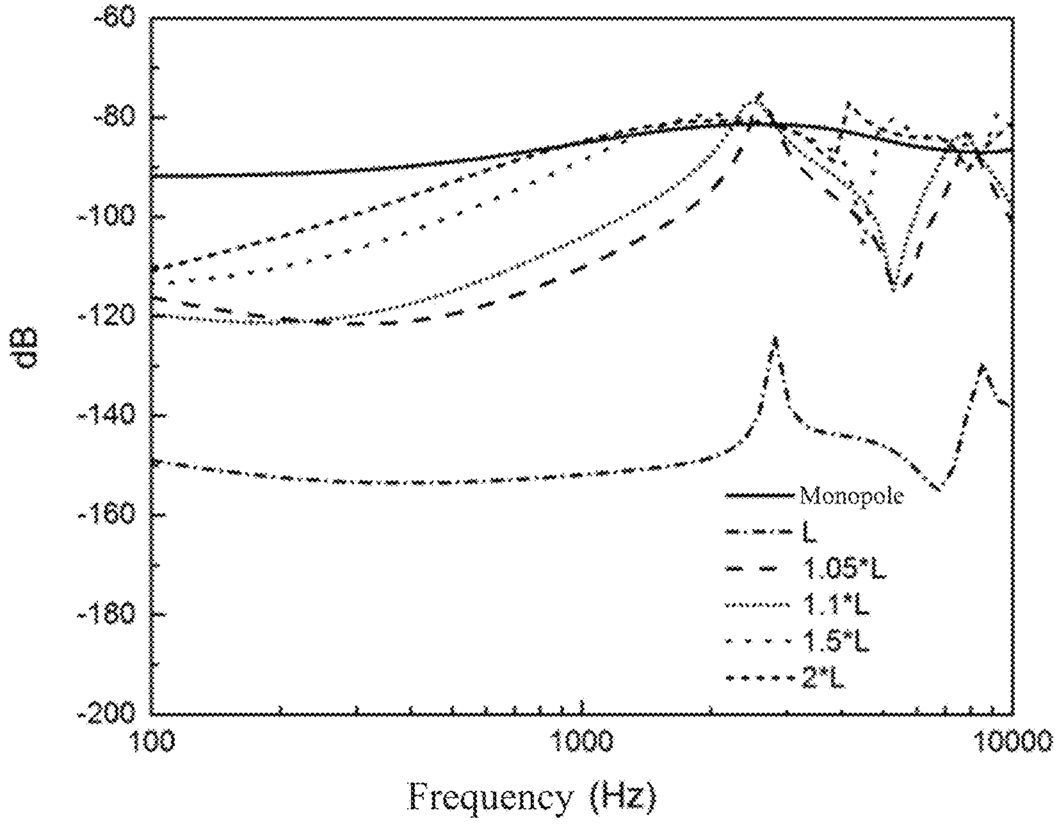
FIG. 26 is a schematic diagram illustrating exemplary frequency responses of two sound-guiding tubes with different lengths according to some embodiments of the present disclosure.

In some embodiments, the lengths of the first sound-guiding tube 2233 and the second sound-guiding tube 2234 may be the same or different. When the lengths of the first sound-guiding tube 2233 and the second sound-guiding tube 2234 are the same, the acoustic routes of the sounds on two sides of the acoustic driver 2220 (the vibration diaphragm) reaching the sound output ends of the first sound-guiding tube 2233 and the second sound-guiding tube 2234 may be the same, respectively. The phases of the sounds output from the first sound-guiding tube 2233 and the second sound-guiding tube 2234 may be opposite to reduce the volume of the sound leakage of the acoustic output device in the far field. When the lengths of the first sound-guiding tube 2233 and the second sound-guiding tube 2234 are different, the phases of the sounds output from the first sound-guiding tube 2233 and the second sound-guiding tube 2234 may not be opposite completely, so as to improve the volume of the hearing sound of the acoustic output device in the near field. FIG. 26 is a schematic diagram illustrating exemplary frequency responses of two sound-guiding tubes with different lengths according to some embodiments of the present disclosure. As shown in FIG. 26, "monopole" indicates an acoustic output device with a sound source, "L" indicates that the lengths of the first sound-guiding hole 2233 and the second sound-guiding hole 2234 are the same, "1.05*L" indicates that a ratio of the length of the first sound-guiding tube 2233 to the length of the second sound-guiding tube 2234 is 1.05, or the like. According to FIG. 26, in a specific frequency range (e.g., 100 Hz-5500 Hz), the volume of the sound leakage of an acoustic output device having a dual sound source (or a dual-point sound source) including the first sound-guiding tube 2233 and the second sound-guiding tube 2234 may be significantly lower than that of the acoustic output device with one sound source. When the lengths of two sound-guiding tubes are the same, the acoustic output device may have the smallest volume of sound leakage. For the sounds with the same frequency, as the ratio of the length of the two sound-guiding tubes increases, the volume of sound leakage of the acoustic output device may increase. In some embodiments, the ratio of the length of the first sound-guiding tube 2233 to the length of the second sound-guiding tube 2234 may be 0.5-2.

Figure 27:
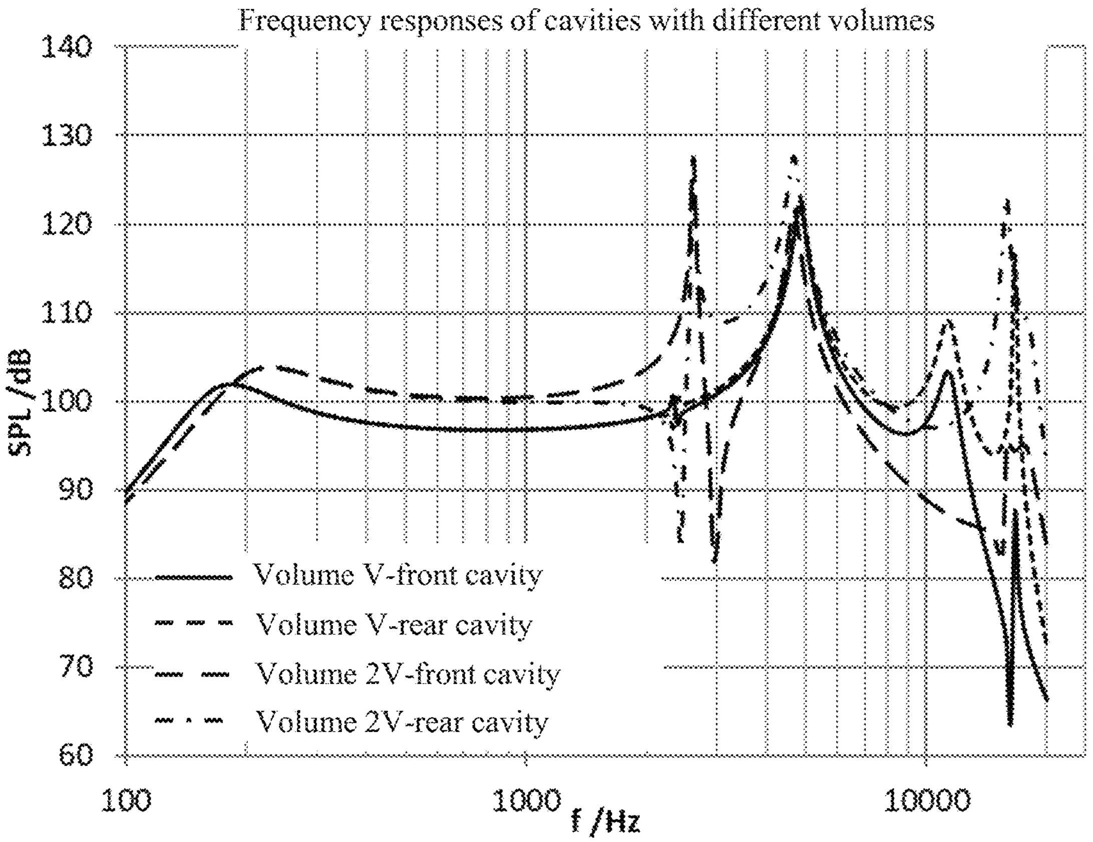
FIG. 27 is a schematic diagram illustrating exemplary frequency responses of cavities with different volumes according to some embodiments of the present disclosure.

In some embodiments, the frequency responses at two sound output positions may be adjusted by adjusting the volume of the cavity accommodating the acoustic driver 2220. For example, in some embodiments, the volume of the first cavity 2231 may be larger than the volume of the second cavity 2232, which may cause a first resonance peak corresponding to the first cavity 2231 to be less than a second resonance peak corresponding to the second cavity 2232. FIG. 27 is a schematic diagram illustrating exemplary frequency responses of cavities with different volumes according to some embodiments of the present disclosure. As shown in FIG. 27, the increase of the volume of the first cavity 2231 and/or the second cavity 2232 may cause the position of the peak/valley on a corresponding frequency response curve to move to the low-frequency region. Specifically, compared with the frequency response curves corresponding to the first cavity 2231 and the second cavity 2232 with a volume of V ("Volume V-front cavity" and "Volume 2V-rear cavity" in FIG. 27), peaks/valleys may be generated at relatively low frequencies on the frequency response curves corresponding to the first cavity 2231 and the second cavity 2232 with a volume of 2V ("Volume 2V-front cavity" and "Volume 2V-rear cavity" in FIG. 27), And the frequency response curves of the first cavity 2231 and the second cavity 2232 may be quite different, which may affect the cancellation of phases of the dual sound source (point sound source and/or sound radiation surface), thereby increasing the sound leakage in the frequency bands where the peaks/valleys are located. In some embodiments, in order to maintain the sound cancellation effect of the dual sound source at medium and low frequencies, the volumes of the first cavity 2231 and the second cavity 2232 may be not larger than 2500 $mm^3$ (e.g., for an acoustic output device with a diameter of 16 mm, the height of the cavity may be 10 mm). In some embodiments, the volumes of the first cavity 2231 and the second cavity 2232 may be not larger than 1200 $mm^3$ (e.g., for an acoustic output device with a diameter of 16 mm, the height of the cavity may be 5 mm). In some embodiments, the volumes of the first cavity 2231 and the second cavity 2232 may be not larger than 700 $mm^3$ (e.g., for an acoustic output device with a diameter of 12 mm, the height of the cavity may be 5 mm).

It should be noted that the above descriptions are merely for the convenience of description, and not intended to limit the present disclosure. It may be understood that for those skilled in the art, after understanding the principles of the present disclosure, without departing from the principles, various modifications and changes in the forms and details of the acoustic output device mentioned above may be made. For example, the first cavity 2231 and the second cavity 2232 are not limited to a regular cylindrical space, and may also be other spaces of regular or irregular shapes, such as a space of a truncated cone-shape, a hemispherical space, or the like, which is not further limited herein.

Figure 28:
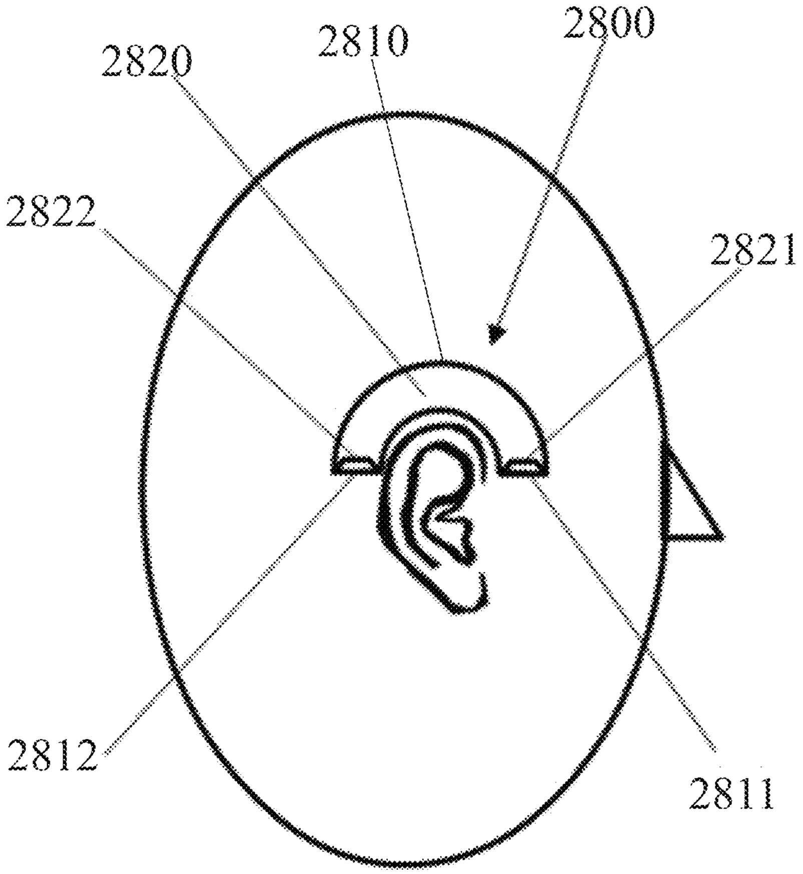
FIG. 28 is a schematic diagram illustrating an exemplary acoustic output device according to some embodiments of the present disclosure.

FIG. 28 is a schematic diagram illustrating an exemplary acoustic output device according to some embodiments of the present disclosure. As shown in FIG. 28, the acoustic output device 2800 may include a housing structure 2810, a first acoustic driver 2821, and a second acoustic driver 2822. The first acoustic driver 2821 and the second acoustic driver 2822 may be arranged in the housing structure 2810. The first acoustic driver 2821 and the second acoustic driver 2822 may form two ends of a cavity 2820 arranged in the housing structure 2810. The first acoustic driver 2821 may transmit sounds to the outside from the first sound output position 2811, and the second acoustic driver 2822 may transmit sounds to the outside from the second sound output position 2812. In some embodiments, the first sound output position 2811 and the second sound output position 2812 may be arranged on two sides of the auricle. The auricle may be regarded as a baffle, which may increase an acoustic route difference (i.e., a route difference between sounds from the first sound output position 2811 and the second sound output position 2812 to the user's ear canal) that the first sound output position 2811 and the second sound output position 2812 transmit the sounds to the user's ear, respectively, which may attenuate sound cancellation, thereby increasing the volume of the sounds (i.e., near-field sounds) heard by the user's ears, and improving the user's hearing experience. On the other hand, the auricle may have a small influence on the transmission of sounds from the sound output position to the environment (i.e., far-field sounds). When the far-field sounds generated by two sound-guiding holes cancel each other, the sound leakage of the acoustic output device may be suppressed to a certain extent, and the sounds generated by the acoustic output device may be prevented from being heard by others near the user. In some embodiments, the first sound output position 2811 and the second sound output position 2812 may also be arranged on the same side of the auricle.

In some embodiments, to increase the volume of the hearing sound and reduce the volume of the sound leakage, the first acoustic driver 2821 and the second acoustic driver 2822 may generate sounds with the same amplitude and opposite phases that propagate outwards, which forms the dual sound source described elsewhere in the present disclosure. Although a side of the first acoustic driver 2821 (the vibration diaphragm thereof) facing the cavity 2820 and a side of the first acoustic driver 2821 (the vibration diaphragm) facing away from the cavity 2820 may also generate sound waves in opposite phases. Since the side of the first acoustic driver 2821 facing the cavity 2820 is arranged in the cavity 2820, which may be equivalent to be isolated from the side of the first acoustic driver 2821 facing away from the cavity 2820, the sound waves on two sides of the first acoustic driver 2821 with opposite phases may be prevented from canceling each other in the near field, thereby increasing the volume of the sound at the hearing position.

In some embodiments, in order to protect the acoustic radiation surface of the first acoustic driver 2821 and/or the second acoustic driver 2822 (e.g., a vibration diaphragm of adynamic diaphragm loudspeaker), a barrier plate (not shown in FIG. 28) may be arranged on the side of the first acoustic driver 2821 and/or the second acoustic driver 2822 facing away from the cavity 2820. The barrier plate may be fixedly connected to the housing structure 2810. There may be a certain distance between the barrier plate and the first acoustic driver 2821 and/or the second acoustic driver 2822. In some embodiments, the barrier plate may include a sound-guiding hole (not shown in FIG. 28) configured to transmit sounds outwards. In some embodiments, the sound-guiding hole may also be arranged on a sidewall of the housing structure 2810 between the blocking plate and the first acoustic driver 2821 and/or the second acoustic driver 2822. In some embodiments, a mesh layer (such as a dust-proof net) may be arranged at the sound-guiding hole to protect the first acoustic driver 2821 and/or the second acoustic driver 2822 and provide acoustic resistance.

In some alternative embodiments, in order to protect the acoustic radiation surface of the first acoustic driver 2821 and/or the second acoustic driver 2822 (e.g., the vibration diaphragm of adynamic diaphragm loudspeaker), the first acoustic driver 2821 and/or the second acoustic driver 2822 may be reversed. That is, a front side of the first acoustic driver 2821 and/or the second acoustic driver 2822 (e.g., a side of the dynamic diaphragm loudspeaker without structures such as coils, magnets, magnetic bottom plates, etc.) may be used as a side facing the cavity 2820, and a rear side of the first acoustic driver 2821 and/or the second acoustic driver 2822 (e.g., a side of the dynamic diaphragm loudspeaker that includes coils, magnets, magnetic bottom plate, etc.) as a side facing away from the cavity 2820. In some embodiments, a rear surface of the acoustic driver may include a metal magnetic material (e.g., iron), which may be relatively strong and may protect soft structures such as the vibration diaphragm of the acoustic driver. In such cases, the reversed first acoustic driver 2821 and/or the second acoustic driver 2822 may protect the acoustic driver.

In order to reduce the acoustic impedance between the first acoustic driver 2821 (the vibration diaphragm thereof) and the second acoustic driver 2822 (the vibration diaphragm thereof), in some embodiments, the cavity 2820 may be conductive. That is, an end where the first acoustic driver 2821 is located may be in communication with an end where the second acoustic driver 2822 is located (i.e., the two acoustic drivers share a rear cavity). When the first acoustic driver 2821 (the vibration diaphragm thereof) and the second acoustic driver 2822 (the vibration diaphragm thereof) vibrate with opposite phases, the acoustic propagation medium in the cavity 2820 (e.g., the air in the cavity 2820) may not be compressed or expand due to the reciprocating vibrations of the first acoustic driver 2821 (the vibration diaphragm thereof) and the second acoustic driver 2822 (the vibration diaphragm thereof). In such cases, the vibrations of the first acoustic driver 2821 (the vibration diaphragm thereof) and the second acoustic driver 2822 (the vibration diaphragm thereof) may be not affected by elasticity of the acoustic propagation medium in the cavity 2820, which may improve amplitudes of acoustic radiations of the first acoustic driver 2821 (the vibration diaphragm thereof) and the second acoustic driver 2822 (the vibration diaphragm thereof), especially the amplitudes in the low-frequency band.

In some embodiments, the structure of the cavity 2820 in the acoustic output device 2800 may be relatively simple and have less influence on the propagation of the sounds, so that the frequency response of the first sound output position 2811 and the frequency response of the first acoustic driver 2821 may be relatively close, and the frequency response of the second sound output position 2812 and the frequency response of the second acoustic driver 2822 may be relatively close. When the frequency responses of the first acoustic driver 2821 (the vibration diaphragm thereof) and the second acoustic driver 2822 (the vibration diaphragm thereof) are relatively flat without obvious peaks and/or valleys, a final frequency response of the acoustic output device 2800 may also be relatively flat.

Figure 29:
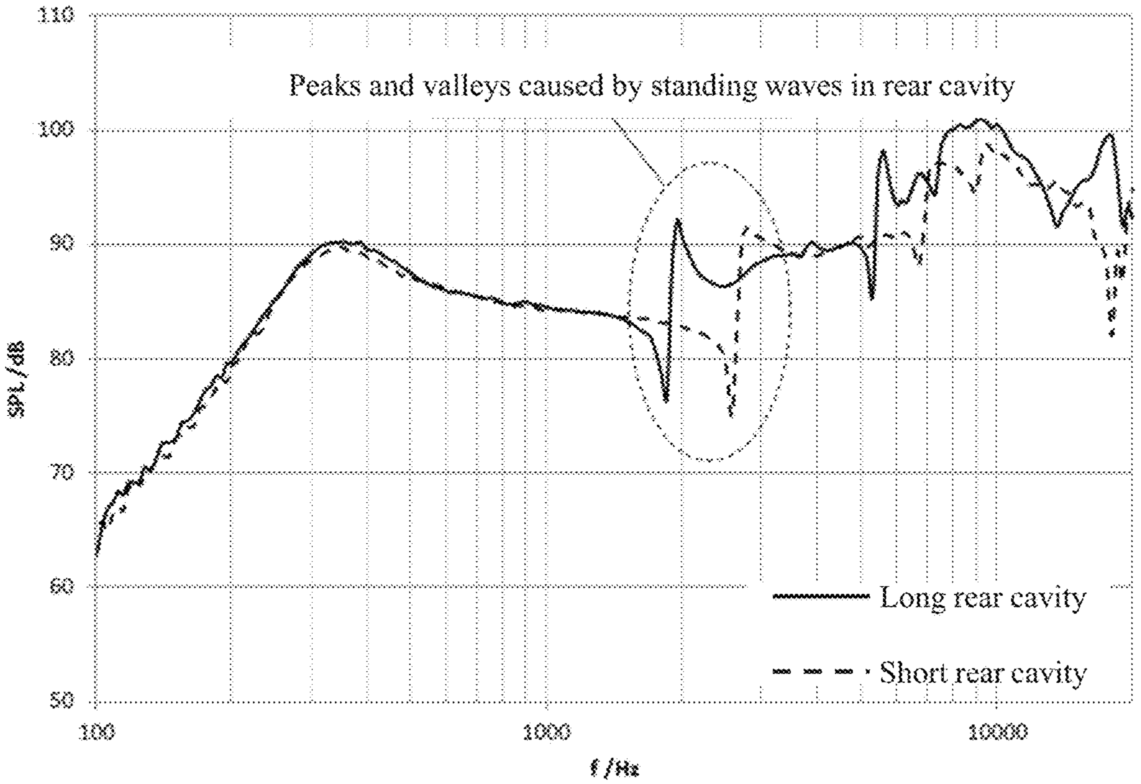
FIG. 29 is a schematic diagram illustrating exemplary frequency responses of a cavity of different effective lengths according to some embodiments of the present disclosure.

In some embodiments, when sound waves generated by the side of the first acoustic driver 2821 facing the cavity 2820 and sound waves generated by the side of the second acoustic driver 2822 facing the cavity 2820 act on an inner wall of the cavity 2820, a standing wave may be generated, and peaks/valleys may be generated in the frequency response curve of the acoustic output device 2800. The positions of the peaks/valleys may be changed by adjusting an effective length of the cavity 2820. In some embodiments, the effective length of the cavity may refer to a length of the acoustic route of the sounds propagating in the cavity. FIG. 29 is a schematic diagram illustrating exemplary frequency responses of a cavity of different effective lengths according to some embodiments of the present disclosure. As shown in FIG. 29, compared with the cavity with a small effective length (the "short rear cavity" in FIG. 29), the peaks/valleys of the cavity with a large effective length (the "long rear cavity" shown in FIG. 29) may correspond to low frequencies. In order to avoid the influence of the cavity on the sounds with the medium and low frequency output by the acoustic output device, the effective length of the cavity may be determined such that the corresponding peaks/valleys may be located at a position with a relatively high frequency. In some embodiments, in order to achieve the above purposes, the effective length of the cavity between the first acoustic driver 2821 and the second acoustic driver 2822 may be not larger than 30 cm. In some embodiments, the effective length of the cavity between the first acoustic driver 2821 and the second acoustic driver 2822 may be not larger than 25 cm. In some embodiments, the effective length of the cavity between the first acoustic driver 2821 and the second acoustic driver 2822 may be not larger than 15 cm. It should be noted that in the present disclosure, the housing structure 2810 and the cavity 2820 are merely illustrative. The housing structure 2810 and the cavity 2820 are not limited to the shape shown in FIG. 28. Various changes or modifications of the structure 2810 and the cavity 2820 with similar effects are within the scope of the present disclosure.

In some embodiments, in order to reduce the influence of the standing waves in the cavity 2820 on the frequency response of the acoustic output device, the first acoustic driver 2821 (the vibration diaphragm thereof) may be inclined relative to the second acoustic driver 2822 (the vibration diaphragm thereof). In some embodiments, the first acoustic driver 2821 (the vibration diaphragm thereof) being inclined relative to the second acoustic driver 2822 (the vibration diaphragm thereof) may indicate that a cross-section of the first acoustic driver 2821 and a cross-section of the second acoustic driver 2822 are not parallel or not on the same plane. An axial direction of the cavity 2820 may also be used as a reference. The first acoustic driver 2821 (the vibration diaphragm thereof) being inclined relative to the second acoustic driver 2822 (the vibration diaphragm thereof) may indicate that the first acoustic driver 2821 (the vibration diaphragm thereof) and the second acoustic driver 2821 (the vibration diaphragm thereof) may form different angles with the axial direction of the cavity 2820 at their corresponding positions. For example, the vibration diaphragm of the first acoustic driver 2821 may be perpendicular to the axial direction of the cavity 2820 at the first acoustic driver 2821, and the vibration diaphragm of the second acoustic driver 2822 may form an angle less than 90 degrees with the axial direction of the cavity 2820 at the second acoustic driver 2822. In some embodiments, in order to reduce the influence of the standing waves in the cavity 2820 on the frequency response of the acoustic output device, the cavity 2820 may include acoustic materials and/or acoustic structures. In some embodiments, the acoustic materials may include porous materials such as fiber materials, particulate materials, foam materials, or the like. In some embodiments, the acoustic structures may include a resonator, a perforated plate, a thin-film resonant structure, a thin-plate resonant structure, a sound-absorbing wedge, or the like, or any combination thereof.

Figure 30:
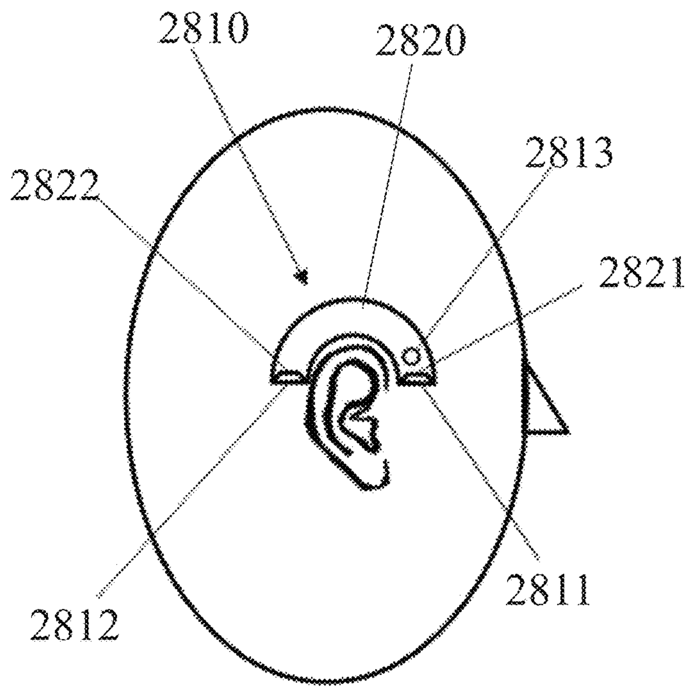
FIG. 30 is a schematic diagram illustrating an exemplary acoustic output device according to some embodiments of the present disclosure.
Figure 31:
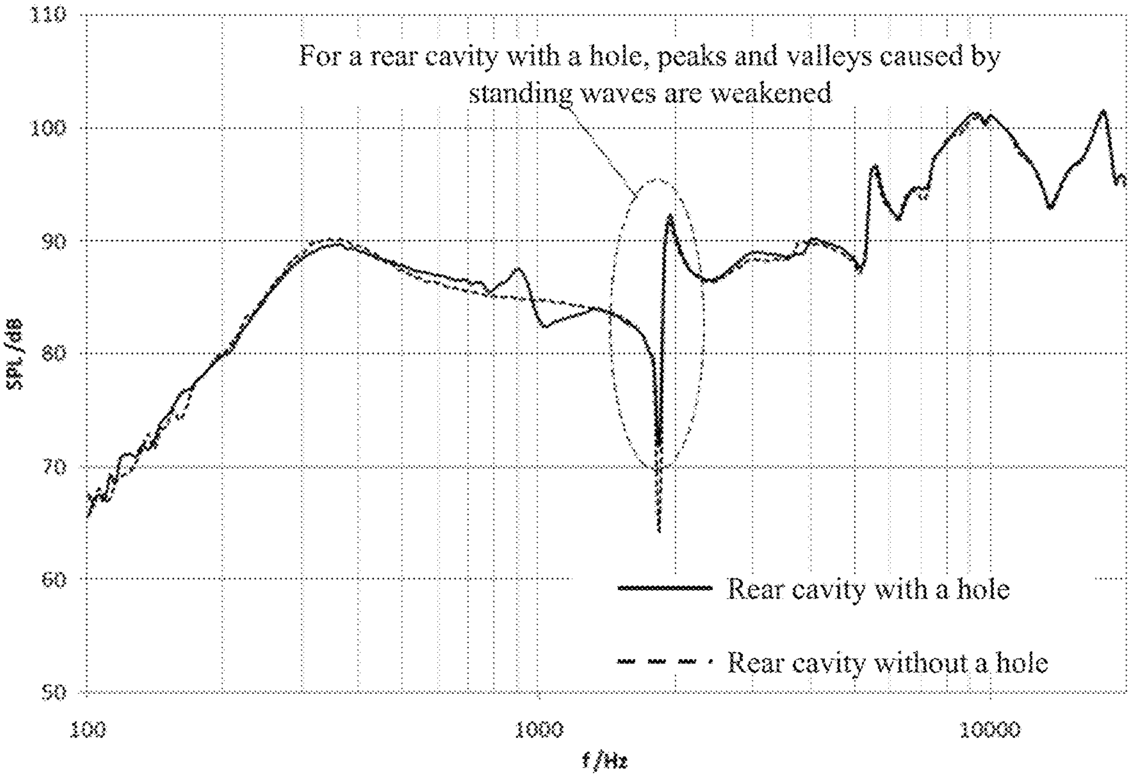
FIG. 31 is a schematic diagram illustrating exemplary frequency responses of a cavity with or without a hole according to some embodiments of the present disclosure.

FIG. 30 is a schematic diagram illustrating an exemplary acoustic output device according to some embodiments of the present disclosure. As shown in FIG. 30, in order to reduce the influence of the standing waves in the cavity 2820 on the frequency response, the cavity 2820 between the first acoustic driver 2821 (the vibration diaphragm thereof) and the second acoustic driver 2822 (the vibration diaphragm thereof) may include at least one hole 2813. The sounds from the side of the first acoustic driver 2821 (the vibration diaphragm thereof) facing the cavity 2820 and the side of the second acoustic driver 2822 (the vibration diaphragm thereof) facing the cavity 2820 may be transmitted to the environment through the hole 2813, thereby suppressing the formation of the standing waves. FIG. 31 is a schematic diagram illustrating exemplary frequency responses of a cavity with or without a hole according to some embodiments of the present disclosure. As shown in FIG. 31, compared with the sound frequency response curve of a cavity without a hole 2813, the peaks/valleys on the sound frequency response curve of a cavity with a hole 2813 (the "rear cavity with a hole" in FIG. 31) caused by the standing waves may be weakened.

Figure 32:
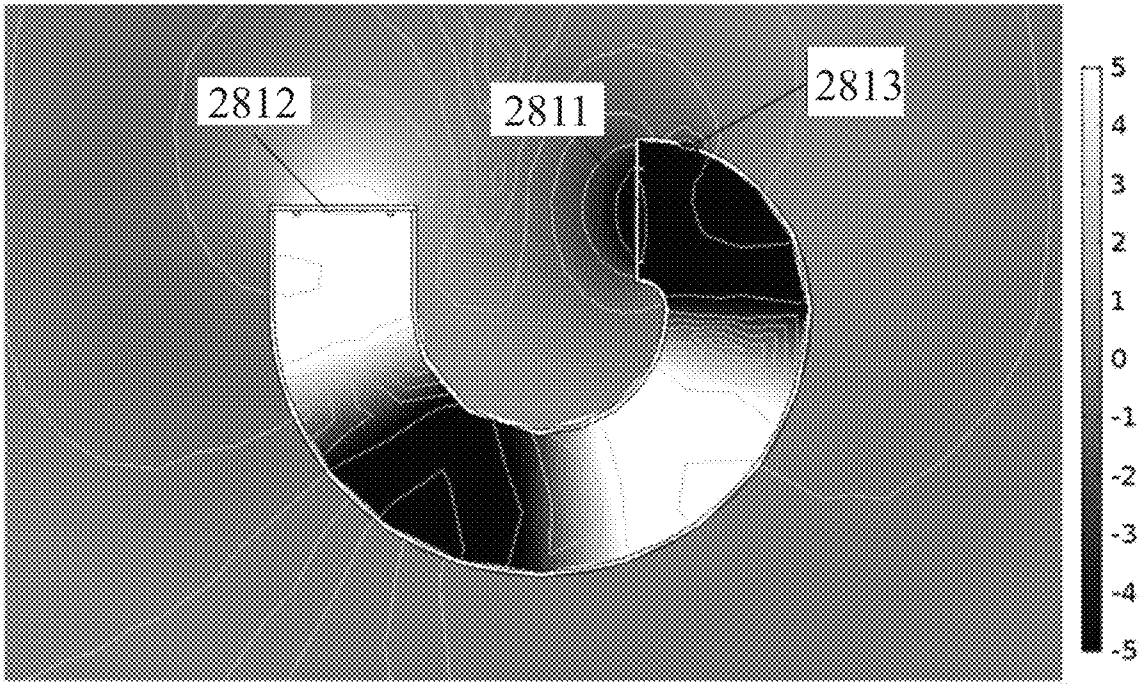
FIG. 32 is a schematic diagram illustrating an exemplary sound pressure of a cavity with a hole according to some embodiments of the present disclosure.
Figure 33:
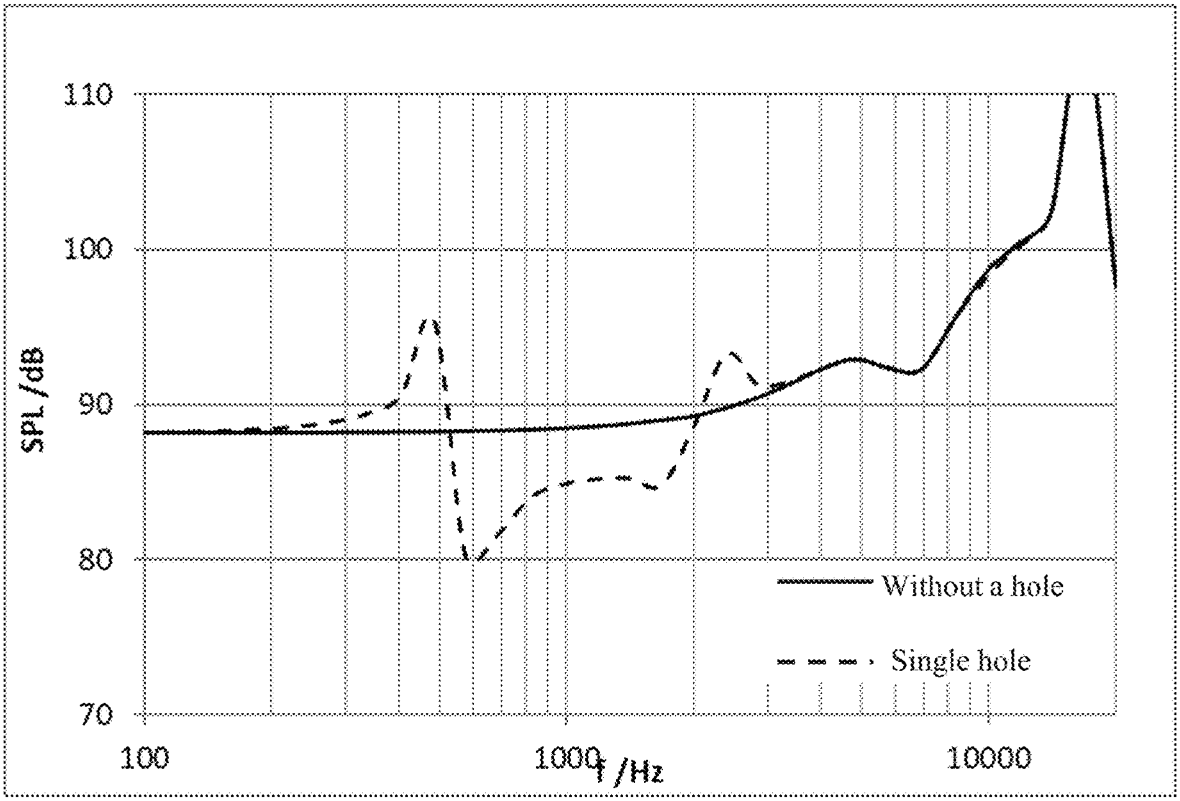
FIG. 33 is schematic diagram illustrating exemplary frequency responses of a cavity with a hole according to some embodiments of the present disclosure.

In some embodiments, the hole 2813 may be close to the first sound output position 2811 or the second sound output position 2812, and the sounds output from the hole 2813 may interfere with the sound output from the first sound output position 2811 or the second sound output position 2812 in the near field, which may weaken the degree of interference cancellation between the first sound output position 2811 and the second sound output position 2812 in the near field, thereby increasing the volume of the hearing sound in the near field. FIG. 32 is a schematic diagram illustrating an exemplary sound pressure of a cavity with a hole according to some embodiments of the present disclosure. FIG. 33 is a schematic diagram illustrating exemplary frequency responses of a cavity with a hole according to some embodiments of the present disclosure. As shown in FIG. 32, the cavity may have a shape similar to a horseshoe, and the cavity may include the hole 2813. When the first acoustic driver 2811 and the second acoustic driver 2822 vibrate in opposite directions, the acoustic output device may be in a three-pole state including two positive poles and one negative pole, the sound leakage of the acoustic output device may increase, and the volume of the hearing sound of the acoustic output device may also increase accordingly. The grayscale distribution in FIG. 32 may indicate a shape of the standing wave in the cavity with the hole 2813. As shown in FIG. 33, in a specific frequency band (e.g., 250 Hz-500 Hz, 2000 Hz-3000 Hz), the frequency response of the cavity with the hole 2813 ("single hole" in FIG. 33) may be significantly larger than the frequency response of the cavity without the hole 2813 ("without a hole" in FIG. 33).

Figure 34:
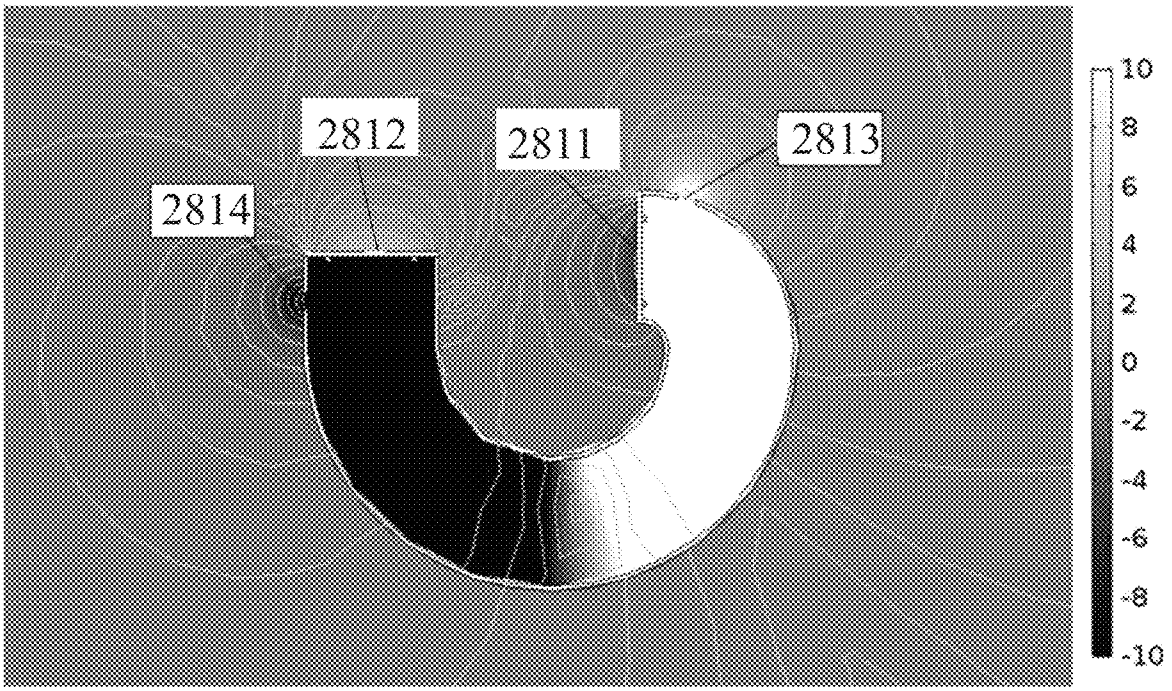
FIG. 34 is a schematic diagram illustrating an exemplary sound pressure of a cavity with two holes according to some embodiments of the present disclosure.
Figure 35:
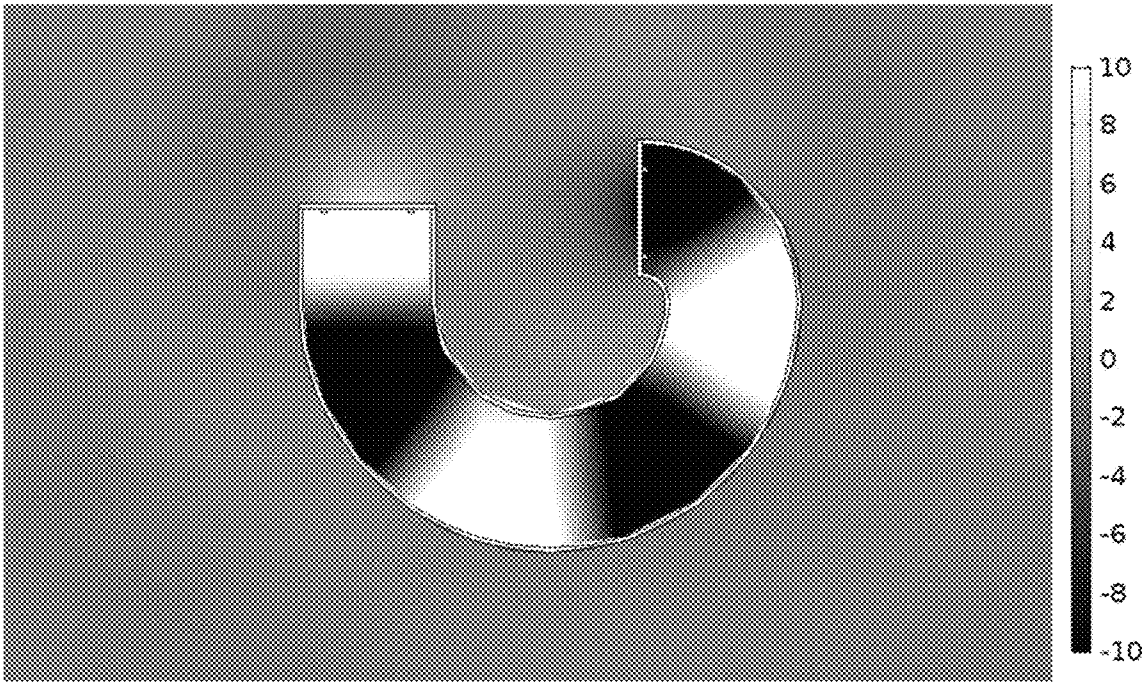
FIG. 35 is a schematic diagram illustrating an exemplary sound pressure of a cavity without a hole according to some embodiments of the present disclosure.

In some embodiments, the hole 2813 may be arranged on a sidewall of the housing structure 2810 of the cavity close to the first sound output position 2811 or the second sound output position 2812 to increase the volume of the hearing sound. FIG. 34 is a schematic diagram illustrating an exemplary sound pressure of a cavity with two holes according to some embodiments of the present disclosure. FIG. 35 is a schematic diagram illustrating an exemplary sound pressure of a cavity without a hole according to some embodiments of the present disclosure. As shown in FIG. 34, the cavity may include a first hole 2813 at a position close to the first sound output position 2811, and a second hole 2814 at a position close to the second sound output position 2812. Since the first hole 2813 is close to the rear of the first acoustic driver, the first hole 2813 may form a sound source opposite to the first sound output position 2811. The sounds output from the first sound output position 2811 and the sounds output from the first hole 2813 may be approximately opposite in phases, which may reduce the volume of the sound leakage and reduce the influence of the standing waves in the cavity. The relationship between the second hole 2814 and the second sound output position 2812 may be similar to the relationship between the first hole 2813 and the first sound output position 2811, which is not repeated herein. The grayscale distribution in FIG. 34 may indicate a standing wave in the cavity when the cavity includes the first hole 2813 and the second hole 2814. Compared with FIG. 32, the shapes of the standing waves in the cavity may be changed by providing holes of different counts/positions.

As shown in FIG. 35, due to the standing waves in the cavity of the housing structure, the cavity may include positions with a maximum sound pressure and a minimum sound pressure along a length direction of the cavity (e.g., a connection direction of two acoustic drivers along an axis of the cavity). That is, the sound pressure in the cavity may be different along the length direction of the cavity. In such cases, when the holes are arranged at different positions, the sound pressure in the cavity at the hole may be different, and an acoustic radiation intensity and a phase of the sound propagated from the hole of the cavity may also be different. In addition, the acoustic radiation intensity and the phase of the sound propagated from the hole may be related to the frequency of the sound wave. For example, for a hole at the same position, the acoustic radiation intensity and the phase of sound waves with different frequencies propagated from the hole may be different. As another example, in some frequency bands, the sound wave propagated from the hole may be in phase with the sound wave propagated from an acoustic driver, and in other frequency bands, the sound wave propagated from the hole may be in opposite phase with the sound wave propagated from an acoustic driver. It should be noted that the count of holes (e.g., the hole 2813 and the hole 2814) is not limited to one or two in FIG. 30, FIG. 32, and FIG. 34. The count of holes may be three, four, or more. In addition, the position of the hole may not be limited to be close to the first sound output position 2811 and the second sound output position 2812, and may also be arranged in other positions of the cavity, which may be specifically adjusted according to actual conditions, and is repeated herein.

Figure 36:
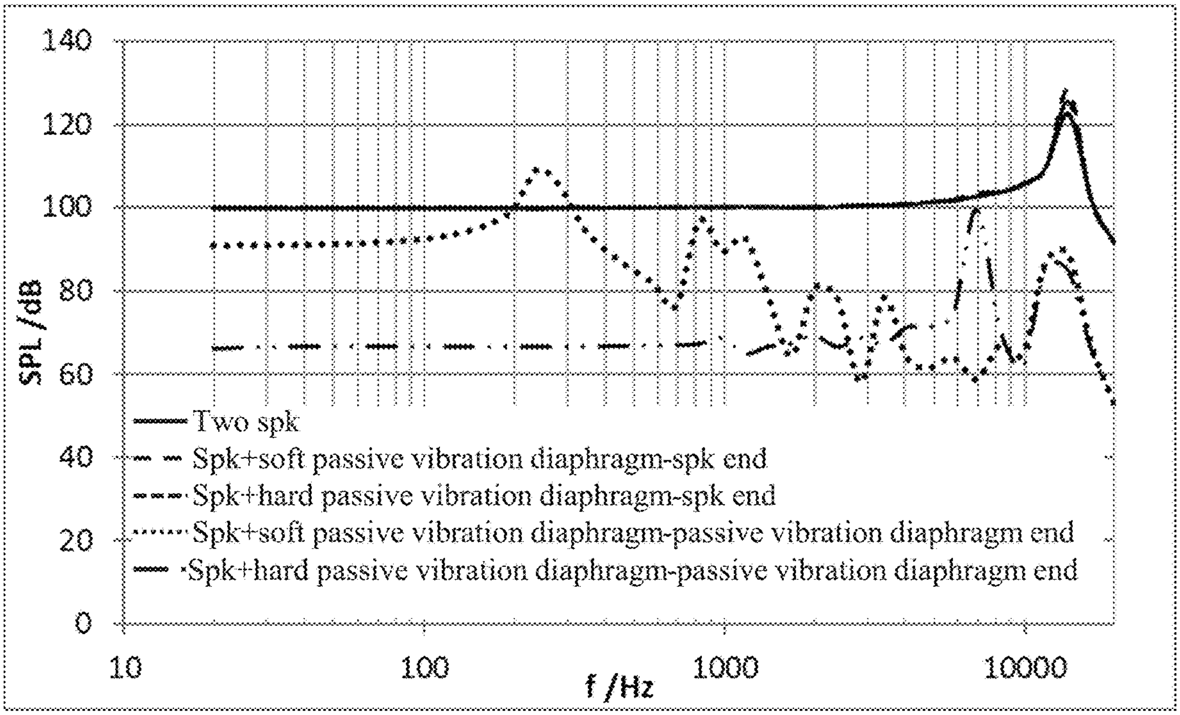
FIG. 36 is a schematic diagram illustrating exemplary frequency responses of an acoustic output device according to some embodiments of the present disclosure.

In some embodiments, the first acoustic driver and the second acoustic driver may be active acoustic drivers. In such cases, the first acoustic driver and the second acoustic driver may include active vibration diaphragms, which are respectively driven by corresponding electrical signals. In some embodiments, the first acoustic driver may be an active acoustic driver, and the second acoustic driver may be a passive acoustic driver. In some embodiments of the present disclosure, the passive acoustic driver may refer to an acoustic assembly that passively vibrates under the drive of an active acoustic driver (e.g., a passive vibration diaphragm, which may also be referred to as a passive radiator). Specifically, the active acoustic driver (e.g., the first acoustic driver 2821) may be in an active working mode under the drive of the control signal, and a control signal may not be applied on the passive acoustic driver (e.g., the second acoustic driver 2822). The active vibration diaphragm of the active acoustic driver may vibrate and drive the air in the cavity (e.g., the cavity 2820) to vibrate, thereby driving the passive vibration diaphragm of the passive acoustic driver to vibrate. FIG. 36 is a schematic diagram illustrating exemplary frequency responses of an acoustic output device according to some embodiments of the present disclosure. As shown in FIG. 36, when the first acoustic driver 2821 is in the active working mode and the second acoustic driver 2822 is in the passive working mode ("spk+soft passive vibration diaphragm−spk end" and "spk+hard passive vibration diaphragm−spk end" in FIG. 36), the frequency response curve of the first acoustic driver 2821 may be basically the same as the frequency response curve of the first acoustic driver 2821 when the first acoustic driver 2821 and the second acoustic driver 2822 are active acoustic drivers ("two spk") and the phases are opposite. When the first acoustic driver 2821 is in the active working mode and the second acoustic driver 2822 is in the passive working mode, the frequency response curve of the second acoustic driver 2821 ("spk+soft passive vibration diaphragm−passive vibration diaphragm end" and "spk+hard passive vibration diaphragm−passive vibration diaphragm end" in FIG. 36) may vary according to the hardness and softness of the vibration diaphragm. That is, when the second acoustic driver 2822 is a passive vibration diaphragm, if an elasticity and a mass of the passive vibration diaphragm are different, the frequency response curves of the sounds output by the second acoustic driver 2822 may be different. When the first acoustic driver 2811 is in the active working mode, the sounds may act on the passive vibration diaphragm (the second acoustic driver 2822) through a transmission medium of the cavity (e.g., the air). After the passive vibration diaphragm is driven, the sounds may also be propagated from the second sound output position 2812. And the softer the vibration diaphragm of the second acoustic driver 2822, the stronger the propagated low-frequency sound field.

At different frequencies, the sounds output by the passive acoustic driver under the action of the active acoustic driver may have a phase difference different from the sounds output by the active acoustic driver. In some embodiments, the phases difference of the sounds propagated from the first acoustic driver 2821 and the second acoustic driver 2822 may be adjusted by adjusting the elasticity and the mass of the vibration diaphragm, and the volume of the cavity of the second acoustic driver 2822. When the phase difference between the first acoustic driver 2821 and the second acoustic driver 2822 is not less than 90o, the sounds generated by the second acoustic driver and the sounds generated by the first acoustic driver may be synchronized, and the sounds generated by the acoustic driver 2822 may enhance the sounds generated by the acoustic driver 2821 at the hearing position, which may be considered that the second acoustic driver 2822 in the passive working mode may achieve a phase inversion. Assuming that a vibration speed of the first acoustic driver 2821 is:

$$u_1 = U_1 * \cos(\omega t + \varphi_1) \tag{7}$$

where $u_1$ denotes the vibration speed of the first acoustic driver 2821 (the vibration diaphragm thereof), $U_1$ denotes a speed amplitude of the first acoustic driver 2821 (the vibration diaphragm thereof), ω denotes a vibration frequency of the first acoustic driver 2821 (the vibration diaphragm thereof), $\varphi_1$ denotes a phase of the first acoustic driver 2821 (the vibration diaphragm thereof). A vibration speed of the second acoustic driver 2822 may be:

$$u_2 = U_2 * \cos(\omega t + \varphi_2) \tag{8}$$

where $u_2$ denotes the vibration speed of the second acoustic driver 2822 (the vibration diaphragm thereof), $U_2$ denotes a speed amplitude of the second acoustic driver 2822 (the vibration diaphragm thereof), $\varphi_2$ denotes a phase of the second acoustic driver 2822 (the vibration diaphragm thereof). When t=0, $\varphi_1$=0, and $\varphi_2$=0, $u_1=U_1$, and $u_2=U_2$. Since the vibration speeds of $u_1$ and $u_2$ are opposite, taking a vibration direction of $u_1$ as the positive direction, $U_1$ may be a positive number and $U_2$ may be a negative number. That is, $u_1=|U_1|$, and $u_2=|U_2|$. In such cases, $u_1$ and $u_2$ may be expressed as:

$$u_1 = |U_1| * \cos(\omega t + \varphi_1) \tag{9}$$

$$u_1 = |U_2| * \cos(\omega t + \varphi_2) \tag{10}$$

The phase difference between the first acoustic driver 2821 and the second acoustic driver 2822 may be:

$$\varphi = |\varphi_1 - \varphi_2| \tag{11}$$

In the acoustic output device shown in FIG. 28, when the phase difference is 180×, the vibration direction of the first acoustic driver 2821 (the vibration diaphragm thereof) may be the same as the vibration direction of the second acoustic driver 2822 (the vibration diaphragm thereof) (as shown in FIG. 36). The sounds generated by the second acoustic driver 2822 in the passive working mode at the second sound output position may have the same or approximately the same phase as the sounds generated by the first acoustic driver 2821 at the first sound output position. The sounds generated by the two acoustic drivers may enhance each other at the hearing position, thereby increasing the low-frequency sound at the hearing position.

In some embodiments, the acoustic output device may also include a controller. The controller may control the amplitudes and the phases of the sounds generated by the first acoustic driver 2821 and the second acoustic driver 2822 through a control signal, so as to achieve effects such as sound leakage reduction, sound quality improvement, low-frequency enhancement, active noise reduction, or the like. For example, in some embodiments, by using the control signal, the controller may cause the first acoustic driver 2811 and the second acoustic driver 2822 to output sounds with the same sound pressure amplitude and opposite phases, which may increase the volume of the hearing sound in the near field and reduce the sound leakage in the far field. As another example, in order to enhance the low-frequency sound of the acoustic output device, by using the control signal, the controller may cause the first acoustic driver 2821 and the second acoustic driver 2822 to output low-frequency sounds with the same phase or with a phase difference less than 90o, and output medium-frequency and high-frequency sounds with opposite phases or with a phase difference between 90o-270o. In such cases, the low-frequency sound in the near field heard by the user may not be enhanced by interference. And the medium-frequency and high-frequency sounds in the far field may still be weakened due to the interference cancellation.

Figure 37:
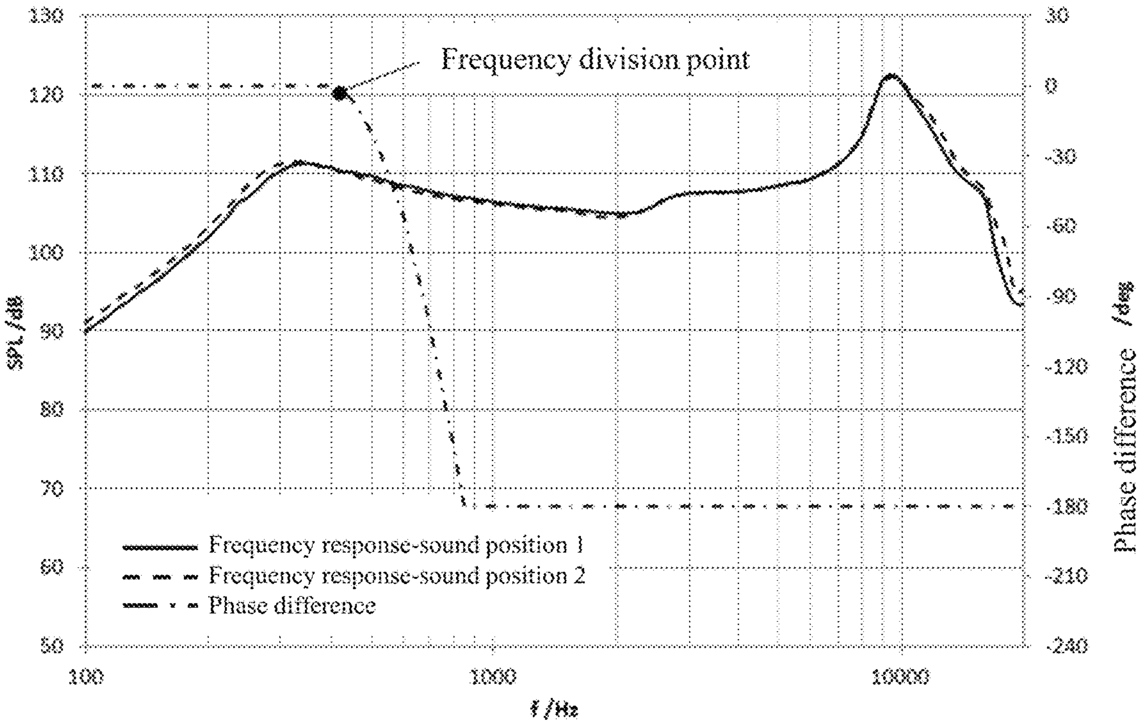
FIG. 37 is a schematic diagram illustrating exemplary frequency responses of sound output positions according to some embodiments of the present disclosure.

In some embodiments, the controller may adjust the amplitudes and phases of the sounds generated by the first acoustic driver and/or the second acoustic driver according to a frequency division point. FIG. 37 is a schematic diagram illustrating exemplary frequency responses of sound output positions according to some embodiments of the present disclosure. As shown in FIG. 37, the frequency response curve of the first sound output position ("frequency response-sound position 1" in FIG. 37) may be the same as or similar to that of the second sound output position ("frequency response-sound position 2" in FIG. 37). For illustration purposes, a sound component in a frequency range before the frequency division point may be referred to as a first sound component, and a sound component in a frequency range after the frequency division point may be referred to as a second sound component. As shown in FIG. 37, the controller may control the first sound components output from the first sound output position and the second sound position, respectively, to have the same phase or a small phase difference. In such cases, the first sound component propagated from the first sound output position and the first sound component propagated from the second sound output position may be superimposed at the hearing position, which may generate sound with a large volume. The controller may also control the second sound components output from the first sound output position and the second sound output position, respectively, to have opposite phases or a phase difference close to 180°. In such cases, the second sound component propagated from the first sound output position and the second sound component propagated from the second sound output position may interfere and cancel each other in the far field, which may reduce the sound leakage in the far field. In some embodiments, to enhance the low-frequency sound of the acoustic output device, the frequency division point may be not larger than 2000 Hz. In some embodiments, the frequency division point may be not larger than 1000 Hz. In some embodiments, the frequency division point may be not larger than 400 Hz. In some embodiments, the frequency division point may be not larger than 300 Hz.

Figure 38:
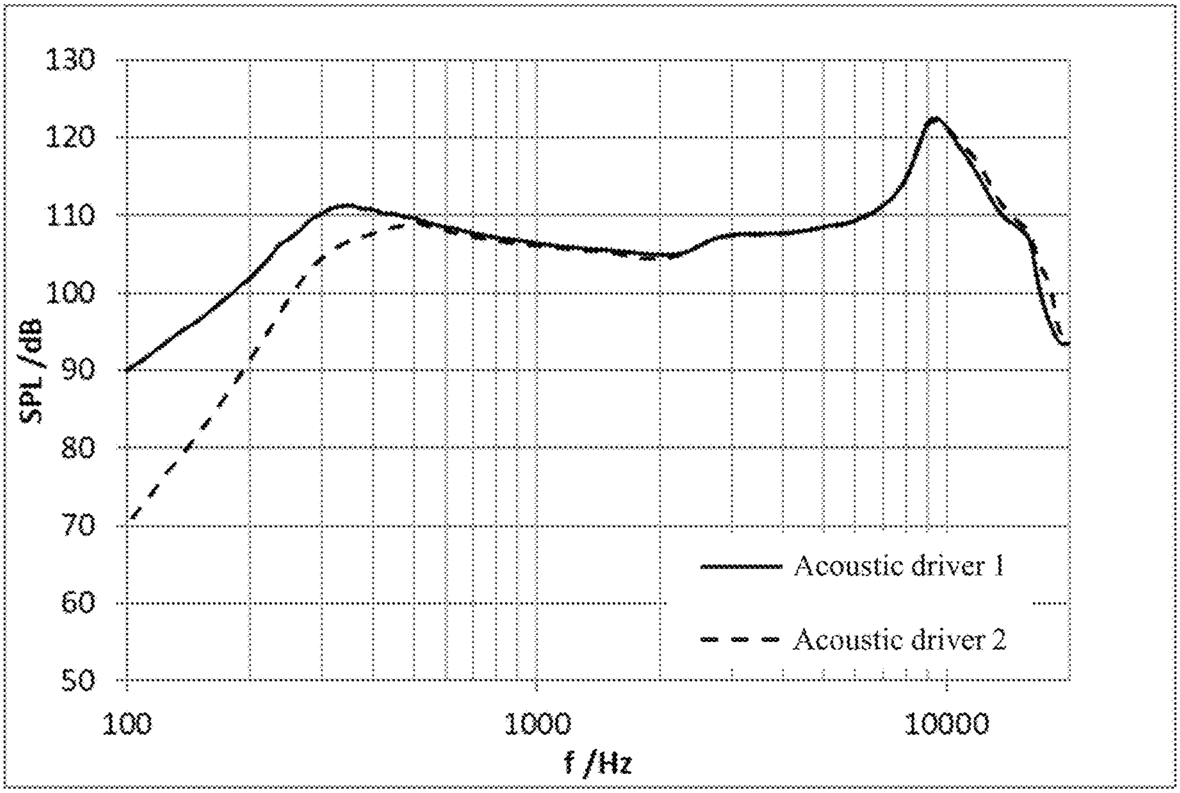
FIG. 38 is a schematic diagram illustrating exemplary frequency responses of two acoustic drivers with different frequency response characteristics according to some embodiments of the present disclosure.

In some embodiments, the two acoustic drivers may have different frequency responses. In such cases, the first sound output position and the second sound output position may have different frequency response curves. In such cases, the volume of the hearing sound with a specific frequency may be increased or the volume of the sound leakage may be decreased. For example, to increase the volume of low-frequency sounds at the hearing position (e.g., an external ear canal of the human body), two acoustic drivers with large frequency response characteristics in the low-frequency range may be provided. In such cases, even if the low-frequency sounds generated by the two acoustic drivers are opposite in phase, the low-frequency sounds generated by the two acoustic drivers may still cancel each other slightly due to a large amplitude difference. FIG. 38 is a schematic diagram illustrating exemplary frequency responses of two acoustic drivers with different frequency response characteristics according to some embodiments of the present disclosure. As shown in FIG. 38, the first acoustic driver may be an acoustic driver ("Acoustic Driver 1" in FIG. 38) with a strong capability of outputting low-frequency sounds, and the second acoustic driver may be a second acoustic driver ("Acoustic Driver 2" in FIG. 39) with a relatively weak capability of outputting low-frequency sounds and a capability of outputting middle-high-frequency sounds equivalent to the first acoustic driver. In the low-frequency range (e.g., 100 Hz-500 Hz), the first acoustic driver and the second acoustic driver may generate low-frequency sounds with opposite phases and a large amplitude difference. In such cases, the low-frequency sounds at the hearing position may still have a larger volume, and the sound leakage in the high-frequency range in the far field may be similar to the sound leakage of the middle-high-frequency described in FIG. 37.

Figure 39:
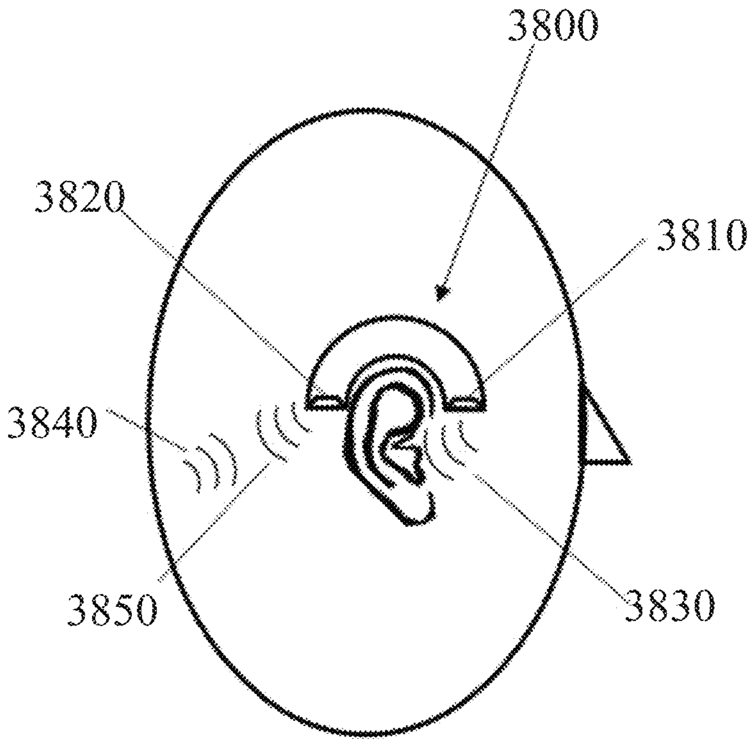
FIG. 39 is a schematic diagram illustrating an exemplary working principle of an acoustic output device with an active noise reduction according to some embodiments of the present disclosure.

In some embodiments, by using the control signal, the controller may cause the first acoustic driver or the second acoustic driver to output sounds with the same amplitude and opposite phases as a sound pressure of external noise, thereby achieving an active noise reduction. FIG. 39 is a schematic diagram illustrating an exemplary working principle of an acoustic output device with an active noise reduction according to some embodiments of the present disclosure. As shown in FIG. 39, the acoustic output device 3800 may include a first acoustic driver 3810 and a second acoustic driver 3820. The first acoustic driver 3810 may be configured to output a hearing sound wave 3830 to a hearing position (e.g., an external ear canal of the human body). The second acoustic driver 3820 may be configured to output an anti-phase sound wave 3850 with an opposite phase to an external environmental noise 3840. The anti-phase soundwave 3850 output by the second acoustic driver 3820 and the environmental noise 3840 may have the same sound pressure amplitude and opposite phases such that the anti-phase soundwave 3850 may cancel the environmental noise 3840 to reduce external noises. In some embodiments, the acoustic output device 3800 may include a microphone (not shown in FIG. 39) configured to monitor the external environmental noise 3840. The microphone may convert the external environmental noise 3840 into a corresponding noise signal, and transmit the noise signal to the controller of the acoustic output device 3800. The controller may control the second acoustic driver 3820 to output sounds with the same amplitudes and opposite phases as the external environment noise 3840 based on the noise signal. In some embodiments, the first acoustic driver 3810 and the second acoustic driver 3820 may be arranged on the front and rear sides of the auricle. More descriptions regarding the first acoustic driver 3810 and the second acoustic driver 3820 arranged on the front and rear sides of the auricle may be found elsewhere in the present disclosure. See, e.g., FIG. 1 and the relevant descriptions thereof. In some embodiments, the first acoustic driver 3810 and the second acoustic driver 3820 may also be arranged on the same side of the auricle (e.g., arranged on the same side of the auricle at the same time).

Figure 40:
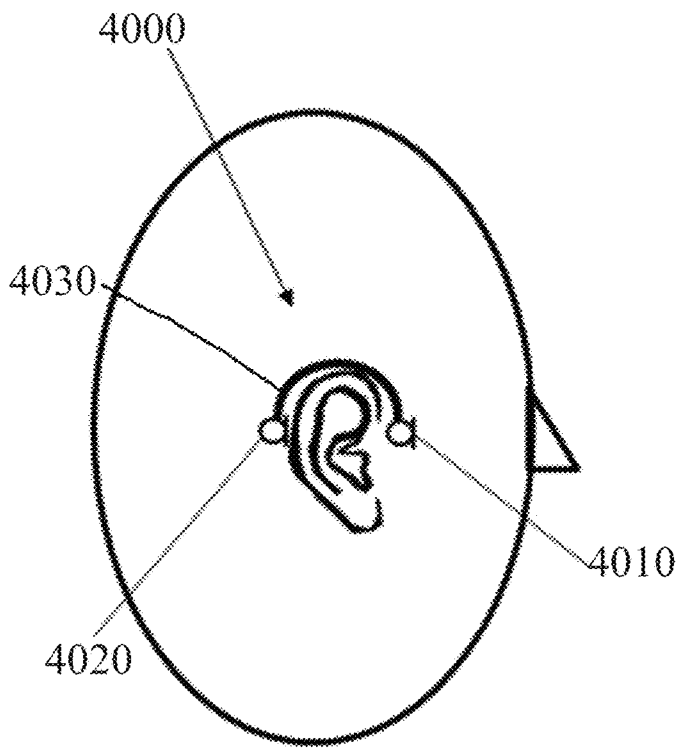
FIG. 40 is a schematic diagram illustrating an exemplary noise reduction and sound transmission device according to some embodiments of the present disclosure.

FIG. 40 is a schematic diagram illustrating an exemplary noise reduction and sound transmission device according to some embodiments of the present disclosure. As shown in FIG. 40, a noise reduction and sound transmission device 4000 may include a first sound transmitter 4010, a second sound transmitter 4020, a controller (not shown), and a supporting structure 4030 configured to fix the first sound transmitter 4010 and the second sound transmitter 4020. The first sound transmitter 4010 and the second sound transmitter 4020 may be configured to receive sound signals, such as the voice of the user, background noises in the environment, or the like. The controller may be configured to process two groups of signals received by the first sound transmitter 4010 and the second sound transmitter 4020 and improve a signal-to-noise ratio of the noise reduction and sound transmission device 4000 in a specific frequency band. In some embodiments, the signal-to-noise ratio may be used to evaluate a noise reduction performance of the noise reduction and sound transmission device 400. The signal-to-noise ratio of the noise reduction and sound transmission device 4000 may be improved by reducing a noise component in the sound signal and maintaining a voice component in the sound signal.

The supporting structure 4030 may be configured to carry the first sound transmitter 4010, the second sound transmitter 4020, and the controller. The supporting structure may include a first sound hole (not shown in FIG. 40) corresponding to the first sound transmitter 4010 and a second sound hole (not shown in FIG. 40) corresponding to the second sound transmitter 4020. The first sound hole and the second sound hole may be configured to introduce external sounds to the first sound transmitter 4010 and the second sound transmitter 4020, respectively. In some embodiments, the first sound transmitter 4010 (or the first sound hole) may be arranged on the front side of the auricle, and the second sound transmitter 4020 (or the second sound hole) may be arranged on the rear side of the auricle. The auricle may be used as a baffle to increase acoustic transmission distances from the mouth of the user to the first sound transmitter 4010 and the second sound transmitter 4020 such that the voice signals received by the first sound transmitter 4010 and the second sound transmitter 4020 may be quite different. In some embodiments, the first sound transmitter 4010 (or the first sound hole) may be arranged close to the mouth of the human body to better receive the voice of the user. In some embodiments, the first sound transmitter 4010 and the second sound transmitter 4020 may also be arranged on the same side of the auricle. For example, the first sound transmitter 4010 (or the first sound hole) and the second sound transmitter 4020 (or the second sound hole) may be arranged on the front side of the auricle and close to the mouth. It should be noted that the first sound transmitter 4010 (or the first sound hole) and the second sound transmitter 4020 (or the second sound hole) may not be limited to one in FIG. 40. The count of the first sound transmitter 4010 (or the first sound hole) and the second sound transmitter 4020 (or the second sound hole) may also be more than one. When there are a plurality of first sound transmitters (or first sound holes) and second sound transmitters 4020 (or second sound holes), at least one first sound transmitter 4010 (or a first sound hole) may be arranged on the front side of the auricle, and at least one second sound transmitter 4020 (or a second sound hole) may be arranged on the rear side of the auricle.

In some embodiments, the first sound transmitter 4010 and the second sound transmitter 4020 may be independent and non-directional sound transmitters. In some embodiments, a sensitivity difference between the first sound transmitter 4010 and the second sound transmitter 4020 may be not larger than 3 dB. In some embodiments, the sensitivity difference between the first sound transmitter 4010 and the second sound transmitter 4020 may be not larger than 1 dB. In some embodiments, the first sound transmitter 4010 and the second sound transmitter 4020 may be the same type of sound transmitters.

Figure 41:
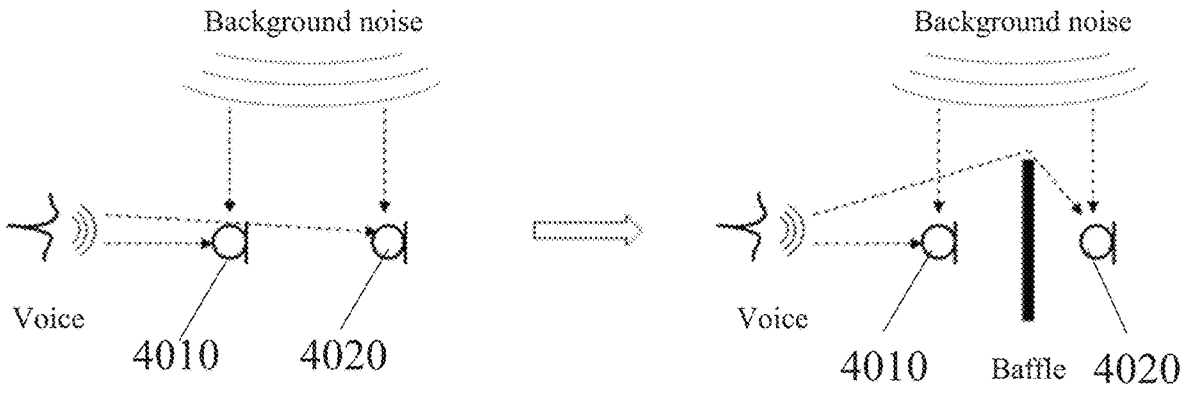
FIG. 41 is a schematic diagram illustrating an exemplary noise reduction and sound transmission device with a baffle according to some embodiments of the present disclosure.

FIG. 41 is a schematic diagram illustrating an exemplary noise reduction and sound transmission device with a baffle according to some embodiments of the present disclosure. According to the adaptive filtering theory, an attenuation (i.e., the amount of noise reduction) of the noise reduction and sound transmission device 4000 to background noises may be positively correlated with a spatial coherence function between the first sound transmitter 4010 and the second sound transmitter 4020. That is, the more coherent the first sound transmitter 4010 and the second sound transmitter 4020 are, the more the background noise may be attenuated, and the better the noise reduction effect may be. A sound field of the background noise may not be uniform, and a sound pressure amplitude and a phase of the background noise at different positions may be different. In such cases, the larger the distance between the first sound transmitter 4010 and the second sound transmitter 4020 is, the larger the difference between background noise signals received by the first sound transmitter 4010 and the second sound transmitter 4020 may be, and the worse the coherence between the background noise signals may be. In some embodiments, the coherence between the first sound transmitter 4010 and the second sound transmitter 4020 may be improved by adjusting the distance between the first sound transmitter 4010 and the second sound transmitter 4020. The coherence between the first sound transmitter 4010 and the second sound transmitter 4020 may be negatively correlated with the distance between the first sound transmitter 4010 and the second sound transmitter 4020. That is, the smaller the distance between the first sound transmitter 4010 and the second sound transmitter 4020 is, the better the coherence may be, and the better the noise reduction effect of the noise reduction and sound transmission device 4000 may be. However, when the distance between the first sound transmitter 4010 and the second sound transmitter 4020 is too small, the sound pressure difference caused by the user's voice on the first sound transmitter 4010 and the second sound transmitter 4020 may decrease sharply, which may cause a decrease in the signal-to-noise ratio of a final output signal. As shown in FIG. 41, a baffle may be arranged between the first sound transmitter 4010 and the second sound transmitter 4020, or the auricle may be used as a baffle to reduce or prevent the reduction of the signal-to-noise ratio caused by the small distance between the two sound transmitters. Duo to a weak directivity of the background noise, the baffle or the auricle may have little effect on the coherence between the first sound transmitter 4010 and the second sound transmitter 4020. Meanwhile, the baffle or the auricle may increase an acoustic route of the voice signal to the second sound transmitter 4020, which may reduce the amount of voice signal received by the second sound transmitter 4020, thereby increasing an amplitude difference of voice signals received by the first sound transmitter 4010 and the second sound transmitter 4020, and significantly improving the signal-to-noise ratio of the noise reduction and sound transmission device 4000. For brevity, assuming that the background noise signals received by the first sound transmitter 4010 and the second sound transmitter 4020 are the same, and due to the baffle or the auricle, the voice signals received by the first sound transmitter 4010 and the second sound transmitter 4020 may be quite different. The controller may subtract the sound signals received by the first sound transmitter 4010 and the second sound transmitter 4020 to obtain a signal that mainly reflects the user's voice. In an actual application scenario, the controller may also include one or more filters (e.g., adaptive filters) configured to filter sound signals received by the first sound transmitter 4010 and/or the second sound transmitter 4020, thereby obtaining and a user's voice signal with a high signal-to-noise ratio.

Figure 42:
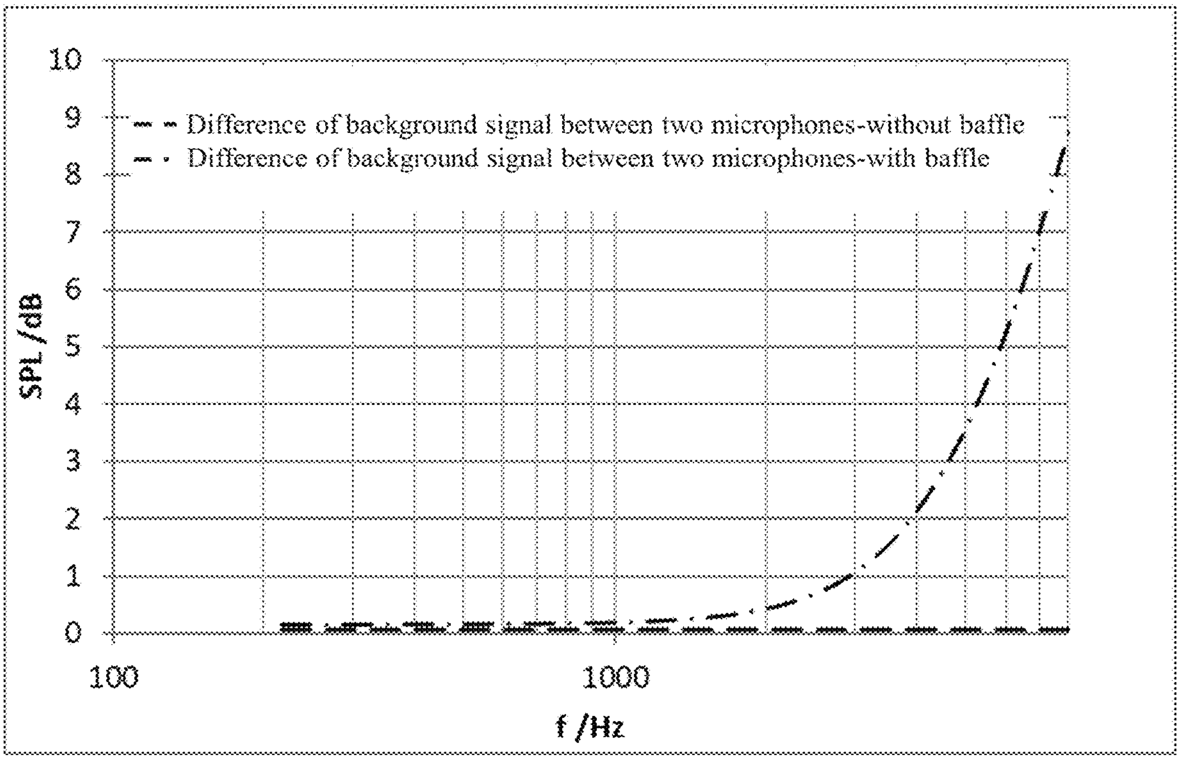
FIG. 42 is a schematic diagram illustrating an exemplary background noise intensity of a noise reduction and sound transmission device with or without a baffle according to some embodiments of the present disclosure.
Figure 43:
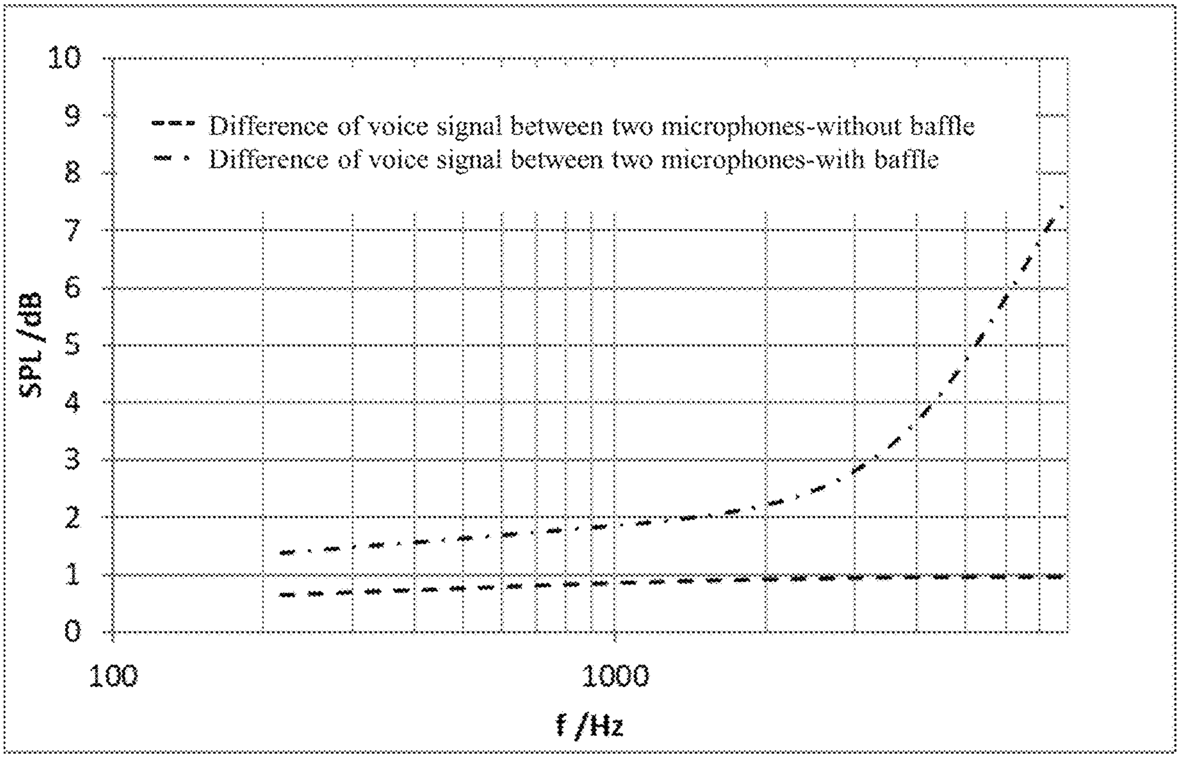
FIG. 43 is a schematic diagram illustrating an exemplary voice signal intensity of a noise reduction and sound transmission device with or without a baffle according to some embodiments of the present disclosure.

FIG. 42 is a schematic diagram illustrating an exemplary background noise intensity of a noise reduction and sound transmission device with or without a baffle according to some embodiments of the present disclosure. FIG. 43 is a schematic diagram illustrating an exemplary voice signal intensity of a noise reduction and sound transmission device with or without a baffle according to some embodiments of the present disclosure. As shown in FIG. 42, when a height of the baffle is constant and the frequency is larger than 2000 Hz, compared with the case that there is no baffle between the first sound transmitter 4010 and the second sound transmitter 4020 ("difference of background signals between two microphones-without baffle" in FIG. 42), a difference of background signals between the first sound transmitter 4010 and the second sound transmitter 4020 when a baffle is provided ("difference of background signals between two microphones-with baffle" in FIG. 42) may be more and more obvious as the frequency increases. As shown in FIG. 43, when the height of the baffle is constant and the frequency is larger than 2000 Hz, compared with the case that there is no baffle between the first sound transmitter 4010 and the second sound transmitter 4020 ("difference of background signals between two microphones-without baffle" in FIG. 43), the difference of voice signals between the first sound transmitter 4010 and the second sound transmitter 4020 when the baffle is provided ("difference of voice signals between two microphones-with baffle" in FIG. 43) may be more and more obvious as the frequency increases. According to FIG. 42 and FIG. 43, within the frequency range not larger than 5000 Hz, the increase of the difference of the voice signals between the first sound transmitter 4010 and the second sound transmitter 4020 when the baffle is provided may be significantly greater than the increase of the difference of the background signals between the first sound transmitter 4010 and the second sound transmitter 4020 when the baffle is provided. That is, the increase of the voice signals of the two sound transmitters may be larger than the decrease of the coherence between the two sound transmitters such that the signal-to-noise ratio of the noise reduction and sound transmission device 4000 may increase.

Figure 44:
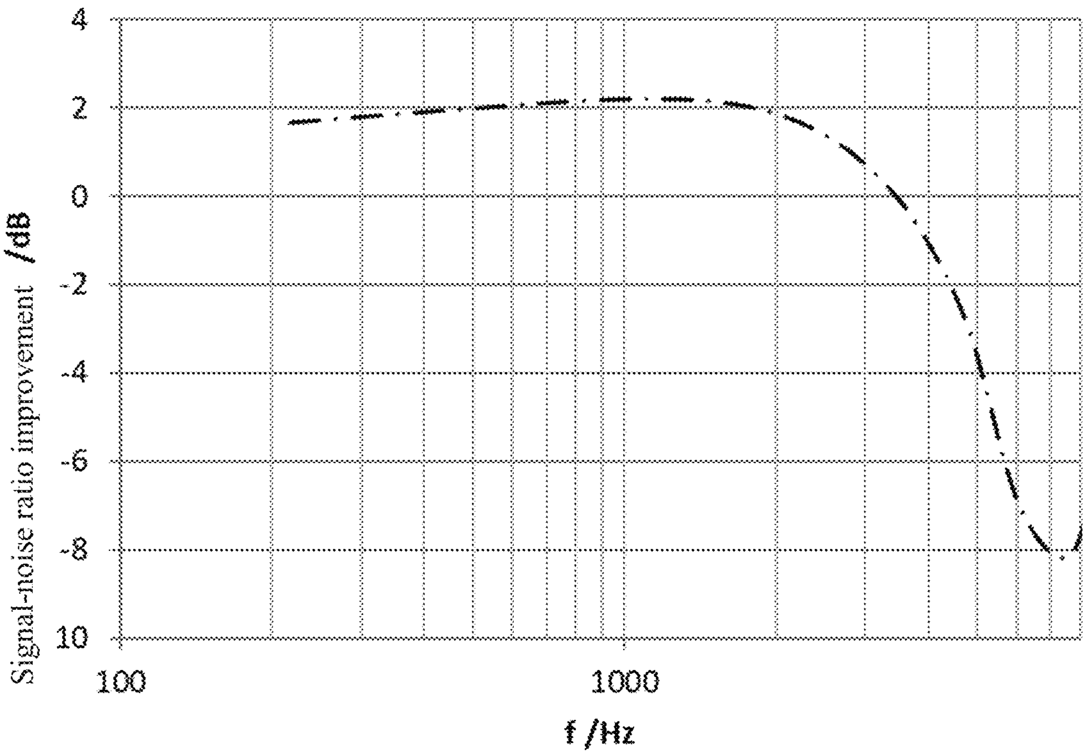
FIG. 44 is a schematic diagram illustrating an exemplary change of a signal-to-noise ratio with a frequency of a noise reduction and sound transmission device according to some embodiments of the present disclosure.

In some embodiments, the auricle may be regarded as a baffle or a baffle may be arranged on the supporting structure between two sound transmitters, and the signal-to-noise ratio of the noise reduction and sound transmission device 4000 may be improved by adjusting the height of the baffle and the distance between the first sound transmitter 4010 and the second sound transmitter 4020. FIG. 44 is a schematic diagram illustrating an exemplary change of a signal-to-noise ratio with a frequency when a ratio of a distance between a first sound transmitter 4010 and a second sound transmitter 4020 to a height of a baffle is equal to 4 according to some embodiments of the present disclosure. As shown in FIG. 44, in a frequency range with an upper frequency limit of about 2 kHz, the baffle may be used to improve the signal-to-noise ratio of the noise reduction and sound transmission device. In some embodiments, to satisfy use scenarios of normal voice signals (an upper frequency limit of a voice signal may be not less than 4 kHz), the ratio of the distance between the first sound transmitter 4010 and the second sound transmitter 4020 to the height of the baffle may be not larger than 4. In some embodiments, the ratio of the height of the baffle to the distance between the first sound transmitter 4010 and the second sound transmitter 4020 may be not larger than 2. In some embodiments, the distance between the first sound transmitter 4010 and the second sound transmitter 4020 may be not less than 1 cm. In some embodiments, the distance between the first sound transmitter 4010 and the second sound transmitter 4020 may be not larger than 12 cm. In some embodiments, the distance between the first sound transmitter 4010 and the second sound transmitter 4020 may be not larger than 8 cm. In some embodiments, a ratio of the distance between the two sound transmitters to the height of the baffle may be not less than 0.2 and not larger than 4.

It should be noted that the descriptions of the noise reduction and sound transmission device 4000 are only for illustrative purposes. For those skilled in the art, various modifications may be made without departing from the principles, and the adjusted structures are still within the scope of the present disclosure. For example, the supporting structure 4030 in the noise reduction and sound transmission device 4000 may not be limited to the structure and shape shown in FIG. 40, and other structures that may fix and support the first sound transmitter 4010 and the second sound transmitter 4020 may be used as supporting structures. As another example, the first sound transmitter 4010 and the second sound transmitter 4020 may also be arranged on the same side of the auricle, and the baffle may also be arranged between the first sound transmitter 4010 and the second sound transmitter 4020.

The basic concepts have been described above. Obviously, for those skilled in the art, the detailed disclosure is only an example and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" may indicate a certain feature, structure, or characteristic related to at least one embodiment of the present disclosure. Therefore, it should be emphasized and noted that "an embodiment", "one embodiment", or "an alternative embodiment" mentioned twice or more in different positions in the present disclosure does not necessarily refer to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products, or combinations of materials, or any new and useful improvements. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

The computer storage medium may include a propagation data signal containing a computer program encoding, such as on a baseband or as part of a carrier. The propagation signal may have a variety of expressions, including electromagnetic form, optical form, etc., or suitable combinations. The computer storage medium may be any computer readable medium other than the computer readable storage medium, which may perform system, devices, or devices to implement system, devices, or devices to implement communication, propagating, or devices, by connecting to an instruction. Program encoding on a computer storage medium may be propagated by any suitable medium, including radio, cable, fiber optic cable, RF, or a similar medium, or a combination of the above media.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may be run entirely on the user's computer, or as an independent software package on the user's computer, or partly on the user's computer and partly on a remote computer, or entirely on the remote computer or server. In the latter case, the remote computer may be connected to the user's computer through any network form, such as a local area network (LAN) or a wide area network (WAN), or to an external computer (for example, via the Internet), or in a cloud computing environment, or as a service such as a Software as a Service (SaaS).

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "approximately" or "substantially" may indicate that the number may be allowed to vary by ±20%. Accordingly, in some embodiments, the numerical parameters used in the specification and claims are approximate values, and the approximation may change according to the characteristics required by the individual embodiments. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific embodiments are reported as precisely as practicable.

Each patent, patent application, patent application publication, and other materials cited herein, such as articles, books, instructions, publications, documents, etc., are hereby incorporated by reference in their entirety. Application history documents that are inconsistent or conflicting with the contents of the present disclosure are excluded, and documents (currently or later attached to the present disclosure) that limit the widest range of the scope of the present disclosure are also excluded. It should be noted that if there is any inconsistency or conflict between the description, definition, and/or terminology in the accompanying materials of the present disclosure and the content described in the present disclosure, the description, definition, and/or terminology in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

We claim:

1. A sound transmission device, comprising:

a first sound transmitter and a second sound transmitter; and a supporting structure configured to carry the first sound transmitter and the second sound transmitter, wherein the supporting structure includes a first sound hole corresponding to the first sound transmitter and a second sound hole corresponding to the second sound transmitter;

the first sound hole and the second sound hole are configured to introduce external sounds of the sound transmission device to the first sound transmitter and the second sound transmitter, respectively; and the supporting structure is configured such that the first sound hole and the second sound hole are arranged on two sides of a baffle, respectively;

the sound transmission device further comprising a controller configured to process sounds received by the first sound transmitter and the second sound transmitter, wherein to process the sounds received by the first sound transmitter and the second sound transmitter, the controller is configured to subtract the sound received by the first sound transmitter and the sound received by the second sound transmitter to obtain a signal that reflects a voice of a user; wherein the controller further configured to increase a signal-to-noise ratio of the sound transmission device in a specific frequency band;

the specific frequency band is not larger than 5 kHz; or an upper frequency limit of the specific frequency band is about 2 KHz.

2. The sound transmission device of claim 1, wherein a distance between the first sound hole and the second sound hole is not less than 1 cm.

3. The sound transmission device of claim 2, wherein the distance between the first sound hole and the second sound hole is not larger than 12 cm.

4. The sound transmission device of claim 2, wherein the distance between the first sound hole and the second sound hole is not larger than 8 cm.

5. The sound transmission device of claim 1, wherein a ratio of the distance between the first sound hole and the second sound hole to the height of the baffle is not less than 0.2.

6. The sound transmission device of claim 5, wherein the ratio of the distance between the first sound hole and the second sound hole to the height of the baffle is not larger than 4.

7. The sound transmission device of claim 5, wherein the ratio of the distance between the first sound hole and the second sound hole to the height of the baffle is not larger than 2.

8. The sound transmission device of claim 1, wherein the first sound transmitter and the second sound transmitter are non-directional sound transmitters.

9. The sound transmission device of claim 8, wherein the first sound transmitter and the second sound transmitter are same type of sound transmitters.

10. The sound transmission device of claim 1, wherein the sensitivity difference between the first sound transmitter and the second sound transmitter is not larger than 1 dB.

11. The sound transmission device of claim 1, wherein the first sound transmitter is arranged close to a mouth of a user.

12. The sound transmission device of claim 1, wherein the controller includes one or more filters configured to filter the sounds received by the first sound transmitter or the second sound transmitter.

13. The sound transmission device of claim 1, wherein the one or more filters include an adaptive filter.

14. The sound transmission device of claim 1, wherein the first sound transmitter and the second sound transmitter are arranged on a same side of an auricle of a user, and the baffle is disposed between the first sound transmitter and the second sound transmitter.

15. The sound transmission device of claim 1, wherein the baffle includes an auricle of a user, and the supporting structure is configured such that the first sound hole and the second sound hole are arranged on a front side and a rear side of the auricle, respectively.

* * * * *